US008050257B2

(12) United States Patent
Beshai

(10) Patent No.: US 8,050,257 B2
(45) Date of Patent: Nov. 1, 2011

(54) NETWORK WITH A FAST-SWITCHING OPTICAL CORE

(76) Inventor: Maged E Beshai, Stittsville Ottawa (CA)

( * ) Notice: Subject to any disclaimer, the term of this patent is extended or adjusted under 35 U.S.C. 154(b) by 998 days.

(21) Appl. No.: 11/951,349

(22) Filed: Dec. 6, 2007

(65) Prior Publication Data

US 2008/0138067 A1   Jun. 12, 2008

Related U.S. Application Data

(60) Provisional application No. 60/869,562, filed on Dec. 12, 2006.

(51) Int. Cl.
*H04Q 11/00* (2006.01)
(52) U.S. Cl. ........ 370/387; 370/230; 370/235; 370/238; 370/359; 370/360; 370/367; 370/380; 370/386; 370/401; 370/431; 398/42; 398/45; 398/49; 398/51; 398/62; 398/116
(58) Field of Classification Search .......... None
See application file for complete search history.

(56) References Cited

U.S. PATENT DOCUMENTS

| | | | | |
|---|---|---|---|---|
| 6,747,971 | B1 * | 6/2004 | Hughes et al. | 370/387 |
| 7,366,412 | B2 * | 4/2008 | Beshai | 398/49 |
| 7,369,491 | B1 * | 5/2008 | Beshai et al. | 370/230 |
| 7,397,794 | B1 * | 7/2008 | Lacroute et al. | 370/367 |
| 7,552,262 | B1 * | 6/2009 | Turner et al. | 710/302 |
| 7,899,930 | B1 * | 3/2011 | Turner et al. | 709/238 |
| 2002/0186695 | A1 * | 12/2002 | Schwartz et al. | 370/392 |
| 2004/0165887 | A1 * | 8/2004 | Beshai | 398/42 |
| 2005/0078666 | A1 * | 4/2005 | Beshai | 370/380 |
| 2007/0280223 | A1 * | 12/2007 | Pan et al. | 370/360 |
| 2008/0151880 | A1 * | 6/2008 | Willhite et al. | 370/359 |

* cited by examiner

*Primary Examiner* — Hassan Phillips
*Assistant Examiner* — Ajay Cattungal

(57) ABSTRACT

A high capacity network comprises a plurality of edge nodes with asymmetrical connections to a plurality of switch planes, each switch plane comprising fully meshed fast-switching optical switch units. Upstream wavelength channels from each source edge node connect to different switch planes in a manner which ensures that upstream wavelength channels from any two edge nodes connect to a common switch unit in at most a predefined number, preferably one, of switch planes. Thus, switch units in different switch planes connect to upstream channels from orthogonal subsets of source edge nodes. In contrast, downstream wavelength channels from a switch unit in each switch plane connect to one set of sink edge nodes. In an alternate arrangement, the upstream and downstream asymmetry may be reversed.

25 Claims, 46 Drawing Sheets

| SWITCH PLANE 120-p | SWITCH UNIT 240(k,p) | | | | | | | | | |
|---|---|---|---|---|---|---|---|---|---|---|
| | 240(0,p) | | 240(1,p) | | 240(2,p) | | 240(3,p) | | 240(4,p) | |
| 120(0) | 00 | 00 | 01 | 01 | 02 | 02 | 03 | 03 | 04 | 04 |
| | 10 | 10 | 11 | 11 | 12 | 12 | 13 | 13 | 14 | 14 |
| | 20 | 20 | 21 | 21 | 22 | 22 | 23 | 23 | 24 | 24 |
| | 30 | 30 | 31 | 31 | 32 | 32 | 33 | 33 | 34 | 34 |
| 120(1) | 01 | 01 | 02 | 02 | 03 | 03 | 04 | 04 | 00 | 00 |
| | 12 | 12 | 13 | 13 | 14 | 14 | 10 | 10 | 11 | 11 |
| | 23 | 23 | 24 | 24 | 20 | 20 | 21 | 21 | 22 | 22 |
| | 34 | 34 | 30 | 30 | 31 | 31 | 32 | 32 | 33 | 33 |
| 120(2) | 02 | 02 | 03 | 03 | 04 | 04 | 00 | 00 | 01 | 01 |
| | 14 | 14 | 10 | 10 | 11 | 11 | 12 | 12 | 13 | 13 |
| | 21 | 21 | 22 | 22 | 23 | 23 | 24 | 24 | 20 | 20 |
| | 33 | 33 | 34 | 34 | 30 | 30 | 31 | 31 | 32 | 32 |
| 120(3) | 03 | 03 | 04 | 04 | 00 | 00 | 01 | 01 | 02 | 02 |
| | 11 | 11 | 12 | 12 | 13 | 13 | 14 | 14 | 10 | 10 |
| | 24 | 24 | 20 | 20 | 21 | 21 | 22 | 22 | 23 | 23 |
| | 32 | 32 | 33 | 33 | 34 | 34 | 30 | 30 | 31 | 31 |
| 120(4) | 04 | 04 | 00 | 00 | 01 | 01 | 02 | 02 | 03 | 03 |
| | 13 | 13 | 14 | 14 | 10 | 10 | 11 | 11 | 12 | 12 |
| | 22 | 22 | 23 | 23 | 24 | 24 | 20 | 20 | 21 | 21 |
| | 31 | 31 | 32 | 32 | 33 | 33 | 34 | 34 | 30 | 30 |

| SWITCH PLANE 120-p | SWITCH UNIT 240(k,p) |||||
| --- | --- | --- | --- | --- | --- |
| | 240(0,p) | 240(1,p) | 240(2,p) | 240(3,p) | 240(4,p) |
| 120(0) | 00 | 01 | 02 | 03 | 04 |
| | 10 | 11 | 12 | 13 | 14 |
| | 20 | 21 | 22 | 23 | 24 |
| | 30 | 31 | 32 | 33 | 34 |
| 120(1) | 01 | 02 | 03 | 04 | 00 |
| | 12 | 13 | 14 | 10 | 11 |
| | 23 | 24 | 20 | 21 | 22 |
| | 34 | 30 | 31 | 32 | 33 |
| 120(2) | 02 | 03 | 04 | 00 | 01 |
| | 14 | 10 | 11 | 12 | 13 |
| | 21 | 22 | 23 | 24 | 20 |
| | 33 | 34 | 30 | 31 | 32 |
| 120(3) | 03 | 04 | 00 | 01 | 02 |
| | 11 | 12 | 13 | 14 | 10 |
| | 24 | 20 | 21 | 22 | 23 |
| | 32 | 33 | 34 | 30 | 31 |
| 120(4) | 04 | 00 | 01 | 02 | 03 |
| | 13 | 14 | 10 | 11 | 12 |
| | 22 | 23 | 24 | 20 | 21 |
| | 31 | 32 | 33 | 34 | 30 |

| SWITCH PLANE 120-p | 240(0,p) | | 240(1,p) | | SWITCH UNIT 240(k,p) 240(2,p) | | 240(3,p) | | 240(4,p) | |
|---|---|---|---|---|---|---|---|---|---|---|
| 120(0) | 00 | 00 | 01 | 01 | 02 | 02 | 03 | 03 | 04 | 04 |
| | 10 | 10 | 11 | 11 | 12 | 12 | 13 | 13 | 14 | 14 |
| | 20 | 20 | 21 | 21 | 22 | 22 | 23 | 23 | 24 | 24 |
| | 30 | 30 | 31 | 31 | 32 | 32 | 33 | 33 | 34 | 34 |
| 120(1) | 01 | 00 | 02 | 01 | 03 | 02 | 04 | 03 | 00 | 04 |
| | 12 | 10 | 13 | 11 | 14 | 12 | 10 | 13 | 11 | 14 |
| | 23 | 20 | 24 | 21 | 20 | 22 | 21 | 23 | 22 | 24 |
| | 34 | 30 | 30 | 31 | 31 | 32 | 32 | 33 | 33 | 34 |
| 120(2) | 02 | 00 | 03 | 01 | 04 | 02 | 00 | 03 | 01 | 04 |
| | 14 | 10 | 10 | 11 | 11 | 12 | 12 | 13 | 13 | 14 |
| | 21 | 20 | 22 | 21 | 23 | 22 | 24 | 23 | 20 | 24 |
| | 33 | 30 | 34 | 31 | 30 | 32 | 31 | 33 | 32 | 34 |
| 120(3) | 03 | 00 | 04 | 01 | 00 | 02 | 01 | 03 | 02 | 04 |
| | 11 | 10 | 12 | 11 | 13 | 12 | 14 | 13 | 10 | 14 |
| | 24 | 20 | 20 | 21 | 21 | 22 | 22 | 23 | 23 | 24 |
| | 32 | 30 | 33 | 31 | 34 | 32 | 30 | 33 | 31 | 34 |
| 120(4) | 04 | 00 | 00 | 01 | 01 | 02 | 02 | 03 | 03 | 04 |
| | 13 | 10 | 14 | 11 | 10 | 12 | 11 | 13 | 12 | 14 |
| | 22 | 20 | 23 | 21 | 24 | 22 | 20 | 23 | 21 | 24 |
| | 31 | 30 | 32 | 31 | 33 | 32 | 34 | 33 | 30 | 34 |

*FIG. 11*

| SWITCH PLANE 120-p | SWITCH UNIT (k,p) | | | | |
|---|---|---|---|---|---|
| | 240(0,p) | 240(1,p) | 240(2,p) | 240(3,p) | 240(4,p) |
| 120(0) | 00 | 01 | 02 | 03 | 04 |
| | 10 | 11 | 12 | 13 | 14 |
| | 20 | 21 | 22 | 23 | 24 |
| | 30 | 31 | 32 | 33 | 34 |
| 120(1) | 01 00 | 01 | 02 | 03 | 04 |
| | 12 10 | 11 | 12 | 13 | 14 |
| | 23 20 | 21 | 22 | 23 | 24 |
| | 34 30 | 31 | 32 | 33 | 34 |
| 120(2) | 00 | 01 | 02 | 03 | 04 |
| | 10 | 11 | 23 12 | 13 | 14 |
| | 20 | 34 21 | 22 | 23 | 24 |
| | 30 | 31 | 32 | 33 | 34 |
| 120(3) | 00 | 01 | 02 | 01 03 | 04 |
| | 10 | 12 11 | 12 | 13 | 01 14 |
| | 20 | 21 | 22 | 23 | 24 |
| | 30 | 31 | 34 32 | 33 | 34 |
| 120(4) | 00 | 01 | 02 | 03 | 04 |
| | 10 | 11 | 12 | 13 | 12 14 |
| | 20 | 23 21 | 22 | 23 | 24 |
| | 30 | 31 | 32 | 34 33 | 34 |

*FIG. 12*

| SWITCH PLANE 120-p | SWITCH UNIT 240(k,p) | | | | |
|---|---|---|---|---|---|
| | 240(0,p) | 240(1,p) | 240(2,p) | 240(3,p) | 240(4,p) |
| 120(0) | | | 12 ---- | ----▶ 24 | |
| 120(1) | 12 ---- | ---- | ---- | ---- | ----▶ 24 |
| 120(2) | | | | 12 ---- | ----▶ 24 |
| 120(3) | | 12 ---- | ---- | ---- | ----▶ 24 |
| 120(4) | | | | | 12 --▲ 24 |

*FIG. 13*

| SWITCH PLANE 120(p) | Wavelength Channel | SWITCH UNIT 240(k,p) | | | | | | | | | |
|---|---|---|---|---|---|---|---|---|---|---|---|
| | | 240(0,p) | | 240(1,p) | | 240(2,p) | | 240(3,p) | | 240(4,p) | |
| 120(0) | A | 00 | 00 | 01 | 01 | 02 | 02 | 03 | 03 | 04 | 04 |
| | B | 10 | 10 | 11 | 11 | 12 | 12 | 13 | 13 | 14 | 14 |
| | C | 20 | 20 | 21 | 21 | 22 | 22 | 23 | 23 | 24 | 24 |
| | D | 30 | 30 | 31 | 31 | 32 | 32 | 33 | 33 | 34 | 34 |
| 120(1) | E | 01 | 00 | 02 | 01 | 03 | 02 | 04 | 03 | 00 | 04 |
| | A | 12 | 10 | 13 | 11 | 14 | 12 | 10 | 13 | 11 | 14 |
| | B | 23 | 20 | 24 | 21 | 20 | 22 | 21 | 23 | 22 | 24 |
| | C | 34 | 30 | 30 | 31 | 31 | 32 | 32 | 33 | 33 | 34 |
| 120(2) | D | 02 | 00 | 03 | 01 | 04 | 02 | 00 | 03 | 01 | 04 |
| | E | 14 | 10 | 10 | 11 | 11 | 12 | 12 | 13 | 13 | 14 |
| | A | 21 | 20 | 22 | 21 | 23 | 22 | 24 | 23 | 20 | 24 |
| | B | 33 | 30 | 34 | 31 | 30 | 32 | 31 | 33 | 32 | 34 |
| 120(3) | C | 03 | 00 | 04 | 01 | 00 | 02 | 01 | 03 | 02 | 04 |
| | D | 11 | 10 | 12 | 11 | 13 | 12 | 14 | 13 | 10 | 14 |
| | E | 24 | 20 | 20 | 21 | 21 | 22 | 22 | 23 | 23 | 24 |
| | A | 32 | 30 | 33 | 31 | 34 | 32 | 30 | 33 | 31 | 34 |
| 120(4) | B | 04 | 00 | 00 | 01 | 01 | 02 | 02 | 03 | 03 | 04 |
| | C | 13 | 10 | 14 | 11 | 10 | 12 | 11 | 13 | 12 | 14 |
| | D | 22 | 20 | 23 | 21 | 24 | 22 | 20 | 23 | 21 | 24 |
| | E | 31 | 30 | 32 | 31 | 33 | 32 | 34 | 33 | 30 | 34 |

FIG. 24

| Index $k$ of switch unit 240(k,p) | | | | | |
|---|---|---|---|---|---|
| 0 | 1 | 2 | 3 | 4 | |
| 8 | 2 | 4 | 2 | 2 | |
| 0 | 5 | 7 | 5 | 2 | |
| 4 | 4 | 0 | 4 | 8 | |
| 8 | 2 | 8 | 12 | 6 | ← 4540 Downstream control time-slot |
| 0 | 1 | 2 | 3 | |

Outlet port of switch unit 240(k,p)

Downstream vacancy matrix 4520

FIG. 45

NETWORK WITH A FAST-SWITCHING OPTICAL CORE

CROSS REFERENCE TO RELATED APPLICATIONS

The present application claims the benefit of provisional application Ser. No. 60/869,562 filed Dec. 12, 2006.

FIELD OF THE INVENTION

The present invention relates to a high-capacity network employing fast-switching optical core nodes.

BACKGROUND

Present wide-coverage networks are generally multi-hop networks of large diameter where a path may traverse several core nodes from one edge node to another. Such networks employ switching nodes of moderate dimensions and have performance challenges. In particular, a multi-hop packet-switching network suffers from cumulative performance degradation as a path from source to destination traverses numerous router-switches. In order to facilitate the introduction of envisaged broadband services, it is of paramount importance that the network diameter be reduced. It is highly desirable that a path from one edge node to another traverse only one core node. It is also desirable, given the dominance of fiber-optic transport, that modulated optical carrier signals received at a core node be switched towards its destination edge node without the need for extracting the baseband signals for switching in the electronic domain followed by modulating optical carriers.

The Need for a New Network Structure

The Internet was designed to route individual packets from a source to a sink where each packet carries an identifier of its sink and, preferably, an identifier of its source. The packets are handled by devices called routers. The function of a router is to identify the sink of each packet it receives and to select a subsequent router to which it forwards a packet en route to destination.

A router has input ports for receiving packets from subtending sources and output ports for forwarding packets to subsequent routers towards destination. The number of input ports and output ports define a "dimension" of a router. A router has a switching fabric for directing incoming packets to respective output ports. The capacity of a router is determined by the capacity of the switching fabric which, in turn, limits the collective capacities of the input ports and output ports of the router. A router also has a processing system, which may include several processing units, to parse incoming packets, determine their destinations, and select an output port for each packet using a forwarding table. The number of packets per second that can be handled by the processing system determines the "throughput" of the router. Conventional routers were generally of low dimension, low capacity, and low throughput. The low capacity was dictated by the size and speed limitations of electronic devices. The low throughput was dictated by the processing limitations, considering the complex Internet addressing scheme which requires a tedious process of deciphering the destination or source address of each packet. The low dimension is a direct consequence of both the low capacity and low throughput. With routers of small dimensions, the network "diameter" can be significantly large. The diameter of a network is a measure of the traffic-weighted mean number of switching nodes (such as routers) traversed by a packet from source to destination. It is well known that the diameter of a network significantly affects the cost and, more importantly, the performance of the network.

The structure of any network is significantly influenced by the capabilities of its building blocks and the method of routing data from sources to sinks through the network is significantly influenced by the network structure. The efficiency and performance of a network are decided by the network structure and the routing scheme. In particular, network performance is very sensitive to the method of routing. Packets are routed through the internet using what may appear to be a very simple hop-by-hop method where every router uses a forwarding table to direct each packet it receives to a subsequent router, selected according to a specified destination of the packet. At the subsequent router, the packet is either placed in a buffer or discarded if the buffer is full. The apparent simplicity of this primitive routing method actually leads to a very complex overall control scheme, very low network efficiency, and poor performance in terms of data loss and delay jitter.

Several attempts have been made to overcome the deficiencies of the Internet. However, instead of addressing the main problem, which is the infrastructure, performance issues were handled by introducing complex protocols. Complex protocols, in turn, resulted in complex routers. The result is a complex network that cannot realize the vision of an omnipresent multi-grained high-performance network. Such a network is now badly needed to revive the telecommunications industry and spur economic growth.

Eventually, change has to happen to enhance the Internet, or better yet, create an entirely new Global network of high quality and broadband capability. The change would be motivated—at least in part—by significant advances in access technology in both wireless and wireline media. The high access capacity would call for a tidy high-capacity wireline network core which is currently unavailable.

There is a need, therefore, for a high-capacity network of small diameter that employs fast-switching optical core nodes. Steps toward creating a high-capacity network of small diameter are described in the following:

(1) U.S. Pat. No. 6,486,983, "Agile Optical-core Distributed Packet Switch";
(2) U.S. Pat. No. 6,570,872, "Self-configuring distributed switch";
(3) U.S. Pat. No. 6,876,649, "High-Capacity WDM-TDM Packet Switch";
(4) U.S. Pat. No. 6,882,799, Apr. 19, 2005, "Multi-grained network";
(5) U.S. Pat. No. 6,920,131, "Global Distributed Switch";
(6) U.S. Pat. No. 2006/0126,996, "Balanced Bufferless Switch"; and
(7) EP1087635B1, "High-Capacity WDM-TDM Packet Switch".

SUMMARY

A main objective of the present invention is to provide a network that scales gracefully to a high capacity and enables multi-granular services of widely varying flow rates while employing fewer network elements.

The present invention provides a network comprising a plurality of independent fast-switching optical switch planes and a plurality of edge nodes. A path between two edge nodes need not traverse more than one switch plane, thus greatly simplifying routing and control. Communications from an edge node to another may use multiple paths, each path traversing one of the switch planes. Each switch plane may be configured in a mesh structure of optical switch units and has at least one dual channel from each edge node.

A switch plane has a plurality of inlet ports and a plurality of outlet ports. Each switch plane is fully-connected, providing a path from each switch unit to each other switch unit. However, a switch plane need not be fully agile. Each edge node has an upstream channel to an inlet port in each switch plane and a downstream channel from an outlet port of each switch plane. The inlet ports of each switch plane are divided into inlet-port groups which receive upstream channels from orthogonal combinations of edge nodes.

A switch plane may be centralized with collocated switch units or distributed with at least two of its switch units spread over a wide geographic area. A centralized switch plane has the advantage of simplifying transmission-time coordination and a distributed switch plane has the advantage of better switch-unit proximity to connecting edge nodes. The network may comprise both centralized and distributed switch planes.

In accordance with one aspect, the present invention provides a communications network comprising: a set of switch units; a plurality of source nodes; and a plurality of sink nodes. The switch units are arranged in switch planes, where each switch plane comprises a subset of the switch units interconnected in a full-mesh structure so that each switch unit in a switch plane has at least one dual channel to each other switch unit in the same switch plane. Each source node connects to a switch unit in each switch plane through at least one upstream channel in a manner which results in any set of source nodes connecting to any switch unit and any other set of source nodes connecting to any other switch unit to have a number of common source nodes not exceeding a predefined upper bound. Each sink node connects to specific switch units, one specific unit in each switch plane, through at least one downstream channel.

The switch units in a subset of switch units forming a switch plane are assigned switch-unit identifiers, where switch-unit identifiers in any switch plane are mirrored in each other switch plane. The specific switch units to which a sink node connects have identical switch-unit identifiers within their respective switch planes. The predefined upper bound of the number of common source nodes in source-node sets connecting to different switch units is preferably a small number. A result of using an upper bound of one common source node is that any pair of source nodes connects at most once to a common switch unit.

In one realization of the network, the switch units of each subset of switch units forming a switch plane are collocated with negligible propagation delay, or accurately measurable propagation delay, between each switch unit and each other switch unit of the same switch plane.

Each switch plane comprises a switch-plane controller and a number of configuration controllers. Each configuration controller is associated with each switch unit of the switch plane and receives switch-fabric-configuration instructions from the switch-plane controller. Each switch-plane controller further comprises: a master time indicator; a time-locking circuit for receiving time indications from the each source node, and communicating time-locking instructions to a sink node communicatively coupled to the each source node. Each source node comprises a slave time indicator associated with the at least one upstream channel. The slave time indicator of a source node exchanges time indications with the time-locking circuit for time-locking the source node to the master time indicator.

Each source node sends the time indications to a time-locking circuit of a switch-plane controller during a first reserved time slot, in the predefined slotted time frame. The first reserved time slot is specific to a combination of a source node and a switch-plane controller.

The time-locking circuit sends the time-locking instructions to the source node, through a sink node associated with the source node, during a second reserved time slot which is specific to the combination of the sink node and the switch-plane controller.

The switch-plane controller connects to at least one control channel from at least one switch unit of each switch plane, for receiving upstream control signals from the plurality of source nodes, and connects to at least one control channel to at least one switch unit of each switch plane, for transmitting downstream control signals to the plurality of sink nodes. In order to facilitate control, the switch-plane controller of a switch plane maintains an inlet-identification array for each control channel receiving upstream control signals, and an outlet-identification array for each control channel carrying downstream control signals. Each entry an inlet-identification array corresponds to a time slot in a predefined time frame and contains an identifier of an inlet port of a switch unit of the switch plane. Each entry of an outlet-identification array corresponds to a time slot in the predefined time frame and contains an identifier of an outlet port of a switch unit in the switch plane.

In one mode of operation, the source nodes communicate time-division multiplexed data segments to the sink nodes through the switch planes. A source node may receive packets of variable sizes from data sources and assembles received packets into data segments of equal sizes. The source node selects a switch plane and transmits an upstream control signal to a switch-plane controller of the selected switch plane during a first dedicated time slot in the predefined time frame corresponding to the source node and the selected switch plane. The switch-plane controller transmits a downstream control signal to a sink node during a second dedicated time slot, in the predefined time frame, corresponding to the selected switch plane and the sink node.

The upstream control signal may comprise a connection request specifying a destination sink node and a number of time slots per time frame. The switch-plane controller uses the inlet-identification array corresponding to the control channel to identify the inlet port of the selected switch plane at which the upstream control signal is received. The switch-plane controller uses the outlet-identification array corresponding to the destination sink node to identify an outlet port of the switch plane having a downstream channel to the destination sink node.

If the identified inlet port and outlet port reside on a common switch unit, the switch-plane controller performs a first-order time-slot-matching process. If the first-order time-slot-matching process is successful, the switch-plane controller communicates a result, which includes identifiers of allocated time slots, to the destination sink node through the identified outlet port.

If the identified inlet port and outlet port reside on different switch units, the switch-plane controller performs a second-order time-slot matching process. If the second-order time-slot-matching process is successful, the switch-plane controller communicates a result, which includes identifiers of allocated time slots, to the destination sink nodes through the identified outlet port.

The switch planes may be geographically distributed to form a wide-coverage network. However, two or more switch planes may be collocated. In some applications, it may be desirable that all the switch-planes be collocated to create a large-scale switching node.

In order to exploit wavelength-division-multiplexing economy, upstream wavelength routers may be used to connect the source nodes to the switch units and downstream wavelength routers may connect the switch units to the sink nodes. Thus, a group of source nodes selected from among the plurality of source nodes may share an upstream wavelength router to connect to a number of switch planes. A downstream wavelength router may connect several switch units in a switch plane to a group of sink nodes selected from among the plurality of sink nodes.

An upstream channel connecting a source node to a switch unit in a switch plane is preferably routed through one of the upstream wavelength routers and a wavelength demultiplexer. A downstream channel connecting a sink node to a switch unit in a switch plane is preferably routed through a wavelength multiplexer and one of the downstream wavelength routers.

Preferably, the switch units of each plane are fast-switching optical switches. However, a switch plane may comprise electronic space switches. In particular, the use of scalable latent space switches enable realization of a network of very high capacity and very wide coverage. A latent space switch comprises: an array of transit memory devices; a first rotator connecting a plurality of input channels to the array of transit memory devices; and a second rotator connecting the array of transit memory devices to a plurality of output ports.

Each source node from among the plurality of source nodes may be communicatively coupled to a sink node from among the plurality of sink nodes to facilitate two-way communication between a switch-plane controller and source nodes. A source node may further be fully integrated with a sink node, to share memory and processors.

In accordance with another aspect, the present invention provides a communications network comprising: a set of switch units; a plurality of source nodes; and a plurality of sink nodes. The switch units are arranged in switch planes, where each switch plane comprises a subset of the switch units interconnected in a full-mesh structure so that each switch unit in a switch plane has at least one dual channel to each other switch unit in the same switch plane. Each source node connects to a specific switch unit in each switch plane through at least one upstream channel. Each sink node connects to a switch unit in each switch plane through at least one downstream channel in a manner which results in any set of sink nodes connecting to any switch unit and any other set of sink nodes connecting to any other switch unit to have a number of common sink nodes not exceeding a predefined upper bound.

In accordance with a further aspect, the present invention provides a communications network comprising: a set of switch units; a plurality of source nodes; a plurality of sink nodes; a plurality of upstream wavelength routers; and a plurality of downstream wavelength routers.

The switch units are arranged in switch planes, each switch plane comprising a subset of the switch units. Each switch unit in a switch plane connects to each other switch unit in the switch plane to form a full-mesh structure. Each upstream wavelength router connects a first number of source nodes selected from among the plurality of source nodes to a second number of wavelength demultiplexers where each wavelength demultiplexer connects to one of the switch planes. Each downstream wavelength router connects a third number of wavelength multiplexers to a fourth number of sink nodes, selected from among the plurality of sink nodes, where each wavelength multiplexer connects to switch units in one of the switch planes.

Each source node connects to a switch unit in each switch plane through at least one upstream channel routed through one of the upstream wavelength routers. The upstream wavelength routers are configured so that a set of source nodes connecting to any switch unit and a set of source nodes connecting to any other switch unit have a number of common source nodes not exceeding a predefined upper bound.

Each sink node in the plurality of sink nodes may be paired with a source node from among the plurality of source nodes. Switch units of each switch plane are assigned switch-unit identifiers which are mirrored in each other switch plane, and each sink node has at a downstream channel from each of switch units of identical switch-unit identifiers. Alternatively, with source nodes and sink nodes arranged in pairs, each pair may connect to a same switch unit in each switch plane.

In accordance with a further aspect, the present invention provides a communications network comprising: a set of switch units and a plurality of edge nodes. The switch units are arranged into $\Pi>1$ switch planes indexed as 0 to $(\Pi-1)$. Each switch plane comprises a subset of $G>1$ switch units interconnected in a full-mesh structure, and switch units of each switch plane are indexed as 0 to $(G-1)$. G is a prime number.

The edge nodes are arranged into G edge-node groups with each edge-node group comprising at most $Q>1$ edge nodes. Edge nodes within an edge-node group $\gamma$, $0 \leq \gamma < G$, are indexed as $(j, \gamma)$, $0 \leq j < Q < G$.

The connectivity of switch units to edge nodes is selected such that a switch unit of index k, $0 \leq k < G$, in switch plane p, $0 \leq p < \Pi$, has at least one upstream channel from each of at most Q edge nodes of indices $(j, k+p+j \times p)$, $0 \leq j < Q$, and at least one downstream channel to each of at most Q edge nodes of indices $(j, k)$.

Thus, the switch units of the network connect, in the upstream direction, to orthogonal groups of edge nodes. In contrast, switch units having the same relative position in their respective switch planes connect, in the downstream direction, to a respective common group of edge nodes.

In accordance with a further aspect, the present invention provides a communications network comprising: a plurality of edge nodes and a set of switch units. The edge nodes are grouped into $G>1$ edge-node groups, G being a prime number, where each edge-node group comprises at most $Q>1$ edge nodes, and edge nodes within an edge-node group $\gamma$, $0 \leq \gamma < G$, are indexed as $(j, \gamma)$, $0 \leq j < Q$. The switch units are arranged into $\Pi>1$ switch planes indexed as 0 to $(\Pi-1)$. Each switch plane comprises a subset of $G>1$ switch units interconnected in a full-mesh structure. The switch units of each switch plane are indexed as 0 to $(G-1)$.

A connection pattern of the edge nodes to the switch units is devised such that an edge node of index $(j, \gamma)$, $0 \leq j < Q < G$, $0 \leq \gamma < G$, has at least one upstream channel to a switch unit of index $((G-1-j)p+\gamma)_{modulo\ G}$, in each switch plane p, $0 \leq p < \Pi$, and at least one downstream channel from a switch unit of index $\gamma$ in each switch plane p, $0 \leq p < \Pi$.

With this connection pattern, a subset of source nodes connecting to each switch unit is orthogonal to a subset of source nodes connecting to each other switch unit in the set of switch units and a subset of sink nodes connecting to each switch unit in each switch plane connects to one switch unit in each other switch plane.

Each switch unit in each switch plane has $N>2$ provisioned dual ports including Q outer dual ports communicatively coupled to one of the edge-node groups and $(G-1)$ inner dual ports connecting to other switch units of the each switch plane. The value of G is selected as a prime number not exceeding $(N \times \eta/(\eta+1))+1$, and the value of Q is determined as $Q \leq \lfloor (G-1)/\eta \rfloor$, where $\eta$ is a predefined minimum expansion factor and $\lfloor y \rfloor$ denotes an integer part of a real number y. A preferred value of $\eta$ is 1.2.

The edge nodes may exchange data segments through the Π>1 switch planes. Preferably, the data segments are time-multiplexed in a cyclic time frame. The number of time slots in a time frame is selected to be at least equal to the maximum number, Q, of edge nodes connecting to a single switch unit.

In accordance with a further aspect, the invention provides a method of connecting a plurality of edge nodes to a plurality of switch planes, where each switch plane has a plurality of inlet ports and a plurality of outlet ports and where each edge node has an upstream channel to an inlet port in each switch plane and a downstream channel from an outlet port of each switch plane. The method comprises steps of grouping inlet ports of each switch plane into inlet-port groups and connecting upstream channels from orthogonal combinations of edge nodes to the inlet-port groups.

In accordance with a further aspect, the invention provides a method of switching performed at a switch-plane controller of a modular switch plane having a plurality of switch units. The method comprises steps of: providing, in a predefined time frame, a dedicated upstream control time slot and a dedicated downstream control time slot for each edge node in a plurality of edge nodes; receiving during a first upstream control time slot a first control signal specifying a destination edge node, a terminal address, and a number of time slots per time frame; identifying a source edge node corresponding to the first upstream control time slot; determining a first downstream control time slot corresponding to the source edge node; performing a path search through the switch plane; and transmitting during the first downstream time slot a result of the path search. The path search comprises steps of: identifying, in the switch plane, an inlet port at which the first upstream control signal is received and an outlet port having a downstream channel to the destination edge node; performing a first-order time-slot-matching process when the inlet port and the outlet port belong to a common switch unit; and performing a second-order time-slot matching process when the inlet port and the outlet port connect to different switch units.

BRIEF DESCRIPTION OF THE DRAWINGS

Embodiments of the present invention will be further described with reference to the accompanying exemplary drawings, in which:

FIG. 9 illustrates symmetrical upstream and downstream connection of channels from edge nodes to switch units of a switch plane of a network where orthogonal combinations of edge nodes connect to the switch units in both the upstream and downstream directions;

FIG. 10 illustrates scattered upstream or downstream channel connections to switch units in an exemplary network using switch planes of the type illustrated in FIG. 2 according to an embodiment of the present invention;

FIG. 11 illustrates preferred an arrangement asymmetrical connections of upstream and downstream channels in accordance with an embodiment of the present invention;

FIG. 12 illustrates scattered upstream or downstream channel connections to switch units in a network with the connection pattern of FIG. 11 according to an embodiment of the present invention;

FIG. 13 further illustrates connectivity in the arrangement of FIG. 11;

FIG. 24 illustrate wavelength assignments based on the connectivity pattern of FIG. 11 realized using the wavelength routers of FIGS. 22 and 23;

FIG. 45 illustrates a vacancy-state matrix for tracking the number of vacant time slots per outlet port of switch-plane in accordance with an embodiment of the present invention.

DETAILED DESCRIPTION

Terminology

Figure 1:
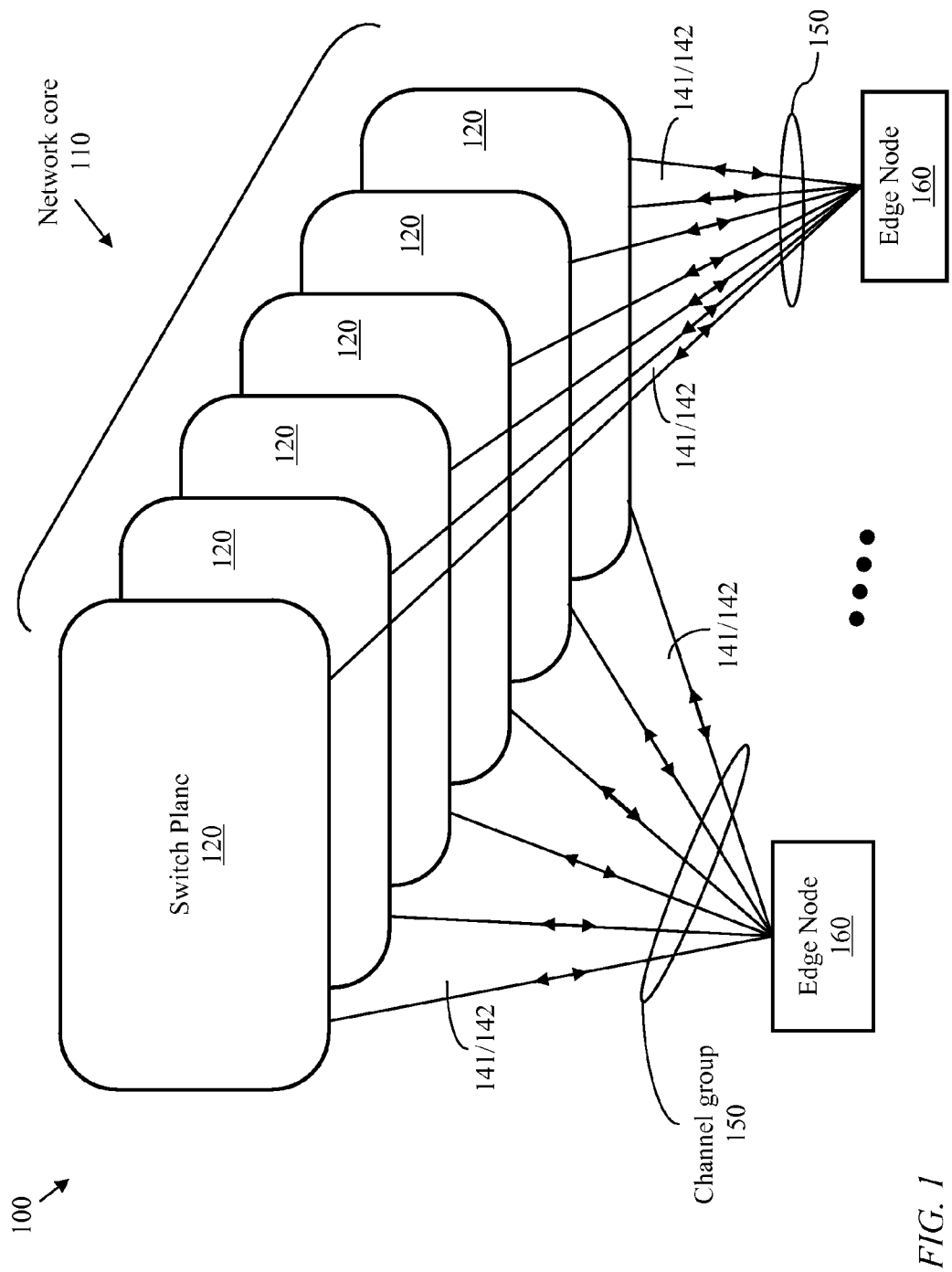
FIG. 1 illustrates a network according to an embodiment of the present invention comprising edge nodes interconnected through bufferless, modular, low-latency switch planes of large dimension with each switch plane being fully-connected but not necessarily fully agile.

Switch unit: A switch unit is the basic building block of a core switching node. The switch unit used in the present invention has multiple input ports and multiple output ports. By definition, a switch unit is internally non-blocking, thus guaranteeing an internal path from any unoccupied input port to any unoccupied output port.

Switch dimension: The dimension of a switching-routing device is determined as the larger of the number of input ports and the number of output ports.

Order of a matching process: A first-order matching process, for a connection requesting a single time slot or multiple time slots, requires each time slot to be free in two corresponding ports. A second-order matching process, for a connection requesting a single time slot or multiple time slots, requires each time slot to be free in three corresponding ports (i.e., along two channels). A third-order matching process, requesting a single time slot or multiple time slots, requires each time slot to be free in four corresponding ports (i.e., along three channels).

Switch plane: A switch plane comprises at least one switch unit. Multiple switch units may be interconnected to form a switch plane of a larger dimension. The switch units of a switch plane may be collocated or geographically distributed.

Mirrored switch planes: Two switch planes having the same number of identical switch units and the same interconnection pattern of switch units are said to be mirrors of each other. A switch unit in one of the switch planes and a counterpart switch unit in the other switch plane may have similar identifiers relative to their respective switch planes.

Fully-connected switch: A fully-connected switch has a plurality of input ports and a plurality of output ports and provides at least one path from each input port to each output port.

Fully-agile Switch: A fully-agile switch (also called a complete switch) is a fully-connected switch capable of allocating paths from any set of input ports to any set of output ports, where the combined capacity of the paths equals the lesser of the combined capacity of the set of input ports and the combined capacity of the set of output ports. Thus, a fully-agile switch can accommodate any spatial variation of incoming traffic loads; however internal blocking may take place under certain traffic conditions. A full-mesh interconnection of bufferless switch units functions as a fully-agile switch if a complex third-order matching process is used.

Non-blocking switch: A non-blocking switch is a fully-agile switch with no internal blocking under any traffic condition.

Fully-connected switch plane: A fully-connected switch plane has a path from each switch unit to each other switch unit.

Fully-agile Switch plane: A fully-agile switch plane (also called a complete switch plane) is a fully-connected switch plane capable of allocating sufficient paths to transfer data between switch units regardless of the spatial distribution of traffic.

Collocated switch units: Two or more switch units are said to be collocated if the propagation delay from each switch unit to each other switch unit is negligibly small or if the propagation delays for all switch-unit pairs can be equalized.

Source node: A source node switches signals received from a respective set of subtending data sources to at least one switch plane.

Sink Node: A sink node switches signals received from at least one switch plane to a respective set of subtending data sinks.

Edge node: A source node may be paired with a sink node to form an edge node. Thus, an edge node functions as a source node (source edge node) and a sink node (sink edge node). Typically, data sources and data sinks are also paired into terminals each terminal functioning as a data source and a data sink. An edge node may support a set of data sources and a set of data sinks which may be paired into a set of terminals.

Outer port: An outer port of a switch plane, or any of its constituent switch units, is an input port (inlet port) that receives signals from an external source or an output port (outlet port) that transmits signals to an external sink.

Inner port: An inner port of a switch unit in a switch plane that comprises multiple interconnected switch units is an input port (inward port) that has a channel from another switch unit of the same switch plane, or an output port (outward port) that has a channel to another switch unit of the same switch plane.

Inlet port: An input port of a switch plane is identified as an 'inlet port'. If the switch plane comprises multiple switch units, then an outer input port of a switch unit is also termed an "inlet port".

Outlet Port: An output port of a switch plane is identified as an 'outlet port'. If the switch plane comprises multiple switch units, then an outer output port of a switch unit is also termed an "outlet port".

Inward Port: An inner input port of a switch unit within a switch plane that comprises multiple interconnected switch units is called an inward port.

Outward Port: An inner output port of a switch unit within a switch plane that comprises multiple interconnected switch units is called an outward port.

Inlet Channel: A communications channel (e.g., a wavelength channel) from an external source to an inlet port of a switch plane is termed an "inlet channel".

Outlet Channel: A communications channel from an outlet port of a switch plane to an external sink is termed an "outlet channel".

Dual port: An input port and an output port may be paired to form a dual port. The input port and output port of a dual port may share resources, such as memory and processors.

Dual channel: A dual channel comprises two channels of opposite transmission directions.

Upstream direction: The direction from an edge node to a core node (switch unit) is called an upstream direction.

Downstream direction: The direction from a core node (switch unit) to an edge node is called a downstream direction.

Network coverage: The number of edge nodes that can be supported by the network defines the network's coverage.

Network capacity: The lesser of the total capacity of ingress ports of all edge nodes and the total capacity of egress ports of all edge nodes define the network's capacity.

Wavelength router: A wavelength router is a device connecting a plurality of wavelength-division-multiplexed (WDM) input links to a plurality of WDM output links where each WDM output link includes a wavelength channel from each WDM input link.

Data stream: A data stream represents data from a subset of data sources of a single source node destined to a subset of data sinks of a single sink node. A source node and a sink node define a source-sink pair. The flow rate of a data stream may vary significantly both temporally and spatially for different source-sink pairs. The flow rate may be zero for a large proportion of source-sink pairs, and may exceed the capacity of a single wavelength channel (typically 10 Gb/s) for other source-sink pairs. Each source node periodically determines the flow rate of a data stream to each sink node. Preferably, a data stream of a flow rate exceeding a predefined threshold, which may be an order of magnitude larger than the capacity of a wavelength channel, is divided into multiple data streams. However, the division of a data stream is performed under the constraint that data from a single data source destined to a single data sink belongs to a single data stream. A data stream is routed through a selected switch plane and an appropriate number of time slots per time frame is scheduled for the data stream through the selected switch plane.

Inlet-outlet pair: An inlet port of a switch unit and an outlet port of the same switch unit define a neighboring inlet-outlet pair. An inlet port of a switch unit in a switch plane and an outlet port of a different switch unit in the same switch plane define an ordinary inlet-outlet pair. The term inlet-outlet pair is used herein when a distinction between a neighboring inlet-outlet pair and an ordinary inlet-outlet pair is not necessary. A switch plane is reconfigured to adapt the number of time slots, per time frame, allocated to each ordinary inlet-outlet pair as traffic patterns change. With the connectivity arrangements illustrated in FIGS. 5-14, a source edge node may connect to a sink edge node through a neighboring inlet-outlet pair in one of the switch planes. The edge controllers preferably select routes which traverse neighboring inlet-outlet pairs in order to maximize the proportion of traffic switched through a single switch unit.

List of Reference Numerals

100: A network having core switch planes each comprising fast-switching optical switch units

110: Network core comprising Π>1 parallel switch planes 120

120: Switch planes in network core 110 (individually or collectively); further individually identified—where necessary—as 120(p), 0≦p<Π

141: Individual upstream channel connecting an edge node 160, directly or through a wavelength router, to network core 110

142: Individual downstream channel connecting network core 110, directly or through a wavelength router, to an edge node 160

150: Group of dual channels

160: Edge nodes in network 100 (individually or collectively), optionally arranged in G>2 groups each group comprising at most Q>0 edge nodes; an edge node may further be identified individually as 160(j, γ), 0≦j<Q, 0≦γ<G

240: Switch unit in switch plane 120 (individually or collectively), a switch plane 120(p) comprises G>2 switch units 240; a switch unit may be individually identified as 240(k, p), 0≦k<G, 0≦p<Π

251: Outward channel from an outward port of a switch unit 240 to an inward port of another switch unit 240; an outward channel connecting a switch unit 240(x, p) to switch unit 240(y, p) may be further identified as 251(x, y)

252: Inward channel to an inward port of a switch unit 240 from an outward port of another switch unit 240—an outward channel 251 from a switch unit 240 is an inward channel 252 to another switch unit 240

322: Inlet port of a switch unit 240

324: Inward port of a switch unit 240

326: Outlet port of a switch unit 240

328: Outward port of a switch unit 240

384: Configuration controller (a slave controller) of a switch fabric of switch unit 240

425: Wavelength routers, individually identified as 425(γ), 0≦γ<G, each connecting a group γ, from among G>1 groups of edge nodes 160, to switch planes 120

440: An upstream link having multiple upstream channels 141 connecting an edge node 160 to wavelength router 425

450: A downstream link having multiple downstream channels 142 connecting a wavelength router 425 to an edge node 160

460: An upstream link having multiple wavelength channels connecting wavelength router 425 to a switch plane 120

470: A downstream link having multiple wavelength channels connecting wavelength router 425 to a switch plane 120

620: Array representing connectivity of a switch unit 240

622: Internal path within a switch unit 240

625: Direct path in a switch plane 120

630: An entry in array 620 identifying an edge node connecting to an inlet port of a switch unit 240

640: An entry in array 620 identifying an edge node connecting to an outlet port of a switch unit 240

900: Table indicating connectivity of switch units 240 in five switch planes 120

912: Identifier of an edge node 160 originating an upstream channel

914: Identifier of an edge node 160 terminating a downstream channel

1512: A node in a network having a plurality of nodes

1516: A set of nodes 1512 within the plurality of nodes; a set 1516 may intersect another set 1516, i.e., the two sets 1516 have a common node 1512

1616: A set of nodes 1512, a set 1616 does not intersect any other set 1616, i.e., none of the nodes 1512 in a set 1616 is a member of another set 1616

1720: A set of source nodes (or edge nodes) connecting to a switch unit 240($k,p$) in switch plane 120($p$), $0 \leq p < \Pi$

1920: Edge-node group 1920 corresponding to switch-unit 240($k,p$), $0 \leq k < G$, $0 \leq p < \Pi$

2120: Orthogonal source-node sets, 2120($k$), connecting to switch units 240($k, p$), $0 \leq k < G$, $0 \leq p < \Pi$

2400: Table indicating wavelength channels bands at the output of the wavelength routers connecting edge nodes to switch planes

2410: Identifier of a spectral band defining a wavelength channel

2412: Identifier of an edge node having an upstream channel to a switch unit 240($k,p$) of a switch plane 120($p$)

2414: Identifier of an edge node having an downstream channel from switch unit 240($k,p$) of a switch plane 120($p$)

2420: A row in table 2400 corresponding to a set of edge nodes 160 connecting to different switch units 240 in a switch plane 120

2540: Wavelength demultiplexers (also 2640, 2740, 2840, and 2940)

3025: Wavelength router having five input links and five output links

3200: A network of the type of network 100 comprising 20 edge nodes 160, five switch planes 120, five primary wavelength routers 3220 and five secondary wavelength routers 3240

3220: A primary wavelength router in network 3200

3240: A secondary wavelength router in network 3200

3320: An upstream wavelength router

3340: An array of wavelength demultiplexers

3420: A downstream wavelength router

3440: An array of wavelength multiplexers

3580: Switch-plane controller connecting to at least one switch unit 240

3588: A channel, connecting a switch unit 240 to switch-plane controller 3580, carrying time-multiplexed control signals received from edge nodes 160

3589: A channel, connecting switch-plane controller 3580 to a switch unit 240, carrying time-multiplexed control signals from the switch-plane controller 3580 to edge nodes 160

3620: Dedicated links from a switch-plane controller 3580 to configuration controllers (slave controllers) 384 of switch units 240 of a centralized switch plane 120

3682: time-locking circuitry associated with switch-plane controller 3580

3686: an optical-electrical-optical conversion unit associated with a dual control channel connecting a switch unit 240 to a switch-plane controller 3580

3700: predefined slotted time frame

3720: time slot in time-frame 3700 permanently reserved for control signals

3730: time slot in time-frame 3700 adaptively allocated to payload signals

3985: A controller of two or more switch planes 120

3988: A dual channel from controller 3985 to a switch unit 240

4020: a switch plane similar to switch plane 120 but having switch units 240 that are geographically distributed over a wide geographic area

4045: a retiming-rescheduling unit associated with each inward port of each switch unit 240 in switch plane 4020

4051: Channel connecting an outward port of a switch unit 240 to a retiming-rescheduling unit associated with an inward port of another switch unit 240

4090: switch-unit controller associated with each switch unit 240 in distributed switch plane 4020

4182: Temporal multiplexer

4183: Temporal demultiplexer

4225: A primary wavelength router connecting a group of edge nodes 160 to network core

4235: A multiplexer-demultiplexer connecting primary wavelength routers 4225 to switch units 240 of a network's core

4312: An array having a number of cells equal to the number $\nu$ of time slots per time each cell storing an identifier (j,$\gamma$) of a source edge node 160($j,\gamma$) which transmits control signals to the switch-plane controller 3580 during a corresponding reserved time slot

4314: A cell in array 4312

4316: An array having a number of cells equal to the number $\nu$ of time slots per time frame each cell storing an identifier (x,y) of an inlet port 322 of a switch unit 240 to which source edge node 160($j,\gamma$) connects, where x is a relative inlet-port number, $0 \leq x < Q$, of a switch unit 240($y,p$), $0 \leq y < G$

4318: A cell in array 4316

4350: Cyclical time frame organized into a number $\nu$ of time slot

4370: A matrix associating each outlet port in a switch plane with a control time slot

4375: An entry in matrix 4370 indicating a downstream control time slot

4480: An upstream control signal

4481: A first field in control signal 4480 indicating a purpose (type) of the signal

4482: A second field in control signal 4480 identifying a destination edge node in a connection request

4483: A third field in control signal 4480 indicating a number of time slots per time frame required for a connection

4484: A fourth field in control signal 4480 containing an indication of a time at which the control signal has been sent from the respective edge node

4485: A fifth field in control signal 4480 containing a cyclic connection number provided by the switch-plane controller 3580

4486: A sixth field in control signal 4480 containing an identifier of a terminal within a local access network connected to the destination edge node identified in field 4482

4520: A vacancy-state matrix storing a number of vacant time slots in a time frame per outlet port of switch-plane 120

4540: An entry in matrix 4520

4612: A vacancy-state matrix having a number of column equal to the number of inlet ports of a switch unit 240 and a number of rows equal to the number of time slots per time frame 4614: A vacancy-state matrix having a number of column equal to the number of outlet ports of a switch unit 240 and a number of rows equal to the number of time slots per time frame 4616: A vacancy-state matrix having a number of column equal to the number of switch units 240 per switch plane 120, minus one, and a number of rows equal to the number of time slots per time frame 4622: Header of matrix 4612

4624: Header of matrix 4614

4626: Header of matrix 4616

4632: Entry in matrix 4612 indicating free/busy state of an inlet port of a switch unit 240 during a time slot 4634: Entry in matrix 4614 indicating free/busy state of an outlet port of a switch unit 240 during a time slot 4636: Entry in matrix 4612 indicating free/busy state of an inner channel connecting an outward port of a switch unit 240 to an inward port of another switch unit 240 during a time slot Network Structure It is well known that structural simplicity reduces network cost and improves its performance. Reducing a network's diameter significantly simplifies the network's structure. A network of a small diameter permits devising routes of a small number of hops each, thus enabling fast connection-setup and rapid rerouting.

A network of small diameter necessitates the use of core nodes of large dimension and flexible edge nodes which scale gracefully. Deployment of such edge and core nodes enables the construction of a global broadband network of virtually unlimited capacity while significantly reducing the number of hops between any two access points on the planet to an acceptable upper bound. The sought network preferably accommodates individual connections of widely varying granularities, ranging from a few kilobits per second per user to multiple gigabits per second per user in order to form the basis of an economical monolithic broadband network of global coverage.

It is well known that the mean number of hops per route decreases sharply as the dimensions of the deployed edge nodes and core nodes are increased. Recent advances in the art of switch-design enable the construction of electronic switching nodes that scale gracefully to dimensions of the order of hundreds of thousands of ports and capacities of the order of hundreds of terabits per second. Such electronic switching nodes may be used in both the edge and the core. It is desirable however that the core nodes be fast-switching optical switching nodes to avoid the complexity of optical-to-electronic and electronic-to-optical conversions. Scalable fast-switching optical core nodes facilitate construction of an efficient high-performance network of small diameter.

A Global network, or a large sector of a Global network, may be viewed as a geographically distributed switch. A switch of high capacity and large dimension is, by necessity, a distributed switch comprising switch units of moderate capacity which may be interconnected in a variety of ways. Such a switch would also have a control system that may comprise numerous processing units. When the switch interconnects sources and sinks that are distributed over a wide area, the constituent switch units need be arranged into groups, each group constituting a switching node, and the resulting switching nodes are then interconnected to form a geographically distributed switch which is traditionally called a network. Control of a geographically distributed switch, becomes more intricate, in comparison with a localized switch of comparable capacity and dimension, due to propagation delays and signal degradation. For this reason, it is of paramount importance that the structure of a geographically distributed switch (a network) be as simple as possible to facilitate control without sacrificing transport efficiency.

A known distributed switch of simple structure comprises a plurality of electronic edge nodes interconnected through optical core nodes so that a path from an edge node to another edge node traverses only one core node. Such a path is herein called a direct path. Each edge node may have several direct parallel paths to each other edge node. To provide sufficient direct paths from each edge node to each other edge node, and using core nodes of equal dimension, the number of edge nodes in the network would be limited to equal the dimension of a core node. The edge nodes and the core nodes may be distributed over a wide geographic area.

An electronic edge node is preferably based on an electronic switch fabric and may include buffers for holding input and output data. Fast switching electronic nodes which may be scalable to a very high dimension and capacity are feasible with the present state of the art. For example, an electronic switch that scales to a dimension exceeding 10,000×10,000 is described in U.S. patent application Ser. No. 10/780,557 titled "Circulating Switch", publication number 2004-0165887, and a router-switch that scales to a much higher dimension and capacity is described in U.S. patent application Ser. No. 11/610,505 titled "Scalable Router-Switch", Publication number 2007-0153821.

Slow optical switches, such as optical switches based on micro-electromechanical (MEM) switch elements, are moderately scalable and may be used as core nodes. However, the use of slow-switching core nodes may force a significant proportion of traffic to use multiple hops traversing intermediate edge nodes. With the present state of the art, the realizable dimension of a single-stage fast optical switch is quite limited. Fast optical switches of larger dimension may be constructed as a cascaded structure or a mesh structure of switch units of moderate dimension. However, a cascaded or meshed structure of bufferless switch units requires executing a complex temporal matching process. It is therefore highly desirable to develop a network structure that uses fast-switching optical-core nodes of large dimension while circumventing complex temporal matching processes.

Switch-Plane Structure

Using fast-switching optical switch units of dimension 64×64, for example, with n<64 inward ports and n outward ports, a full mesh of (n+1) switch units each having (64−n) dual outer ports (a dual outer port includes an inlet port and an outlet port). The dimension of the switch plane is then (n+1)×(64−n). With n=32 for example, the dimension of the switch plane would be 33×32=1056. With port capacity of 10 Gb/s in each direction (input or output), the total access capacity (outer capacity) per switch plane would be 10.56 Tb/s (terabits per second).

In a network of full-mesh structure, a basic internal expansion of 2:1 (where the number of inner ports is double the number of outer ports) would be required to account for the use of two-link paths from one switch unit to another under extreme spatial traffic-imbalance conditions. This expansion does not account for negative effect of internal mismatch blocking due to misalignment of vacant time slots. However, with the use of well-known techniques of time-slot occupancy-packing, a relatively small additional expansion may result in reducing or eliminating mismatch blocking. For example, an expansion of the order of 2.1:1 may be adequate in a full-mesh structure.

In the network of the present invention, internal expansion in a full-mesh structure may not be required or a relatively small expansion would suffice because of the method adopted for allocating edge nodes to switch units in different switch planes. For example, an expansion of the order of 1.1:1 may be adequate. The allocation method also increases the opportunity of first-order connections, where edge nodes connecting to a given switch unit may connect directly through the switch unit, thus reducing the occupancy of the inner channels connecting the switch units. In the above example of a switch plane using switch units of dimension 64×64, the 64 dual ports may be divided into 30 outer dual ports (connecting to edge nodes) and 34 inner dual ports leading to an expansion ratio of 34/30. The number of switch units per switch plane is then 35 and dimension of a switch plane would be 30×35=1050, yielding a capacity of 10.5 terabits per second with port speed of 10 Gb/s.

Using edge nodes of dimension 128 each, for example, and dividing the dual ports of each edge node into 64 dual ports connecting to data sources and sinks, and 64 dual ports connecting to 64 switch planes, the total network capacity would be 64 times 10.50 Tb/s; approximately 672 Tb/s. Such a network would have 1050 edge nodes and 64 centralized switch planes. The centralized switch planes may be scattered over a wide geographic area. Using edge nodes of dimension 2048 each and dividing the dual ports of each edge node into 1024 dual ports connecting to data sources and sinks, and 1024 dual ports connecting to 1024 switch planes, the total network capacity would be 1024 times 10.50 Tb/s; approximately 10.70 Pbs (petabits per second). Such a network would have 1050 edge nodes and 1024 centralized switch planes. An insignificant proportion of capacity would be used for control as will be described with reference to FIG. 37 and FIG. 38.

FIG. 1 illustrates a network 100 comprising edge nodes 160 and a network core 110 comprising a number of switch planes 120, individually labeled as 120(0) to 120(Π−1), with Π>1. Each edge node 160 has a number of ingress ports connecting to ingress channels carrying data from data sources, a number of egress ports connecting to egress channels carrying data to data sinks, a number of outbound ports connecting to upstream channels to switch planes 120, and a number of inbound ports connecting to downstream channels from switch planes 120. Each edge node 160 has a group 150 of dual channels to the network core 110 including at least one dual channel 141/142 to each switch plane 120. A dual channel 141/142 comprises an upstream channel 141 from an edge node 160 to a switch plane 120 and a downstream channel 142 from a switch plane 120 to an edge node 160. Each switch plane 120 has a dimension of m×m (m inlet ports and m outlet ports) and the maximum number of edge nodes 160 that may be accommodated in such an arrangement is m. The advantages of using optical switch planes 120 in the network core are well known, and include simplicity due to direct switching of the optical carrier thus avoiding a process of baseband detection from a modulated optical carrier prior to switching and post-switching optical-carrier modulation. The use of a fast-switching optical network core, however, may limit the network scalability. With the present state of the art, an electronic switch plane 120 may grow to very high dimensions. Due to the availability of buffers, an electronic switch may be constructed in a modular structure of non-blocking electronic switch units with manageable scheduling and control complexity. A low-latency (fast switching) optical switch may also be configured as a modular switch based on non-blocking optical switch units. However, due to the absence of buffers, the scheduling complexity increases rapidly as the number of traversed switch units increases.

A non-blocking fast-switching optical switch unit may be constructed using a star coupler, an arrayed wavelength grating demultiplexer, and spectral-translation devices as described in U.S. Pat. No. 6,922,501 titled "Fast Optical Switch".

Figure 2:
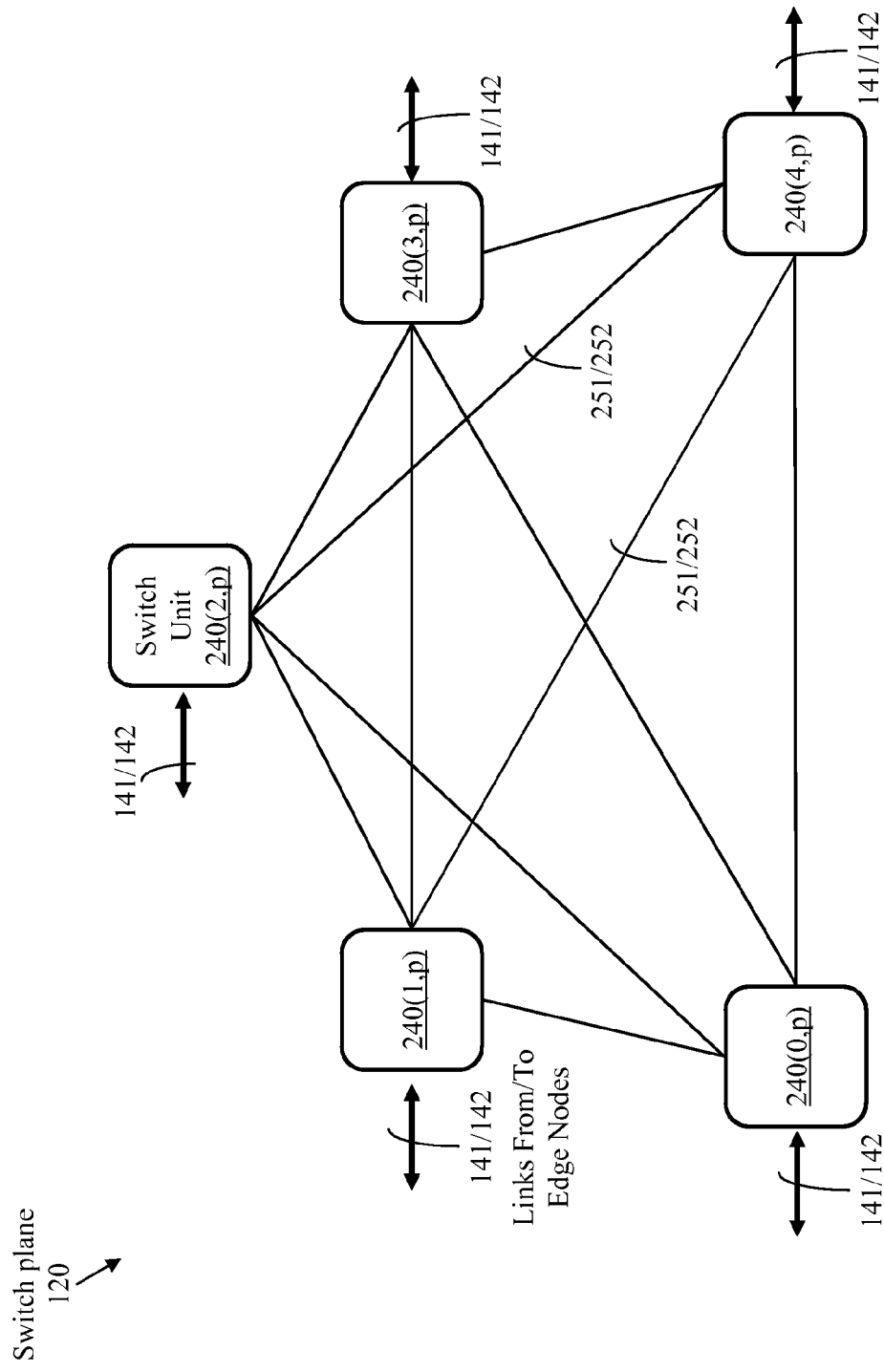
FIG. 2 illustrates an exemplary centralized switch plane, in the network of FIG. 1, comprising collocated non-blocking switch units configured in a mesh structure for use in an embodiment of the present invention.

A switch plane 120(p), with p<Π, may take the form of a fully meshed arrangement of switch units 240, as illustrated in FIG. 2. The fully-meshed structure is one of many alternatives. A switch unit 240 in a switch plane 120(k) is referenced as 240(k,p), where k is the relative identifier of the switch unit within switch plane 120(k). For example, the switch units 240 in a switch plane 120(k) having five switch units are individually referenced as 240(0,p), 240(1,p), 240(2,p), 240(3,p), and 240(4,p). Each switch unit 240 may have at least one dual channel 141/142 connecting to an edge node 160 or to a wavelength router (not illustrated). Each switch unit 240 also has an outward channel 251 to each other switch unit 240 and an inward channel 252 from each other switch unit 240. An outward channel 251 from a first switch unit is an inward channel 252 to a second switch unit 240. An individual outward channel 251 from a switch unit 240(k,p) to a switch unit 240(L, p) may be further identified as 251(k,L). If all switch units 240 are collocated, i.e., located within a small area so that the propagation delay between any two switch units 240 of a switch plane 120 is negligible, the switch plane 120 becomes a 'centralized' switch plane. In the structure of FIG. 1, the switch planes 120 may be distributed over the Globe, but each switch plane may either be a centralized switch plane, where all the switch units of the switch plane are collocated, or a distributed switch plane if at least two switch units in the switch plane are separated by a significant distance.

A centralized switch plane has the advantage of simplicity of time coordination with the edge nodes. A geographically distributed switch plane 120 poses a time-coordination problem which may be solved by introducing optical-electrical conversion units at inner ports of the mesh structure, as will be discussed below with reference to FIG. 40.

Figure 3:
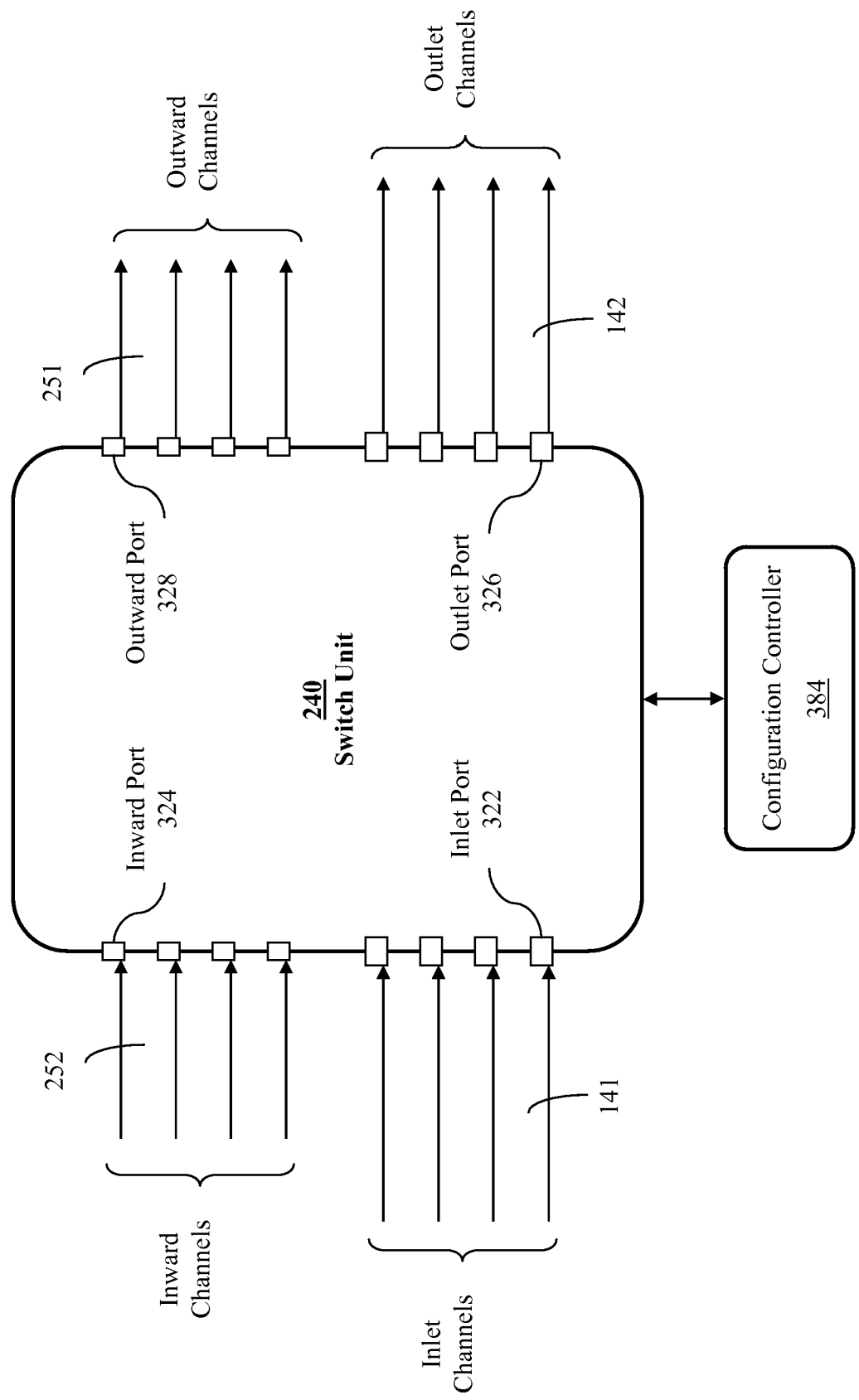
FIG. 3 illustrates input and output ports in a switch unit.

FIG. 3 illustrates input and output ports of a switch unit 240 in switch plane 120. The input ports include inlet ports 322 connecting to inlet channels 141 which originate from source nodes (source edge nodes 160) and inward ports 324 connecting to inward channels 252 which originate from other switch units 240 of the same switch plane 120. The output ports include outlet ports 326 connecting to outlet channels 142 which lead to sink nodes (destination edge nodes 160), and outward ports 328 which connect to outward channels 251 leading to inward ports 324 of other switch units 240 in the same switch plane 120. Notably, an outward channel 251 of a switch unit 240 is an inward channel 252 of another switch unit 240. A configuration controller 384 (a slave controller) sets connections within a switch fabric of switch unit 240 from input ports 322 and 324 to output ports 326 and 328 according to instructions received from a switch-plane controller to be described with reference to FIG. 35.

Figure 4:
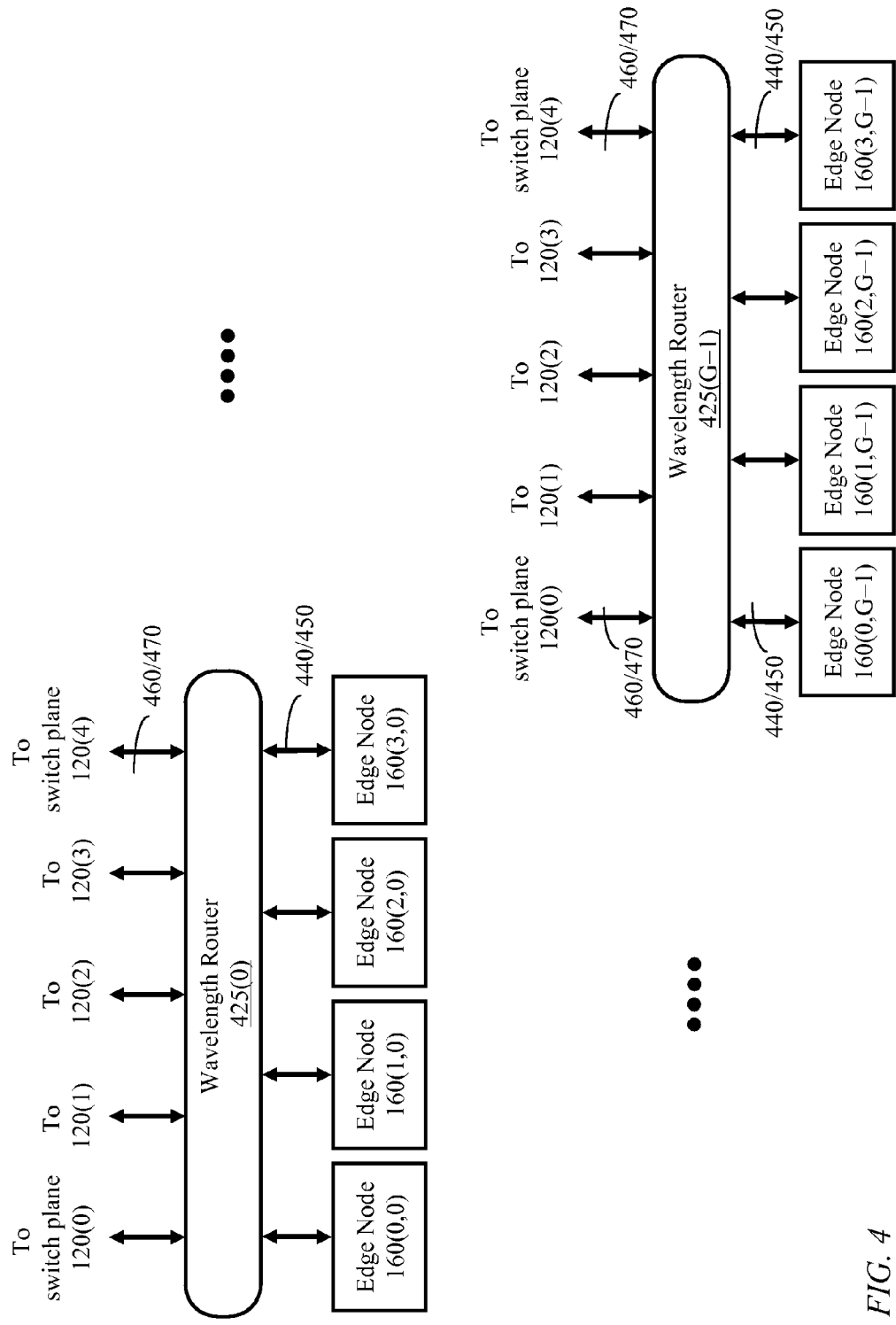
FIG. 4 illustrates dual wavelength routers for directing individual wavelength channels of wavelength-division-multiplexed (WDM) links from edge nodes to separate optical-switch planes in the network of FIG. 1.

FIG. 4 illustrates dual wavelength routers 425, each associated with a group of edge nodes 160, for directing individual wavelength channels of wavelength-division-multiplexed (WDM) links from edge nodes to separate optical-switch planes 120 in network 100 of FIG. 1. In order to exploit WDM economy, the edge nodes 160 may be arranged in groups of edge nodes and a wavelength router 425 is associated with each edge-node group. A wavelength router 425 may receive an upstream WDM link 440 from each edge node 160 of an edge-node group and direct the wavelength channels 141 from each edge node 160 to upstream WDM links 460 each leading to a switch plane 120. Each upstream WDM link 460 contains a wavelength channel 141 (FIG. 1) from each edge node 160 of an edge-node group. A wavelength router 425 may receive a downstream WDM link 470 comprising wavelength channels 142 (FIG. 1) from each switch plane 120 and direct the wavelength channels 142 to downstream WDM links 450 each leading to an edge node 160. Each downstream WDM link 450 contains a wavelength channel 142 from each switch plane. The number of wavelength routers 425 is preferably equal to the number of edge-node groups. An upstream WDM link 460 from a wavelength router 425 is directed to a switch plane 120. With edge nodes 160 of large dimension, multiple upstream WDM links 440 and downstream WDM links 450 may be used. For example, with each edge node 160 having 256 upstream channels 141 to switch planes 120, and 256 downstream channels from the switch planes 120, the upstream channels may be multiplexed onto eight upstream WDM links 440 each having 32 upstream channels 141, and similarly for the downstream channels. The maximum number of switch planes 120 is equal to the lesser of (1) the number of wavelength channels emanating from an edge node 160 and (2) the number of wavelength channels terminating on edge node 160.

WDM links 460 directed to a centralized switch plane 120 may be demultiplexed into individual wavelength channels 141 each of which connecting to an inlet port 322 of a switch unit 240 of the centralized switch plane 120. The allocation of the individual wavelength channels 141 in the switch planes 120 is crucial to the operation and performance of the entire network 100. If, for example, the switch planes 120 are configured identically, and if the wavelength channels 141 from different edge nodes 160 of a specific group of edge nodes connecting to a specific wavelength router 425, are allocated identically in all switch planes 120, then the inlet ports 322 of a given switch unit 240 in a specific switch plane 120 and the inlet ports 322 of all corresponding switch units 240 in all other switch planes 120 would connect to upstream channels from the specific group of edge nodes. Likewise, if the wavelength channels 142 to different edge nodes 160 of a specific group of edge nodes connecting to a specific wavelength router 425, are allocated identically in all switch planes 120, then the outlet ports 326 of a given switch unit 240 in a specific switch plane 120 and the outlet ports 326 of all corresponding switch units 240 in all other switch planes 120 would connect to downstream channels to the specific group of edge nodes. With typical spatial-traffic distributions, a large proportion of traffic from the a group of edge nodes connecting to inlet ports 322 one switch unit 240 may be directed to destination edge nodes 160 connecting to outlet ports 326 of another switch unit 240. This may necessitate the use of alternate indirect routes within the switch planes 120, where an indirect route traverses an intermediate switch unit 240. The use of indirect paths, each traversing an intermediate switch unit 240, is undesirable for two reasons: firstly, it consumes more resources; and secondly, it requires a computationally intensive third-order time-slot matching process. In accordance with the present invention, the upstream wavelength channels 141 are allocated to inlet ports 322 of the switch units 240 in a switch plane 120 in a manner which eliminates, or significantly reduces, the incidence of wavelength channels from any two edge nodes 160 accessing a common switch unit 240 more than once. Alternatively, the downstream wavelength channels may be allocated to outlet ports 326 of the switch units 240 in a switch plane 120 in a manner which eliminates, or significantly reduces, the incidence of any two edge nodes 160 connecting to wavelength channels from a common switch unit 240 more than once.

Preferred Network Structure

The edge nodes 160 are arranged into G groups, labeled 0, 1, ..., (G−1). The number G preferably equals the number of switch units 240 per switch plane 120. Each edge node has a number of outbound ports equal to the number Π of switch planes and a number of inbound ports also equal to Π. Each switch unit 240 has Q dual outer ports (a dual port comprising an inlet port 322 and an outlet port 326) connecting to edge nodes 160 and each edge-node group comprises Q edge nodes. Each switch plane 120 may be operated as a complete, fully agile, switch plane, where a connection from a first switch unit 240 to a second switch unit 240 may comprise a direct path traversing only the first and second switch units 240 and a number of indirect paths, each indirect path traversing the first switch unit 240, an intermediate switch unit 240 (other than the first switch unit and the second switch unit), and the second switch unit 240. An advantage of a complete switch plane is its virtual independence of the spatial traffic distribution. However, as described earlier, one of the objectives of the present inventions is to avoid the use of indirect paths and use only either intra-switch-unit paths (a path from an inlet port 322 to an outlet port 326 within a switch unit 240) or direct inter-switch-unit paths (a path from an inlet port 322 of a switch unit to an outlet port 326 of another switch unit 240 of the same switch plane 120). An intra-switch-unit path is used when the source edge node 160 and the sink edge node 160 connect to the same switch unit 240. A direct inter-switch-unit path traverses only the switch unit 240 connecting to the source node (source edge node 160) and the switch unit 240 connecting to the sink node (destination edge node 160). This operational restriction turns a fully-meshed switch plane into an incomplete (not fully agile) switch plane which may limit the throughput under spatial traffic-imbalance conditions. For example, under an extreme spatial traffic distribution, the traffic from a first group of Q source edge nodes 160, operating at near full occupancy and connecting to inlet ports 322 of a first switch unit 240 in a first switch plane 120, may be directed exclusively to a second group of Q sink edge nodes 160 connecting to outlet ports 326 of a second switch unit 240 in the same first switch plane 120. Transferring the traffic through the switch plane 120 requires at least Q paths from the first switch unit 240 to the second switch unit 240. There is only one direct path and the remaining (Q−1) paths would traverse intermediate switch units 240. If the first group of edge nodes 160 is connected to inlet ports 322 of a third switch unit 240 in a second switch plane 120 and the second group of edge nodes is connected to outlet ports of a fourth switch unit in the second switch plane, then—under the same traffic conditions—only a fraction 1/Q of the traffic received at the third switch unit can be transferred to the fourth switch unit. Each edge node has Π outbound channels and Π inbound channels, Π being the number of switch planes 120 as defined earlier, with one outbound channel connecting the edge node to each of the Π switch planes 120 and one inbound channel connecting each switch plane to the edge node. With outbound channels, outward channels, inbound channels and inward channels of the same capacity $\chi$ ($\chi$=10 Gb/s each, for example), the outward channel 251 connecting any switch unit 240 to any other switch unit 240 of any switch plane 120 may carry only 1/Q of the inlet traffic of one switch unit 240. Thus, under the above extreme traffic distribution and with similar connectivity patterns in all switch planes, only 1/Q of the traffic destined to the second group of edge nodes may be delivered.

To avoid the use of indirect paths within any switch plane 120, outbound channels of the first group of edge nodes 141 may connect to inlet ports 322 of a set of Q different switch units 240 in a second switch plane 120. Thus, the traffic from the first group of source nodes 160 to the second group of sink nodes 160 may use different outwards channels 251 leading to the second set of sink nodes. Likewise, outbound channels 141 of the first group of source nodes may connect to inlet ports 322 of a set of Q switch units in a third switch plane, and so on.

Outbound channels from the first group of source nodes (edge nodes) 160 may appear together at inlet ports 322 of the same switch unit 240 and, hence, with Π switch planes, the maximum needed capacity to carry the traffic from the first group of source nodes to the second group of sink nodes is $\Pi \times Q \times \chi$. The available transfer capacity from the first group of source nodes to the second group of sink nodes is $(\chi+(\Pi-1)\times Q \times \chi)$. The ratio of the available to needed capacity is then $(1-(Q-1)/(\Pi \times Q))$. With Q=30, and Π=32, for example, the ratio is 0.97, and with Q=30 and Π=128, the ratio becomes 0.992. This ratio is less sensitive to the value of Q and depends mainly on the number Π of switch planes 120. The calculation of this ratio does not take into account helpful internal switching through individual switch units 240 for source nodes and sink nodes connecting to common switch units 240 and does not account for internal switching within individual integrated edge nodes 160 (an integrated edge node 160 comprises a source node and a sink node sharing memory and control). Although this extreme case of both high occupancy and focused spatial traffic distribution may be unlikely to occur in a typical network, it is of paramount importance that a network be designed to function under extreme traffic conditions.

Figure 5:
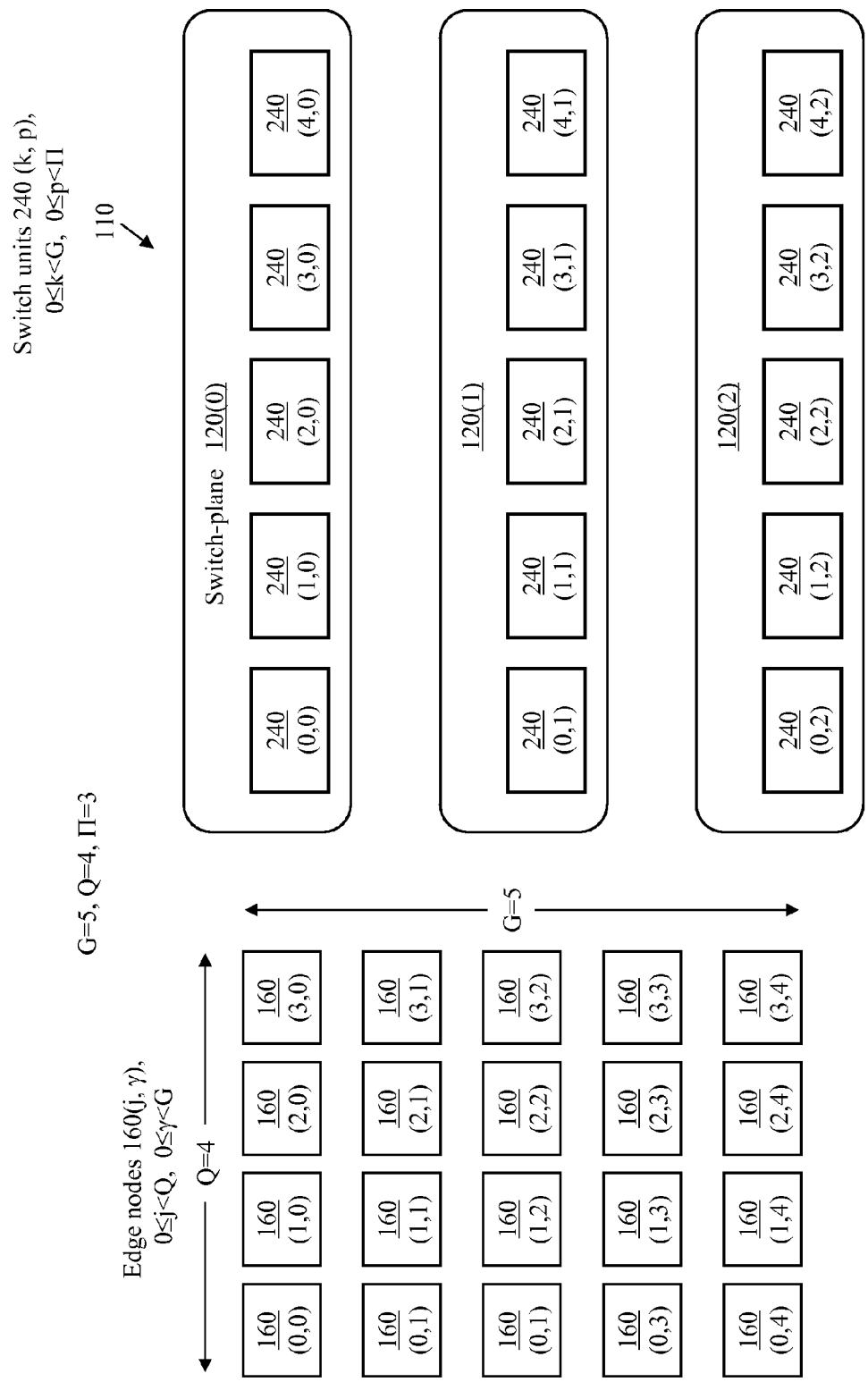
FIG. 5 illustrates an exemplary arrangement of edge nodes and switch units in the network of FIG. 1 for use in an embodiment of the present invention.

FIG. 5 illustrates a set of edge nodes 160 and switch units 240 of a network 100 having three switch planes 120 (Π=3) with each switch plane 120 comprising five switch units 240 (G=5) and each switch unit 240 having four inlet ports and four outlet ports (Q=4). The edge nodes are logically arranged into five groups each group having four edge nodes. Each edge node 160 is identified by an index (j, γ), γ being an edge-node group number (0≦γ<G) and j being the relative position of the edge node within group γ (0≦j<Q). Each switch unit 240 in a switch plane 120(p) is identified by an index (s, p), s being the relative position of the switch unit 240 within switch plane 120 of index p, referenced as switch plane 120(p), 0≦p<Π.

Figure 6:
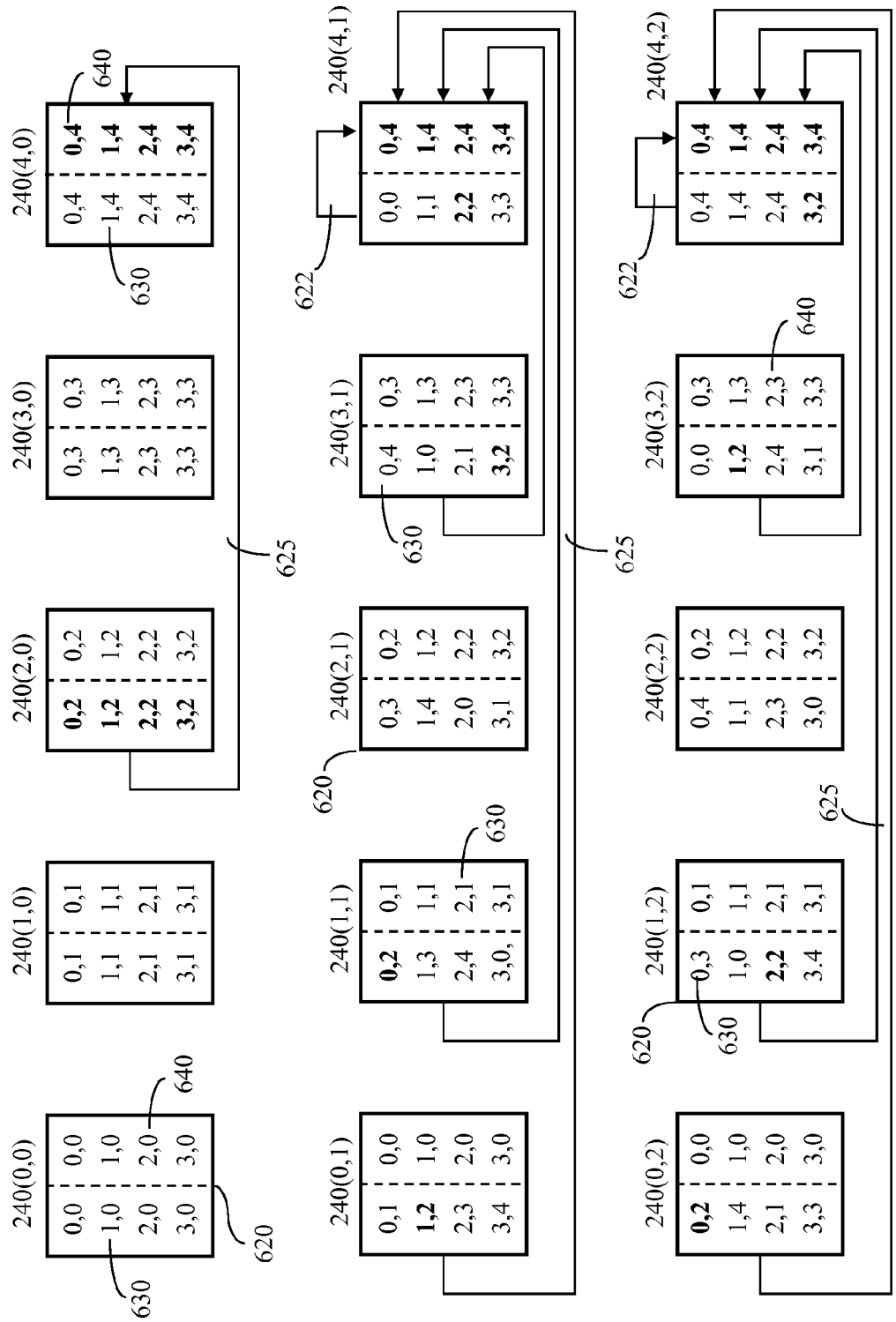
FIG. 6 illustrates asymmetrical upstream connectivity and downstream connectivity of the edge nodes to the switch units of FIG. 5 according to an embodiment of the present invention.

FIG. 6 illustrates asymmetrical connectivity pattern according to the present invention to enable the use of direct paths from any edge-node group to any other edge-node group and generally from any subset of edge nodes 160 to any other subset of edge nodes 160. Each array 620 represents the connectivity of a switch unit 240(k,p), 0≦k<G, 0≦p<Π. An entry 630 of an array 620 corresponding to switch unit 240 (k,p) identifies indices (j, γ) of an edge node 160(j, γ) connecting to the inlet ports of a switch unit 240(k,p). An entry 640 of array 620 identifies indices (j, γ) of an edge node 160(j,γ) connecting to an outlet port of switch unit 240(k,p). Direct paths 625 through a switch plane 120, traversing outward channels 252, carrying traffic from an edge-node group {160(0,2), 160(1,2), 160(2,2), 160(3,2)} to edge-node group {160(0,4), 160(1,4), 160(2,4), 160(3,4)} are indicated. There is only one direct path 625 in switch-plane 120(0). There are three direct paths 625 and one internal path 622 in each of switch-planes 120(1) and 120(2). The use of internal paths 622 reduces the traffic load of direct paths 625. The availability of sufficient paths in each of switch planes 120(1) and 120(2) results from the asymmetrical connectivity scheme according to the present invention where the upstream connectivity of edge nodes to inlet ports of switch units 240 is based on orthogonal scrambling while the downstream connectivity of outlet ports of the switch units 240 to edge nodes is uniform, being the same in all switch planes 120. Notably, the above asymmetrical connectivity may be reversed where the upstream connectivity of edge nodes to inlet ports of switch units 240 is the same in all switch planes 120 while the downstream connectivity of outlet ports of the switch units 240 to edge nodes is based on orthogonal scrambling.

Orthogonal Upstream Connectivity

The upstream connectivity of edge nodes 160 to switch units 240 is selected so that edge node 160(j, γ) has an upstream wavelength channel to an inlet port 322 of a switch unit 240 in each switch plane. In accordance with the present invention, edge nodes 160 that connect to inlet ports 322 of any switch unit 240 in any switch plane 120 preferably connect to inlet ports 322 of different switch units 240 in each other switch plane 120. Thus, any two edge nodes may have upstream connections to the same switch unit 240 only once. As such, a first set of edge nodes 160 connecting to a first switch unit 240 and a second set of edge nodes 160 connecting to a second switch unit 240 may have at most one common node. The first set and second set of edge nodes satisfying this condition are herein called "orthogonal edge-node sets". Several connectivity patterns may be devised to ensure that the edge node sets connecting to the switch units 240 are mutually orthogonal. In a preferred connectivity pattern, according to the present invention, each edge node 160(j,γ), 0≦j<Q<G, 0≦γ<G, connects, through at least one upstream wavelength channel, to switch unit 240(ξ,p), in switch plane 120(p), 0≦p<Π where:

$$\xi = ((G-1-j)p+\gamma)_{modulo\ G}.$$

In the downstream direction, edge node 160(j,γ) receives at least one downstream channel from a switch unit 240(γ, p), 0≦p<Π.

Equivalently, a switch unit 240(k, p), 0≦k<G, 0≦p<Π, receives Q upstream channels from edge nodes {j, [(j+1)p+k]$_{modulo\ G}$}, 0≦j<Q. Thus, in switch plane 120(p), p=0, switch unit 240(k, 0) receives channels from edge nodes (j, k), 0≦j<Q, in switch plane 120(p), p=1, switch unit 240(k, 1) receives channels from edge nodes (j, [k+j+1]$_{modulo\ 5}$, and in switch plane 2, switch unit 240(k, 2) receives channels from edge nodes (j, [k+2j+2]$_{modulo\ 5}$).

Figure 7:
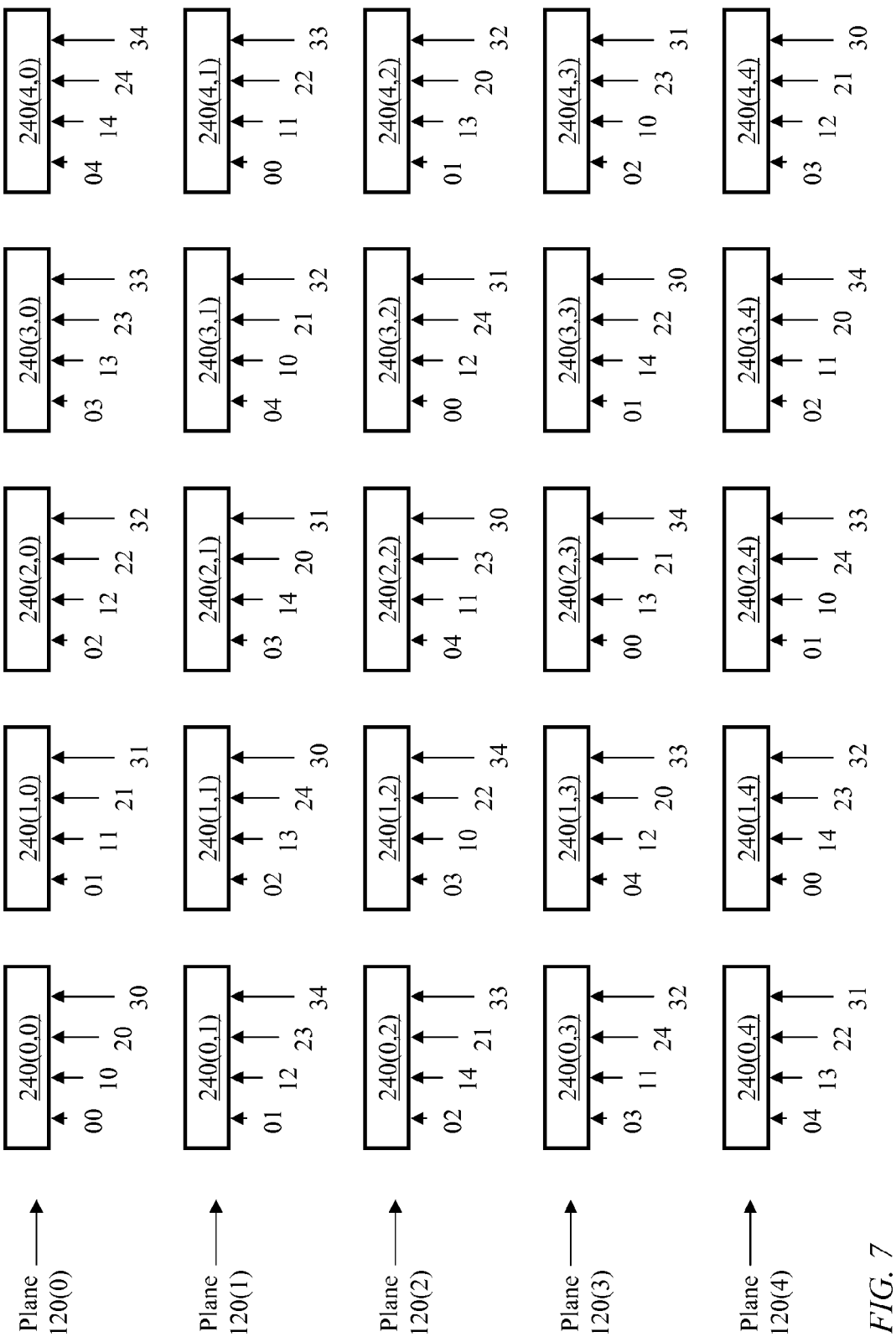
FIG. 7 illustrates a further exemplary upstream connectivity arrangement of edge nodes to switch units in five switch planes in a network comprising five switch planes each switch plane having five switch units according to an embodiment of the present invention.

FIG. 7 illustrates the upstream connectivity of a network core 110 in a network 100 comprising 20 edge nodes 160, each edge node 160 having four dual outer channels 141/142 connecting to the network core 110 (Q=4). The network core 110 comprises five switch planes 120 (Π=5). Each switch plane 120 comprises switch units 240 each of dimension 8×8, with four dual outer ports 322/326 connecting to edge nodes 160 and four dual inner ports 324/328 connecting to other switch units 240 of the same switch plane 120. Thus, each switch plane 120 comprises five switch units (G=5) connected in a full mesh structure. The edge nodes 160 are arranged into five groups labeled groups 0, 1, . . . , 4, and each edge-node group includes four edge nodes. An edge node 160 is further identified by the indices (j, y), 0≦j<Q, 0≦γ<G, where γ is the group identifier and j is a relative identifier within a group. For clarity of the figure, given space limitation, an edge node (j, γ), where each of j and γ is represented by one digit, is represented as a concatenation "jγ" instead of (j,γ). For example, a third edge node (where j=3) in group 2 (γ=2), is represented in the drawings as "32" instead of the formal (3, 2) representation. This edge-node identification scheme is only exemplary and any other suitable scheme may be used.

In the example of FIG. 7, there are five switch planes (Π=5) and five edge-node groups (G=5). The upstream connectivity of edge nodes 160 to switch units 240 is selected so that edge node (j, γ) has an upstream wavelength channel to an inlet port 322 of a switch unit 240 in each switch plane 120. Using the upstream-connectivity method described above, the Π outbound channels of edge node 160(j,γ) connect to switch units 240 {[(G−1−j)p+γ]$_{modulo\ G}$, p)}, 0≦p<∇ and, consequently, a switch unit 240(k, p), 0≦k<G, 0≦p<Π, receives upstream channels from edge nodes {j, [(j+1) p+k]$_{modulo\ G}$}, 0≦j<Π. With the network parameters Π=5, G=5, and Q=4, switch unit 240(k, 0) receives channels from edge nodes (j, k), 0≦j<Q and switch unit 240(k, 2) receives channels from edge nodes (j, [k+2j+2]$_{modulo\ 5}$).

The switch units 240 are arranged in Π>1 switch planes. The switch planes are indexed as 0 to (Π−1). Each switch plane comprises a subset of G>1 switch units 240 interconnected in a full-mesh structure. A switch unit 240 of a switch plane 120(p) is identified as 240(s,p), 0≦s<G. The edge nodes 160 are arranged into G non-intersecting edge-node groups each edge-node group comprising at most Q>1 edge nodes. An edge node 160 within an edge-node group γ, 0≦γ<G, is indexed as (j, γ), 0≦j<Q<G. Each edge node 160 connects to a switch plane 120 in both the upstream direction and downstream direction.

To eliminate the need for indirect connections through each switch plane 120, the edge nodes 160 may be connected to switch units 240 in one of three configurations.

In a first configuration, switch units 240 connect to orthogonal sets of edge nodes 160 in the upstream directions and connect to arbitrary sets of edge nodes 160 in the downstream direction. Selecting G as a prime number, a switch unit 240(k,p) of index k, 0≦k<G, in switch plane p, 0≦p<Π, connects to at most Q edge nodes of indices (j, k+p+j×p), 0≦j<Q, in the upstream direction.

A switch unit 240(k,p), 0≦k<G, 0≦p<Π, connects to each of at most Q edge nodes 160(j,γ) 0≦j<Q, 0≦γ<G, through at least one downstream channel. Preferably, for ease of routing, an edge node 160(j,γ) connects in the downstream direction to switch units 240(k,p), k=γ, 0≦p<Π. Thus, Π switch units 240(k,p), 0≦p<Π, connect in the downstream direction to a set of edge nodes 160. With one downstream channel from each switch plane to each edge node, it is preferable that a downstream channel from an outlet port j of a switch unit 240(k,p) connect to edge node 160(j,γ) to further simplify addressing.

In a second configuration, switch units 240 connect to arbitrary sets of edge nodes 160 in the upstream direction and connect to orthogonal sets of edge nodes 160 in the downstream directions. Switch unit 240(k,p), 0≦k<G, 0≦p<Π, connects to each of at most Q edge nodes 160(j,γ) 0≦j<Q, 0≦γ<G, through at least one upstream channel. An edge node 160(j,γ) may connect in the upstream direction to switch units 240(k,p), k=γ, 0≦p<Π. Thus, Π switch units 240(k,p), 0≦p<Π, connect in the upstream direction to a set of edge nodes 160.

Selecting G to be a prime number, a switch unit 240(k,p) of index k, 0≦k<G, in switch plane p, 0≦p<Π, connects to at most Q edge nodes of indices (j, k+p+j×p), 0≦j<Q, in the downstream direction.

The capacity and performance of the second configurations are comparable to those of the first configuration. However, addressing and routing in the first configuration are simpler because each edge node may connect, in the downstream direction, to outlet ports of identical indices within the Π switch planes.

In a third configuration, switch units 240 connect to orthogonal sets of edge nodes 160 in both the upstream and downstream directions. Selecting G as a prime number, a switch unit 240(k,p) of index k, 0≦k<G, in switch plane p, 0≦p<Π, connects to at most Q edge nodes of indices (j, k+p+j×p), 0≦j<Q, in the both directions.

As illustrated in FIG. 7, the edge nodes 160 are arranged into edge-node groups each connecting to a switch unit 240 in one of five switch planes 120(0), 120(1), 120(2), 120(3) and 120(4). Switch-plane 120(0) has five switch units labeled 240(0,0) to 240(0,4). Switch-plane 120(1) has five switch units labeled 240(1,0) to 240(1,4), and so on. For brevity, each edge node 160 is identified by a concatenation of indices j and γ as mentioned above. Thus, a first edge node 160 in a first edge-node group would be identified as 00, the second edge node 160 in the first edge-node group would be identified as 10, and so on. A switch unit 240 is identified as 240(k,p) where p is the index of a switch plane 120(p) and index k represents the relative position of the switch unit within the switch plane 120(p).

According to the first configuration, edge nodes are associated with switch units as follows: edge nodes 160(0,0), 160(1,0), 160(2,0), and 160(3,0) connect to switch unit 240 (0,0) of switch-plane 120(0); edge nodes 160(0,0), 160(1,1), 160(2,2), 160(3,3) connect to switch unit 240(4,1) of switch-plane 120(1); edge nodes 160(0,0), 160(1,2), 160(2,4), and 160(3,1) connect to switch unit 240(3,2) of switch plane 120(2); and edge nodes 160(0,0), 160(1,3), 160(2,1), 160(3, 4) connect to switch unit 240(2,3) of switch-plane 3. Switch unit 240(3,2) receives channels from edge nodes 160(0, 0), 160(1, 2), 160(2, 4), and 160(3,1) which are written as 00, 12, 24, and 31.

When current identifiers of edge nodes 160 allocated to a switch unit 240 in a switch plane 120 are determined, the identifiers of edge nodes 160 allocated to a subsequent switch unit 240 of the switch plane are determined by adding one, modulo G, to the second index of each of the current identifiers.

It is observed in FIG. 7 that any two groups of edge nodes 160 connecting two switch units 240 have at most one edge node in common. For example edge-node group (00, 10, 20, 30) connecting to 240(0,0) has no common edge nodes with edge-node group (02,11,20,34) connecting to switch unit 240 (3,4) and one edge node, 160(0,0) in common with edge-node-group (00,14,23,32) connecting to switch unit 240(1,4).

The above configurations identify a set of edge nodes 160 connecting to each switch unit 240. In practice, it may be desirable to have expressions for identifying switch units 240 to which each edge node 160 connects.

Using the same notation as above, and considering the preferred first configuration, an edge node 160(j, γ) of index (j, γ), 0≦j<Q<G, 0≦γ<G, connects to a switch unit 240(h,p) of index h=((G−1−j)p+γ)$_{modulo\ G}$, in each switch plane p, 0≦p<Π, through at least one upstream channel. Edge node 160(j, γ) connects to a switch unit 240(γ,p), of index γ in each switch plane p, 0≦p<Π, through at least one downstream channel.

Preferably, each switch unit 240 in each switch plane 120 has a same number N provisioned dual ports; a switch unit 240 may be devised to support a number of ports larger than N for future expansion. Referring to FIG. 3, let the number of inlet ports 322 equal the number Q of outlet ports 326. To create a full mesh interconnection of G switch units, the number of inward ports 324 equals (G−1) and, consequently, the number of outward ports 328 equals (G−1). Thus, the N dual ports of the switch unit 240 includes Q outer dual ports communicatively coupled to edge nodes 160 and (G−1) inner dual ports connecting to other switch units 240 of said each switch plane. (An outer dual port comprises an inlet port 322 and an outlet port 326. An inner dual port comprises an inward port 324 and an outward port 328.)

A minimum expansion factor, η, defined as the ratio of inner dual ports to outer dual ports of a switch unit 240 may be specified to influence the performance of the network 100. A value of η exceeding 1 facilitates connection setup through a switch plane 120. The value of G is preferably selected as a prime number to simplify the assignment of edge-nodes 160 to switch units. The permissible number Q of dual outer port, may be determined from: (Q+G−1)≦N and ((G−1)/Q)≧η. Given the values of N and η, the value of G and Q may be determined in one of two methods.

In a first method, G is determined as a prime number not exceeding Γ=(N×η/(η+1))+1, and the value of Q is determined as Q≧⌊(G−1)/η⌋, the conventional notation ⌊y⌋ denoting an integer part of a real number y.

In a second method, G may be determined as the nearest prime number not less than Γ=(N×η/(η+1))+1, and the value of Q is determined as Q≦(N−G+1).

For example, consider a switch unit 240 having N=512 dual ports, with a minimum expansion factor η=1.12. The value of Γ is determined as Γ=271.49. The nearest prime number not exceeding Γ is 271. According to the first method, the number G of switch units 240 per switch plane is selected to be 271, and the number Q of outlet ports of a switch unit 240 is determined as Q≦⌊(G−1)/η⌋=270/1.12⌋=241. The total number of utilized dual ports per switch unit 240 is then 241+270=511 (less than 512), and the actual expansion ration is 270/241=1.1203>1.12. The nearest prime number that is higher than Γ is 277. According to the second method, the number G is selected to be 277. With G=277, Q is determined as (N−G+1)=236, and the actual expansion factor is (G−1)/Q=2761236=1.169>1.12.

As another example, consider a switch unit 240 having N=128 dual ports, with a minimum expansion factor η=1.12. The value of Γ is determined as Γ=68.62. The nearest prime number not exceeding Γ is 67. According to the first method, the number G of switch units 240 per switch plane is selected to be 67, and the number Q of outlet ports of a switch unit 240 is determined as Q≦⌊(G−1)/η=66/1.12⌋=58. The total number of utilized dual ports per switch unit 240 is then 66+58=124 (less than 128), and the actual expansion ration is 66/58=1.138>1.12. According to the second method, the number G is selected to be the nearest prime number higher than Γ, which is 71. With G=71, Q is determined as (N−G+1)=58, and the actual expansion factor is (G−1)/Q=70/58=1.207>1.12.

Downstream Connectivity

Figure 8:
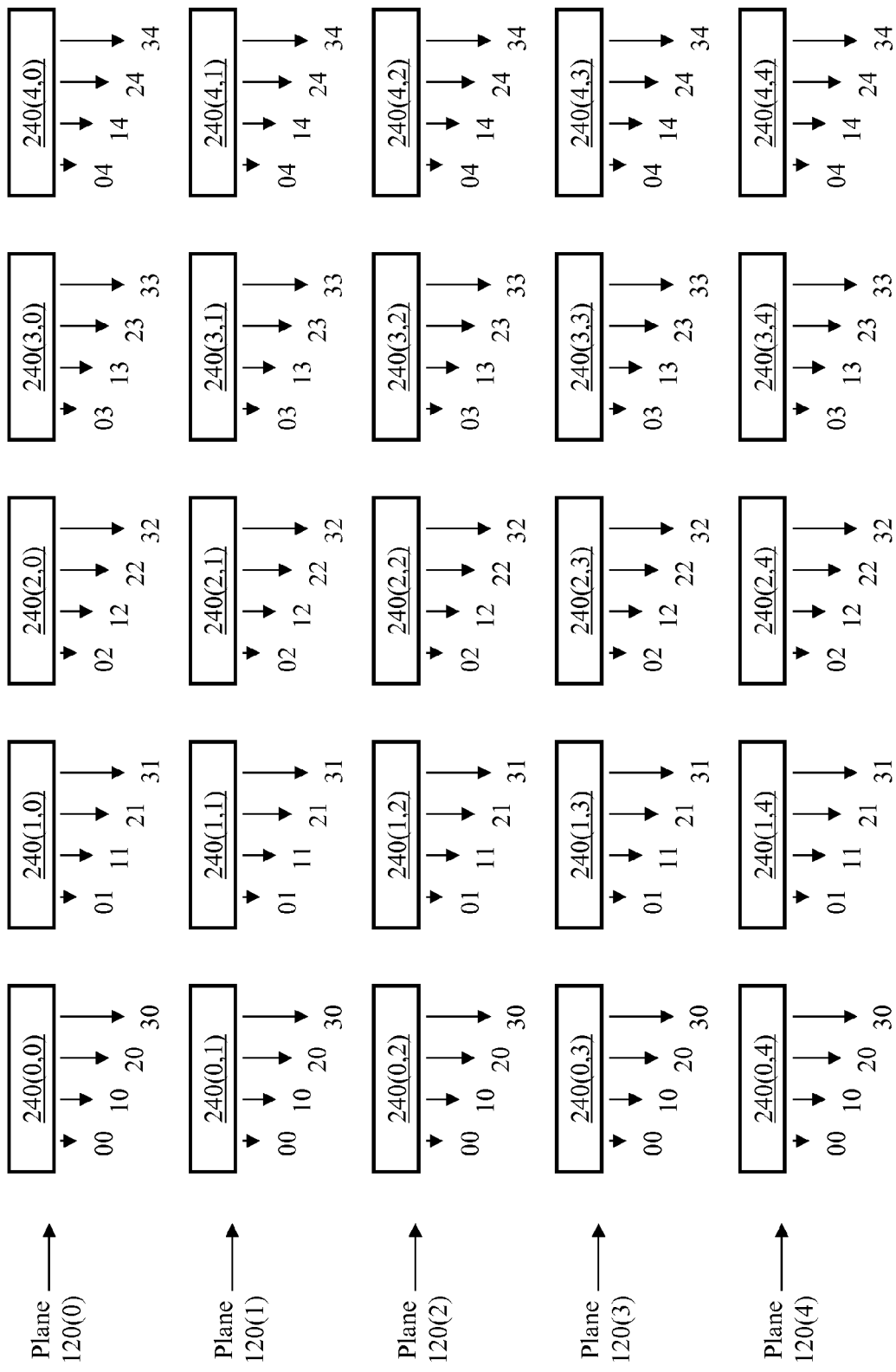
FIG. 8 illustrates further exemplary downstream connectivity arrangement of switch units to edge nodes in five switch planes in the network considered in FIG. 7 according to an embodiment of the present invention.

FIG. 8 illustrates the downstream connectivity of the network core 110 considered in FIG. 7 to edge nodes 160, where downstream channels from corresponding switch units in different switch planes lead to a common subset of sink nodes (destination edge nodes 120). For example, switch units 240 (2,0), 240(2,1), 240(2,2), 240(2,3), and 240(2,4) connect to edge-nodes 160(0,2), 160(1,2), 160(2,2), and 160(3,2) respectively, represented in FIG. 8 as 02, 12, 22, and 32 for clarity of the drawing. It is noted that the uniformity of downstream connectivity as illustrated in FIG. 8 has significant advantages in simplifying the addressing and routing across the network 100 as will be described below.

Reciprocating Upstream and Downstream Connectivity

The upstream connectivity pattern of FIG. 7 and downstream connectivity pattern of FIG. 8 may be interchanged so that the upstream connectivity is uniform, with a subset of edge nodes 160 (source nodes) connecting through upstream channels to corresponding switch units in switch planes 120 and the downstream connectivity is based on orthogonality. It is noted that while this reciprocal connectivity arrangement would lead to comparable traffic performance, it may complicate the addressing and routing functions to some extent. Each edge node 160 may be assigned a network address based on its downstream association with a switch unit 240(k, p). When the downstream connectivity is uniform, an edge node would have a downstream channel from switch units 240(k,p) of the same first index k. When the downstream connectivity is non-uniform, for example orthogonally scrambled, a sink node (a destination edge node) would have an address associated with each switch plane 120. If the number of switch planes is 1000, for example, a sink node would have 1000 switch-plane-dependent addresses instead of a single network address. Notably, recent advances in the art facilitate the construction of edge nodes of several-thousand ports each. This enables the use of a large number of switch planes 120 in network 100 of FIG. 1.

FIG. 9 is a Table 900 illustrating symmetrical upstream and downstream connection of channels from 20 edge nodes 160 to switch units 240 of five switch planes 120(p), 0≦p<Π, of the exemplary network 100 considered in FIG. 7. The switch planes are labeled 120(0), 120(1), 120(2), 120(3), and 120(4). Each switch plane of index p, 0≦p<Π, comprises five switch units 240 labeled 240(k,p), 0≦k<5, with the first index k denoting a relative position of a switch unit 240 within a switch plane 120(p). The edge nodes are divided, for identification purposes into a number of edge-node groups and the number of edge-node groups is conveniently selected to equal the number G of switch units 240 per switch plane 120. An edge node is identified as 160(j,γ), where j is a relative position of an edge node 160 within its edge-node group, and γ is an identifier of an edge-node group; 0≦γ<G. An entry 912 in Table 900 indicates an edge node 160(j,γ) connected in the upstream direction to a switch-unit 240(k,p). For clarity of the figure, an edge node 160(j,γ) is identified only by the indices j, γ. An entry 914 in Table 900 indicates an edge node 160(j,γ) connected in the downstream direction to a switch-unit 240 (k,p). In Table 900, the entries 912 and 914 are identical, indicating symmetrical connectivity of the edge nodes 160 to the switch planes 120 in the upstream and downstream directions.

FIG. 10 highlights the connectivity, upstream or downstream, of an arbitrary set of edge nodes 160(0,1), 160(1,2), 160(2,3), and 160(3,4) (concisely represented as "01", "12", "23", "34") to switch units 240 of different switch planes 120. The four edge nodes respectively connect to switch units 240 of switch planes 120(0), 120(1), 120(2) 120(3), and 120(4) according to the pattern below.

In switch-plane 120(0): to switch units 240(1,0), 240(2,0), 240(3,0), and 240(4,0).
In switch-plane 120(1): to switch unit 240(0,1).
In switch-plane 120(2): to switch units 240(4,2), 240(3,2), 240(2,2), and 240(1,2).
In switch-plane 120(3): to switch units 240(3,3), 240(1,3), 240(4,3), and 240(2,3).

In switch plane 120(4): to switch units 240(2,4), 240(4,4), 240(1,4), and 240(3,4).

Thus, the set of edge nodes ("01", "12", "23", and "34") has a scattered connection to the switch units 240(k,p) in four switch planes 120(0), 120(2), 120(3), and 120(4) and a focused connection to one switch unit 240(0,1) of switch plane 120(1). The four edge nodes of the set may reach a destination set of edge node through four channels in each of four switch planes and one channel in one switch plane.

FIG. 11 illustrates an upstream connectivity pattern identical to that illustrated in FIG. 9 which differs from one switch plane to another. However, the downstream connectivity of switch planes 120(p), $1 \leq p < \Pi$ to the edge nodes 160 is similar to the downstream connectivity of switch plane 120(0) to the edge nodes 160. Any two edge nodes 160 have upstream channels to a common switch unit only once; the subsets of edge nodes connecting in the upstream direction to the switch units 240 in network 100 are orthogonal.

The asymmetrical arrangement of FIG. 11 is superior to the symmetrical arrangement of FIG. 9 in two aspects: firstly, it significantly simplifies addressing and routing, and, secondly, it provides better scattering where each source node coexists with each sink node in only one of the switch units 240 thus generally increasing the proportion of traffic that can be switched within a single switch unit 240. To illustrate this property, source edge node 160(0,1) (concisely "01") coexists with sink edge node 160(0,1) in each switch plane 120 in the arrangement of FIG. 9 but coexists with sink edge node 160(0,1) in only one switch unit 240(1,0) in the arrangement of FIG. 11.

FIG. 12 highlights the scattered connectivity in the arrangement of FIG. 11 of the same arbitrary set of edge nodes 160(0,1), 160(1,2), 160(2,3), and 160(3,4) used in FIG. 10.

FIG. 13 highlights intra-switch unit connections and inter-switch-unit connections for the connectivity arrangement of FIG. 11. In particular, a connection from source edge node 160(1,2) (concisely "12") to sink edge node 160(2,4) (concisely "24") may traverse: switch units 240(2,0) and 240(4,0) in plane 120(0); 240(0,1) and 240(4,1) in switch plane 120(1), 240(3,2) and 240(4,2) in switch plane 120(2), or 240(1,3) and 240(4,3) in switch plane 120(3). A connection may, however, be set within one switch unit 240(4,4) in switch plane 120(4). With balanced traffic, intra-switch-unit connections, such as the one through 240(4,4), may be used for a significant proportion of traffic, thus reducing the load on internal channels 251 interconnecting switch units 240 within a switch plane (FIG. 2) and, hence, facilitating the second-order temporal matching process employed for inter-switch-unit connections such as the four connections from source edge node 160(1,2) to sink edge node 160(2,4) described above.

Figure 14:
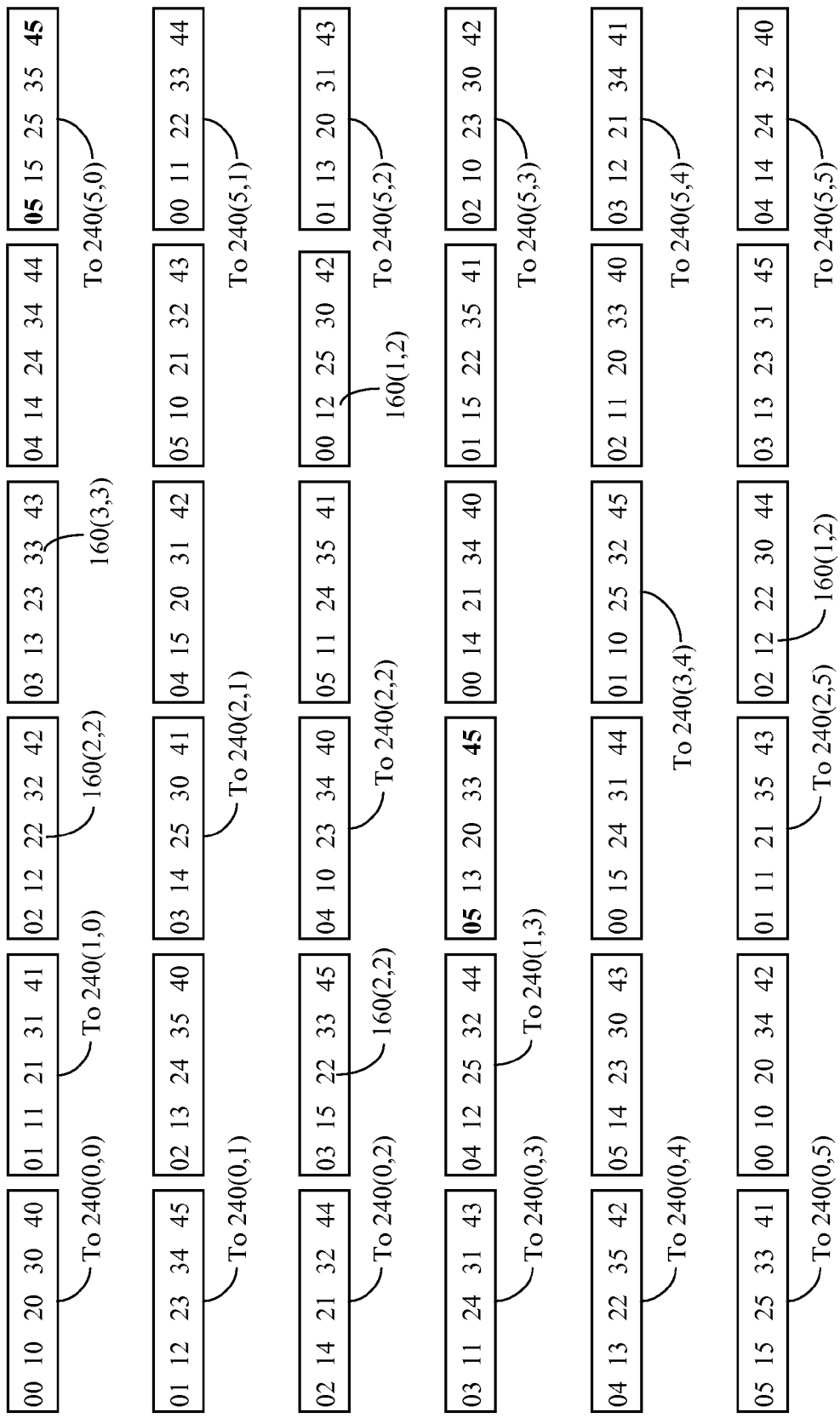
FIG. 14 illustrates a further exemplary asymmetrical connectivity arrangement where orthogonal edge-node combinations connect to switch units in the upstream direction only.

FIG. 14 illustrates an upstream connectivity pattern for a network 100 having six switch planes 120 ($\Pi=6$), where each switch plane 120 has six switch units (G=6) and each switch unit 240 has 5 dual outer ports (Q=5) connecting to edge nodes 160. In the example of FIG. 11, each edge-node pair access a common switch unit 240 only once. In the example of FIG. 14, an edge-node pair may access more than one common switch unit 240. For example edge nodes 160(0,5) and 160(4,5) have upstream channels to switch unit 240(5,0) and to switch unit 240(2,3).

Figure 15:
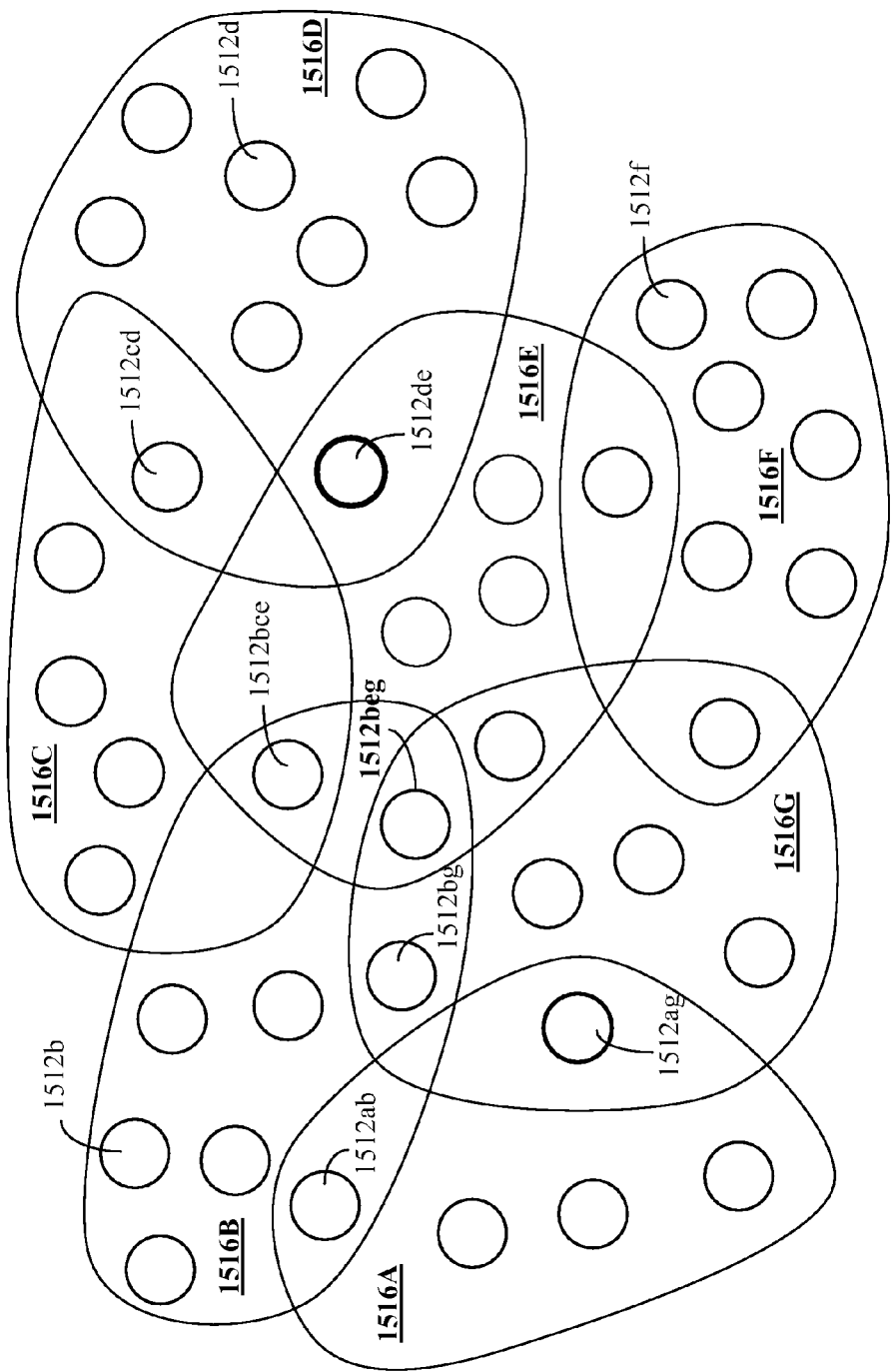
FIG. 15 illustrates generic grouping of edge nodes in the network of FIG. 1 into orthogonal sets according to an embodiment of the present invention.

FIG. 15 illustrates the division of a number of nodes 1512 in an arbitrary network into overlapping sets of nodes where each set of nodes intersects at least one other set of nodes and each node is a member of at least two node sets. The number μ of common nodes (mutual nodes) in any two node sets is limited to a predefined upper bound. The preferable upper bound is unity. Node sets thus formed are herein called "orthogonal node sets". However, the definition of orthogonality may be relaxed to allow μ to exceed unity. The nodes in FIG. 15 may represent source nodes or sink nodes. The nodes 1512 of FIG. 15 are divided into seven orthogonal node sets 1516, individually labeled as 1516A, 1516B, 1516C, 1516D, 1516E, 1516F, and 1516G. A node 1512 may be further identified by the orthogonal node sets to which it belongs. Thus, node 1512ab is a common node in the two node sets 1516A and 1516B, node 1560bce is a common node in three node sets 1516B, 1516C, and 1516E. There are seven common nodes in the example of FIG. 15.

In a network where source nodes and sink nodes are integrated into edge nodes with an edge node comprising one source node and one sink node, the division of the edge nodes into orthogonal node sets may apply independently to the source-node components of the edge nodes (thus affecting upstream connectivity), the sink-node components (affecting downstream connectivity), or both.

Figure 16:
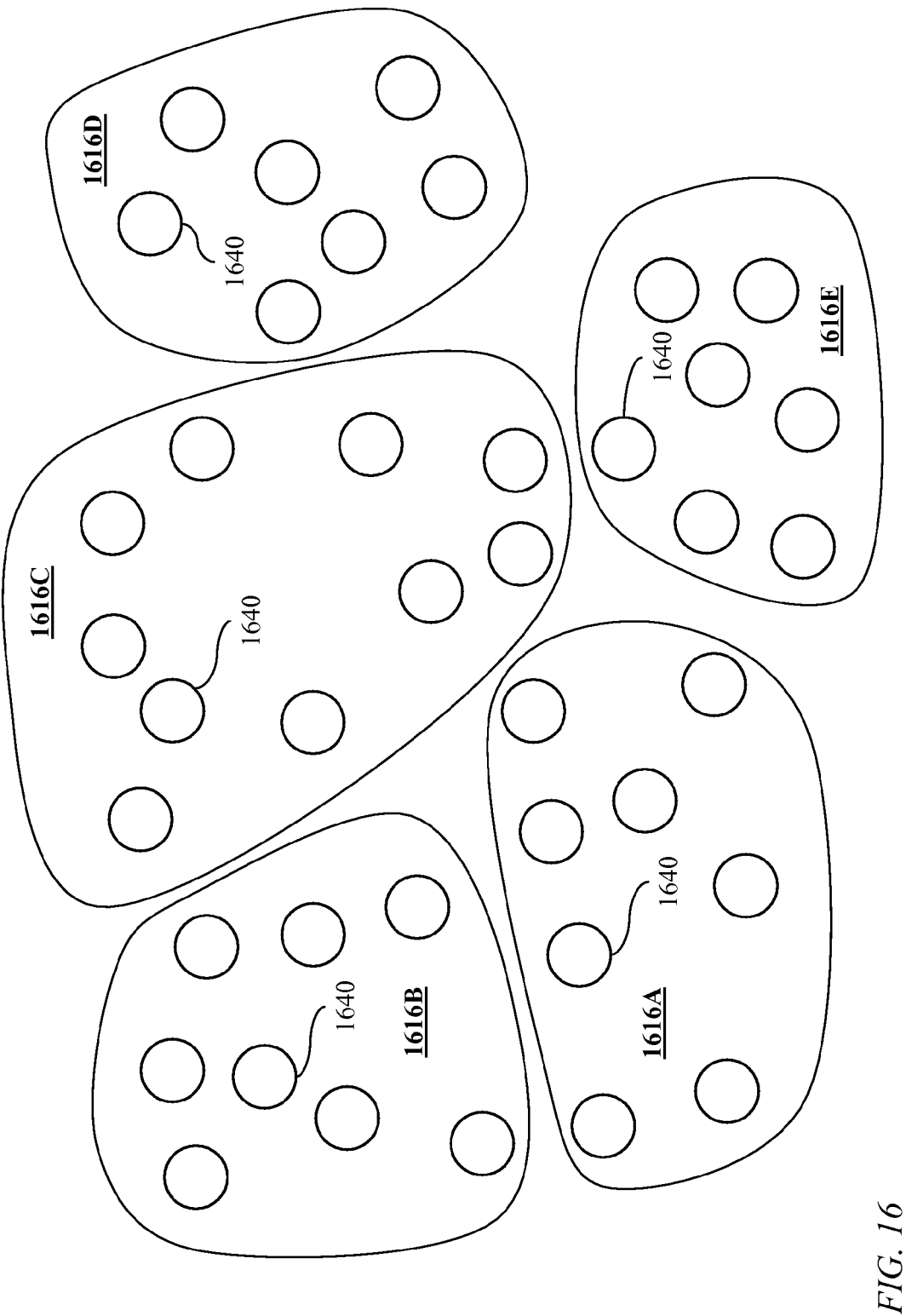
FIG. 16 illustrates generic grouping of edge nodes in the network of FIG. 1 into non-intersecting sets for use in an embodiment of the present invention.

FIG. 16 illustrates the division of a number of nodes 1612 in an arbitrary network into non-overlapping sets 1616 of nodes where none of the node sets 1616 intersects any other of the node sets 1616, i.e., each node 1612 is a member of only one node set. Node sets thus formed are herein called "non-intersecting node sets". The nodes in FIG. 16 may represent source nodes or sink nodes. In a network where source nodes and sink nodes are integrated into edge nodes, the division of the edge nodes into non-intersecting node sets may apply to the source-node components of the edge nodes (affecting upstream connectivity), or the sink-node components (affecting downstream connectivity), but not both.

Figure 17:
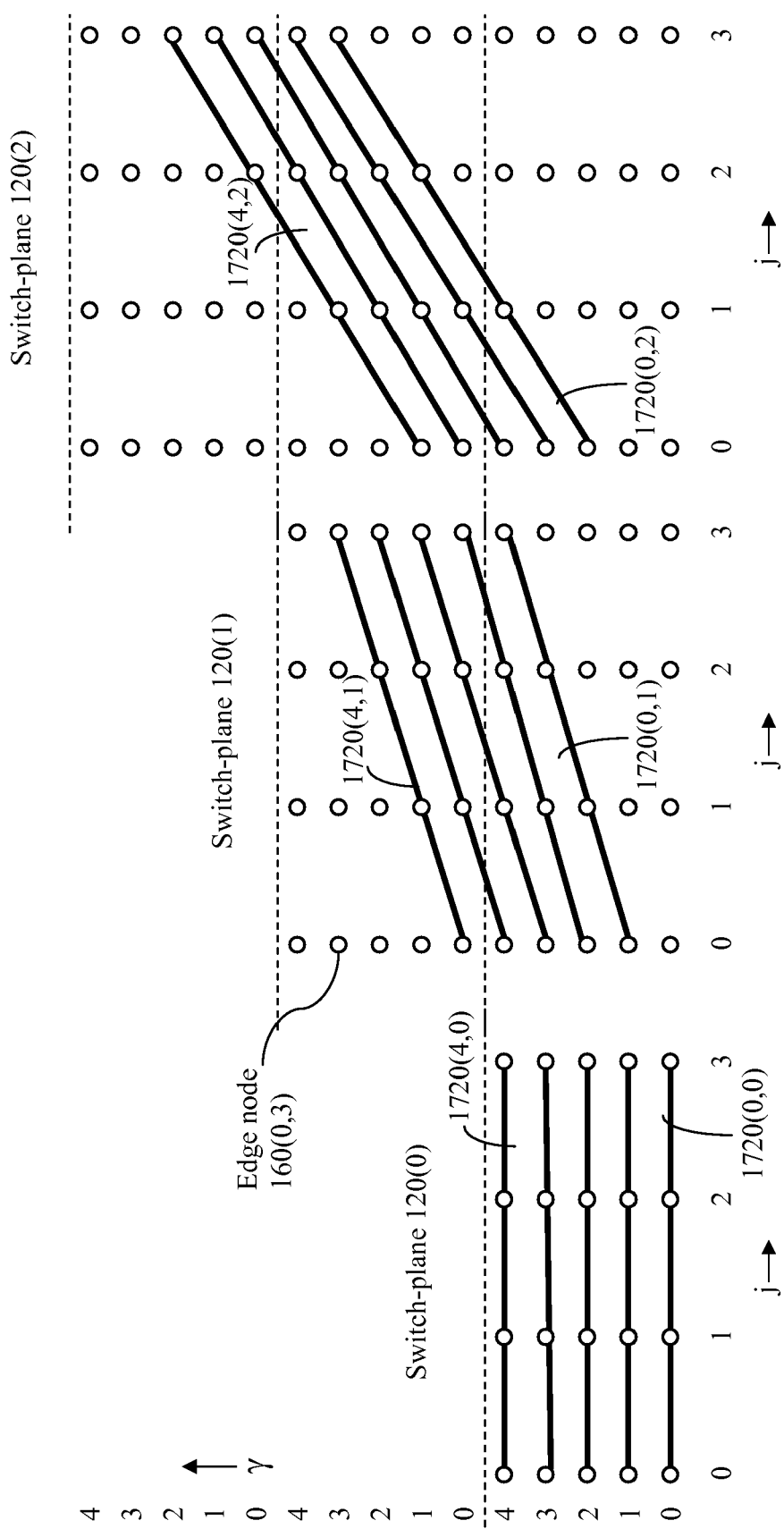
FIG. 17 and FIG. 18 illustrate an arrangement for edge-node grouping into orthogonal sets according to an embodiment of the present invention.
Figure 18:
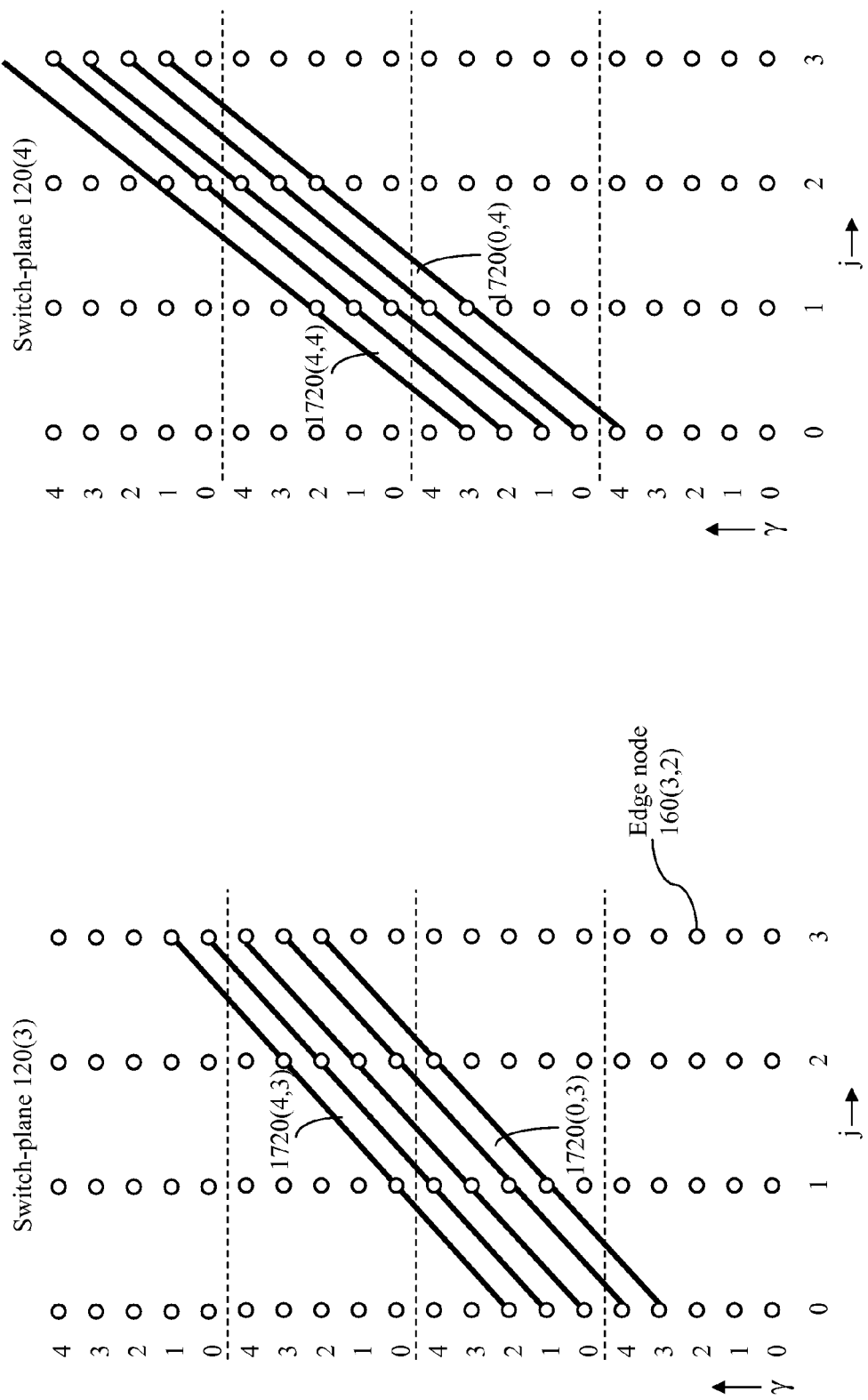

FIG. 17 and FIG. 18 illustrate an arrangement for dividing the twenty edge nodes 160 of the exemplary network considered in FIG. 11 (with $G=\Pi=5$ and $Q=4$) into orthogonal edge-node sets, each edge-node set including four edge nodes 160. In FIG. 17 and FIG. 18, an edge node 160(j,γ) is represented by indices (j, γ), where $0 \leq j < Q$, and $0 \leq \gamma < G$, γ being an edge-node group number and j being the relative position of the edge node within group k as defined earlier. An arrangement associated with switch-plane 120(p) has G non-intersecting edge-node sets 1720 where each set comprises Q edge nodes 160(j, $|k+p+j\times p|_{modulo\ G}$), $0 \leq j < Q$, which connect to switch unit 240(k, p), $0 \leq k < G$. For clarity, the second index $|k+p+j\times p|_{modulo\ G}$ of an edge-node is indicated in FIG. 17 and FIG. 18 (as well as in FIGS. 19-21) by repeating the values of the ordinate γ over successive ranges of G. With $G=\Pi=5$ and $Q=4$, five non-intersecting edge-node sets 1720 are formed, each associated with one of the switch-planes 120.

A first arrangement associated with switch-plane 120(0) comprises four edge nodes 160(j, γ), γ=k, $0 \leq j < 4$, which connect to switch units 240(k, 0), $0 \leq k < 5$. A second arrangement associated with switch-plane 120(1) comprises four edge nodes 160(j,$(k+j+1)_{modulo\ G}$), $0 \leq j < 4$, which connect to switch unit 240(k, 1), $0 \leq k < 5$. A third arrangement associated with switch-plane 120(2) comprises four edge nodes 160(j, $(k+2j+2)_{modulo\ G}$), $0 \leq j < 4$, which connect to switch unit 240 (k, 2), $0 \leq k < 5$, and so on. Any pair of edge-node sets associated with one switch plane 120(p), $0 \leq p < \Pi$, does not have a common edge node 160 and any pair of node sets associated with different switch planes 120(p) have at most one common edge node 160.

In FIG. 17, and FIG. 18, the abscissa and ordinate indicate the indices j and γ of edge nodes 160(j, γ), $0 \leq j < Q$, $0 \leq \gamma < G$. Each line 1720 indicates a set of edge nodes connecting to a switch unit 240(k,p) in switch plane 120(p), $0 \leq p < \Pi$. The ordinate range is repeated for clearly illustrating the orthogonality of edge-node sets connecting to the switch units 240, where any two lines 1720 intersect in at most one point. Thus, for switch plane p=2, the bottom line 1720 indicates that edge nodes 160(0,2), 160(1,4), 160(2,1), and 160(3,3) connect to switch unit 240(0,2) and the top line 1720 indicates that edge nodes 160(0,1), 160(1,3), 160(2,0), and 160(3,2) connect to switch unit 240(4,2). The edge-node set connecting to each switch unit 240(k,p) may be read from the table in FIG. 11 but are presented graphically in FIG. 17 and FIG. 18 to clearly illustrate the connectivity rule.

Figure 19:
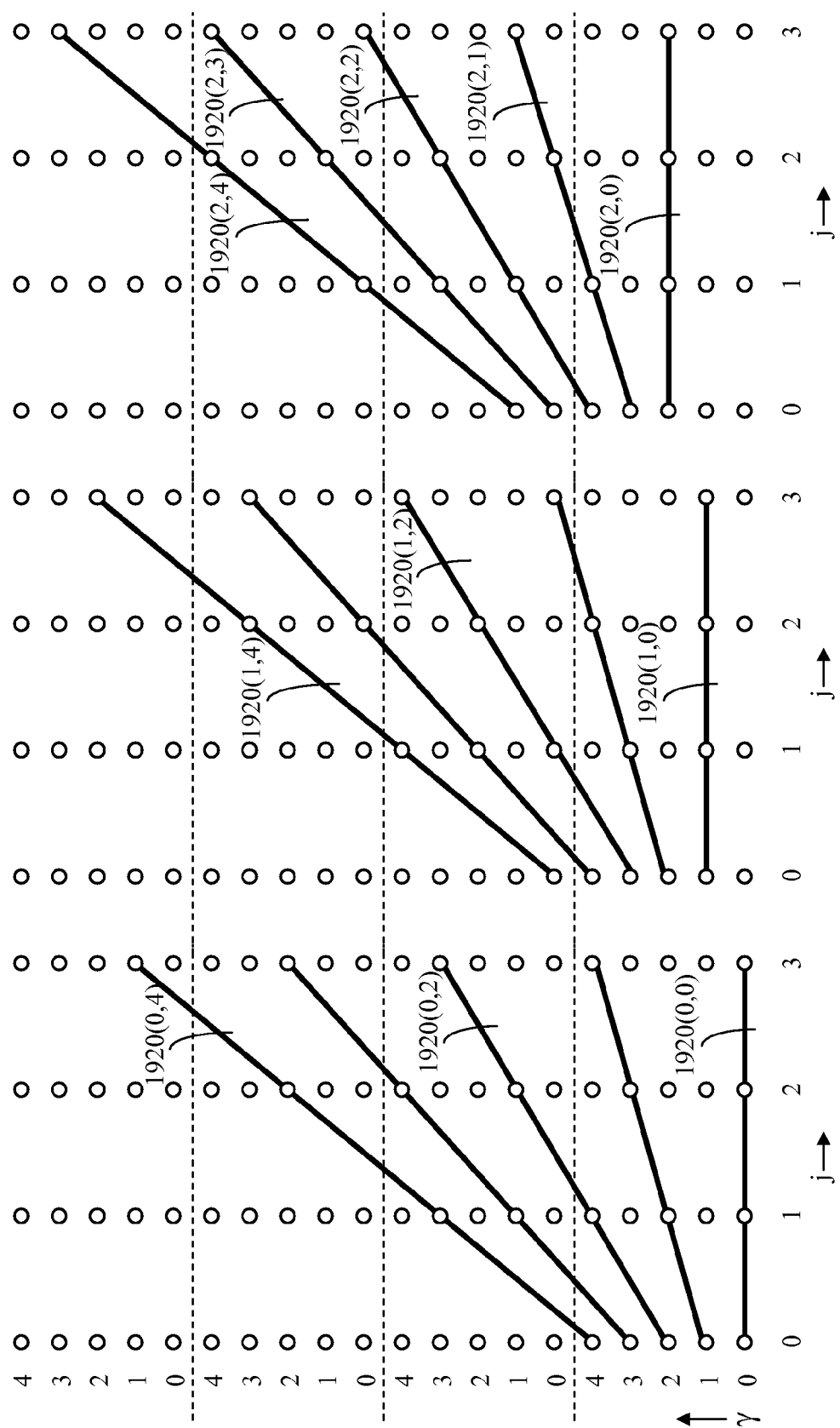
FIG. 19 and FIG. 20 provide an alternate view of the arrangement of FIGS. 17 and 18.
Figure 20:
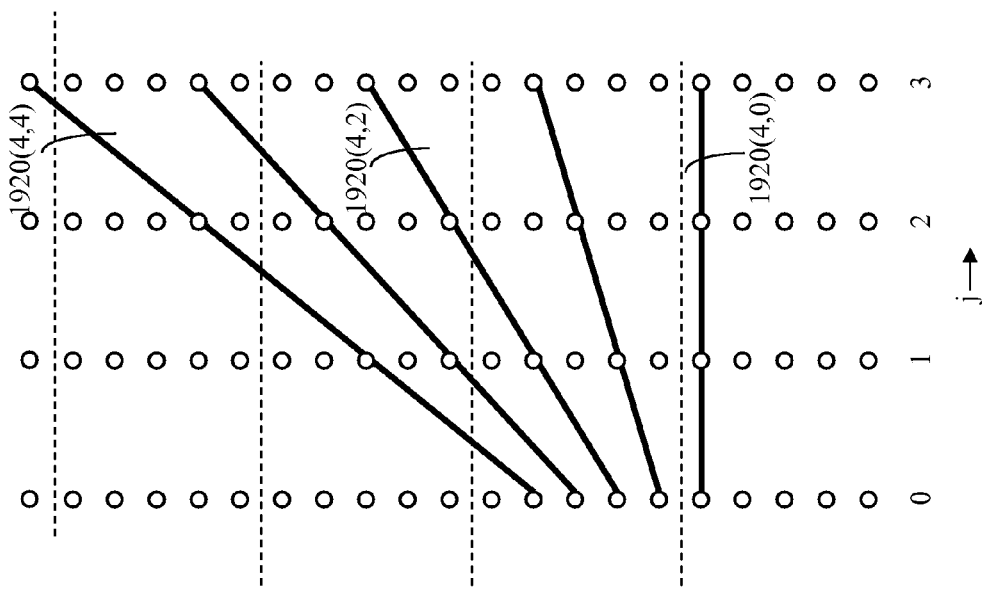
Figure 20:
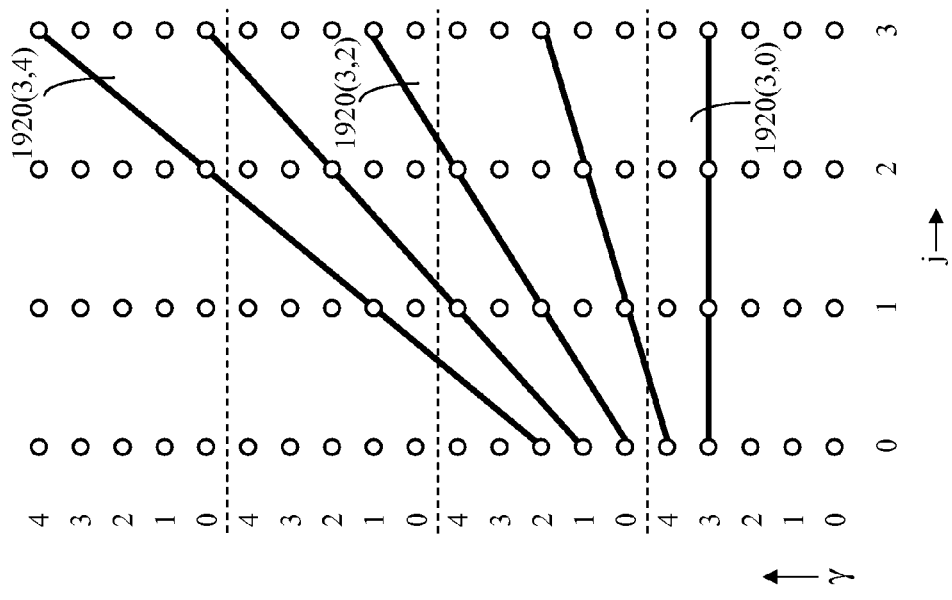

The edge-node sets thus formed are further depicted in FIG. 19 and FIG. 20 which groups edge-nodes connecting to switch unit 240(k, p), $0 \leq p < \Pi$, in five groups 1920(k,p), each group corresponding to index k, $0 \leq k < G = 5$ in all switch planes 120(p), $0 \leq p < \Pi$. As illustrated, the edge-nodes of each group 1920 corresponding to switch-unit 240(k,p), k>0, may be determined by shifting the edge-node sets of a preceding group corresponding to switch-unit 240(k−1,p). Thus, it is convenient to initially identify the edge-node sets corresponding to switch unit 240(0,p), $0 \leq p < \Pi$, then shift the pattern upwards for each succeeding value of k. It is observed from FIG. 19 and FIG. 20 that the edge-node sets of the same group-index k do not intersect (with no common edge nodes in any pair of edge-node sets).

Figure 21:
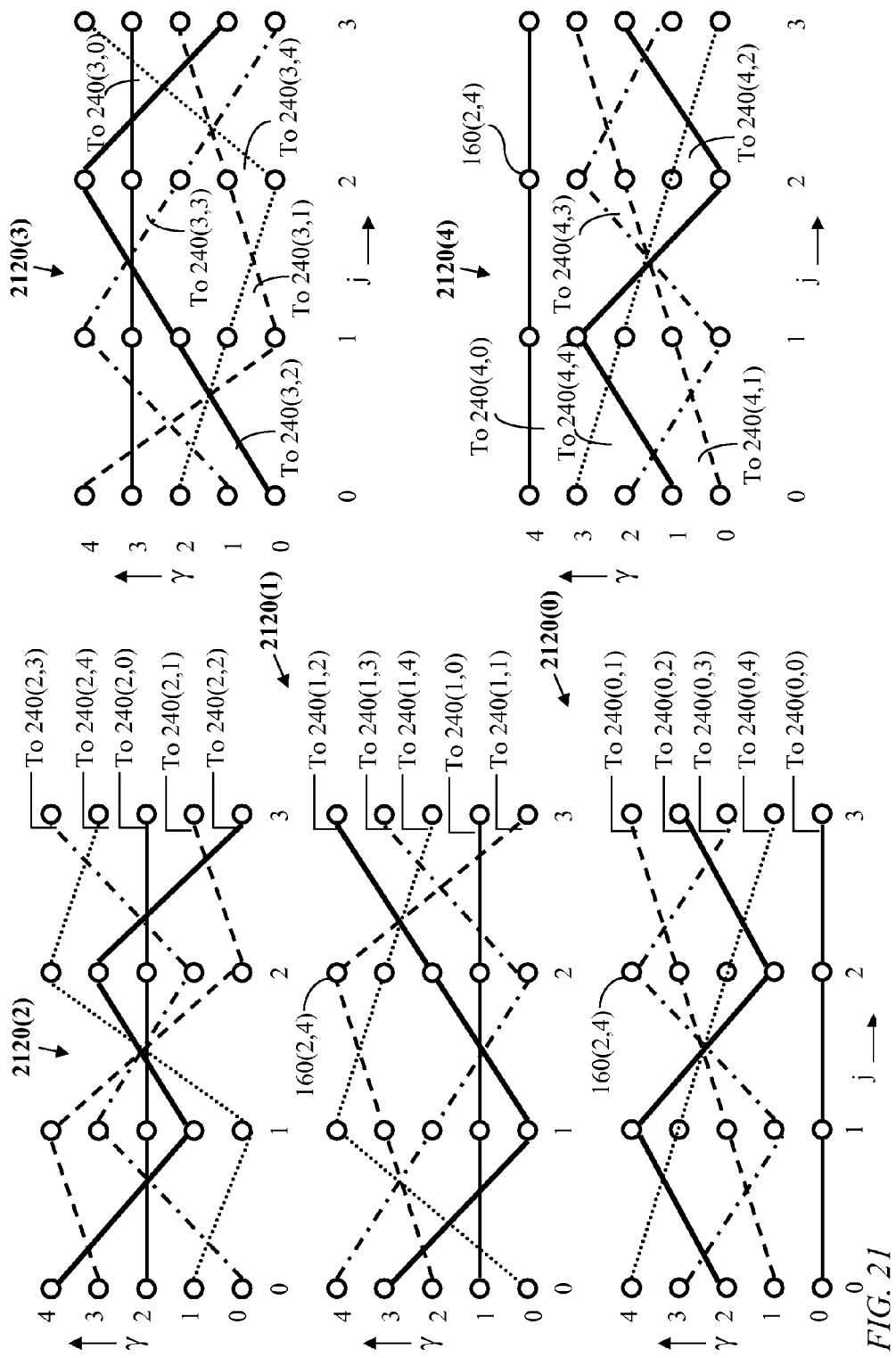
FIG. 21 illustrates orthogonal sets of edge nodes intersecting in one edge node.

FIG. 21 illustrates orthogonal source-node sets 2120(0), 2120(1), 2120(2), 2120(3), and 2120(4) with the connectivity of FIG. 11. FIG. 21 is derived from FIG. 11 or FIG. 17 and FIG. 18. The abscissa and ordinate indicate the indices j and y of edge nodes 160(j, γ), $0 \leq j < Q$, $0 \leq y < G$. Edge nodes 160 (j,γ) connecting to each switch unit 240(k,p) in each switch plane 120(p), $0 \leq p < \Pi$ are indicated. For example, in switch plane 120(3), edge nodes 160(0,2), 160(1,0), 160(2,3), and 160(3,1) connect to switch unit 240(4,3). Each edge node is common in five source-node sets. For example, edge node 160(0,0) is a common node in five orthogonal edge-node sets connecting to switch units 240(0,0), 240(1,4), 240(2,3), 240 (3,2), and 240(4,1), and edge-node 160(1,2) is a common to edge-node sets connecting to switch units 240(0,1), 240(1,3), 240(2,0), 240(3,2), and 240(4, 4).

Edge-Core Connectors

Figure 22:
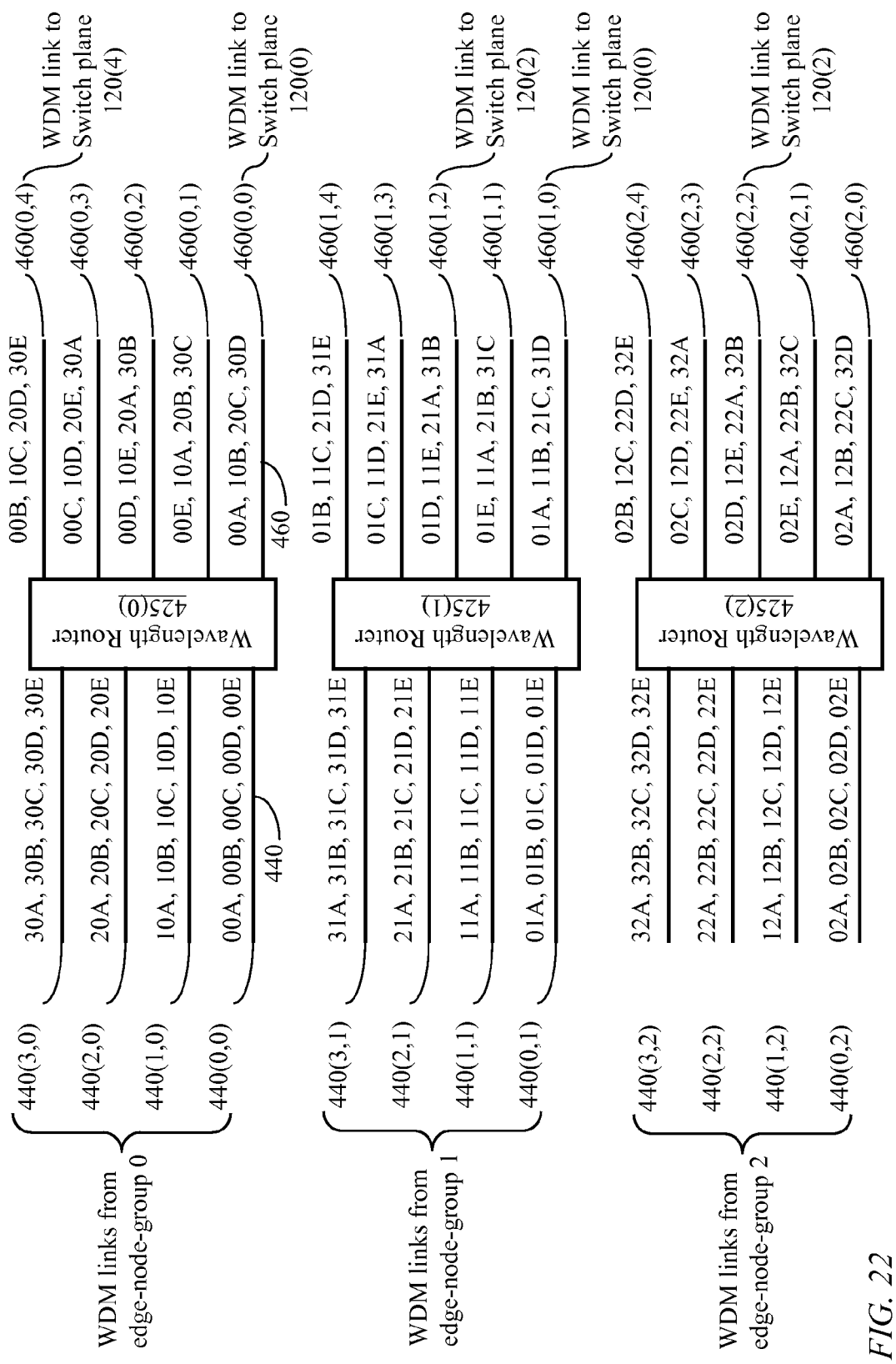
FIG. 22 and FIG. 23 illustrate spectral content at input and output of wavelength routers connecting edge nodes to wavelength demultiplexers according to an embodiment of the present invention.
Figure 23:
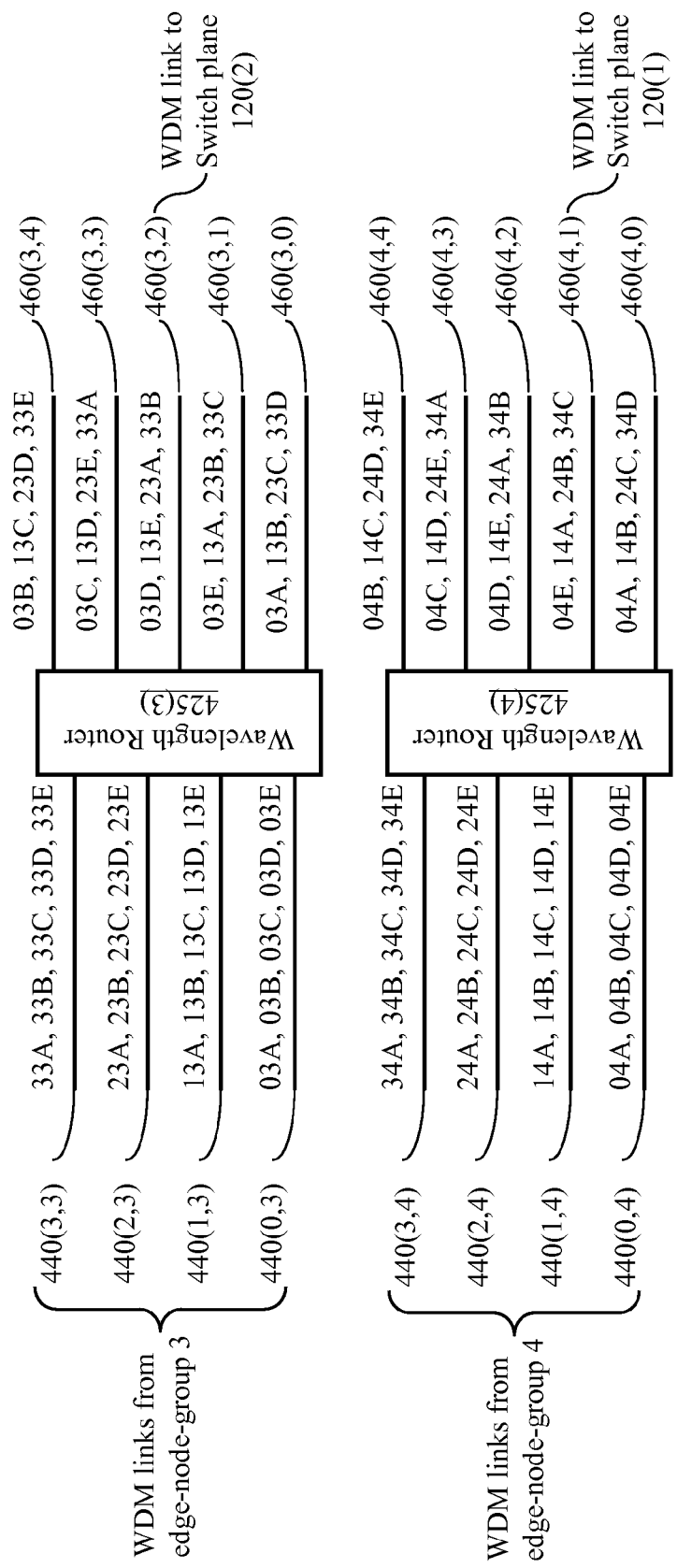
Figure 25:
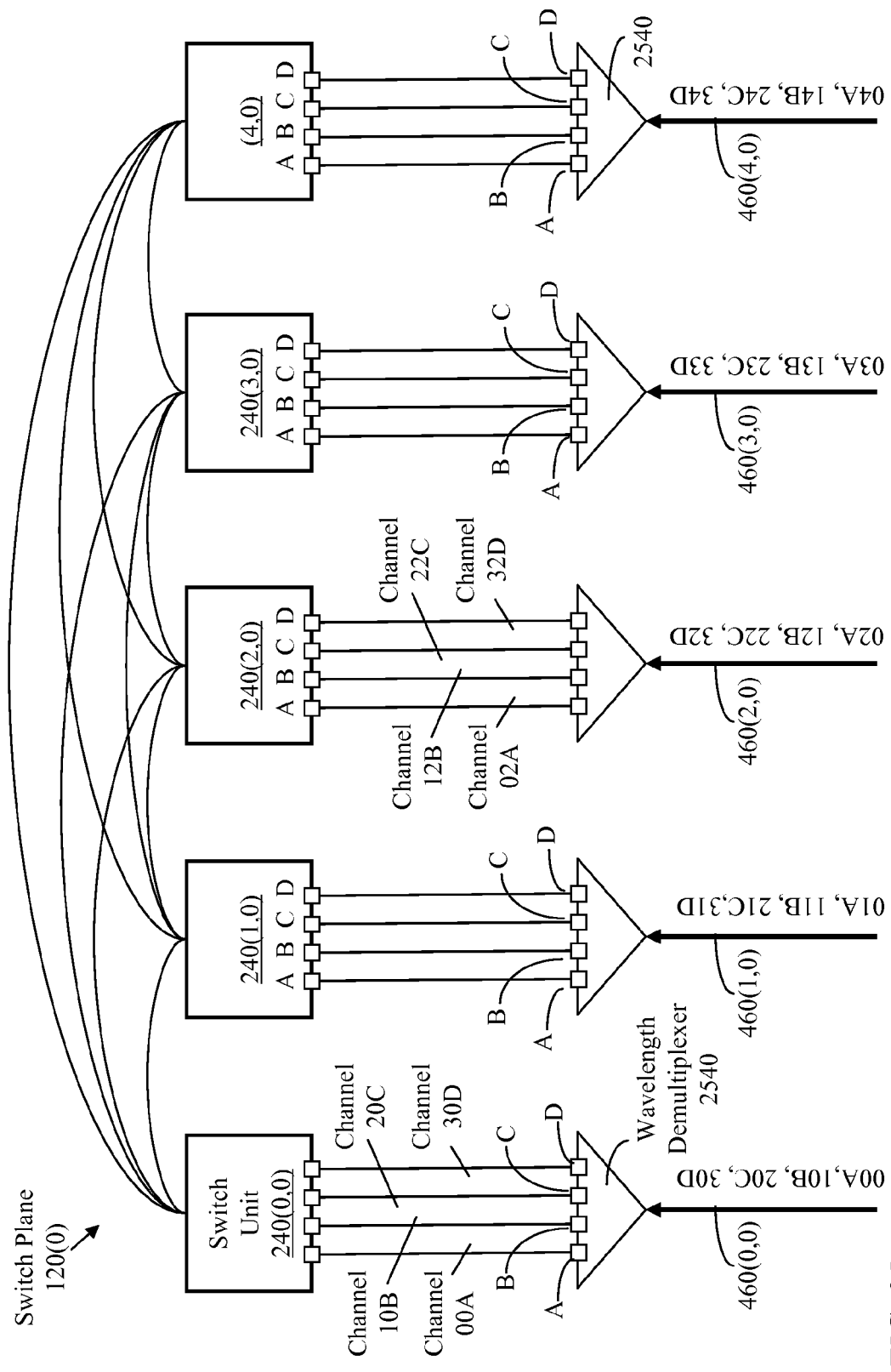
FIGS. 25-29 illustrate a connectivity arrangement of wavelength demultiplexers to switch units of switch planes according to the exemplary connectivity arrangement of FIG. 11 implemented using the wavelength routers of FIGS. 22 and 23.
Figure 26:
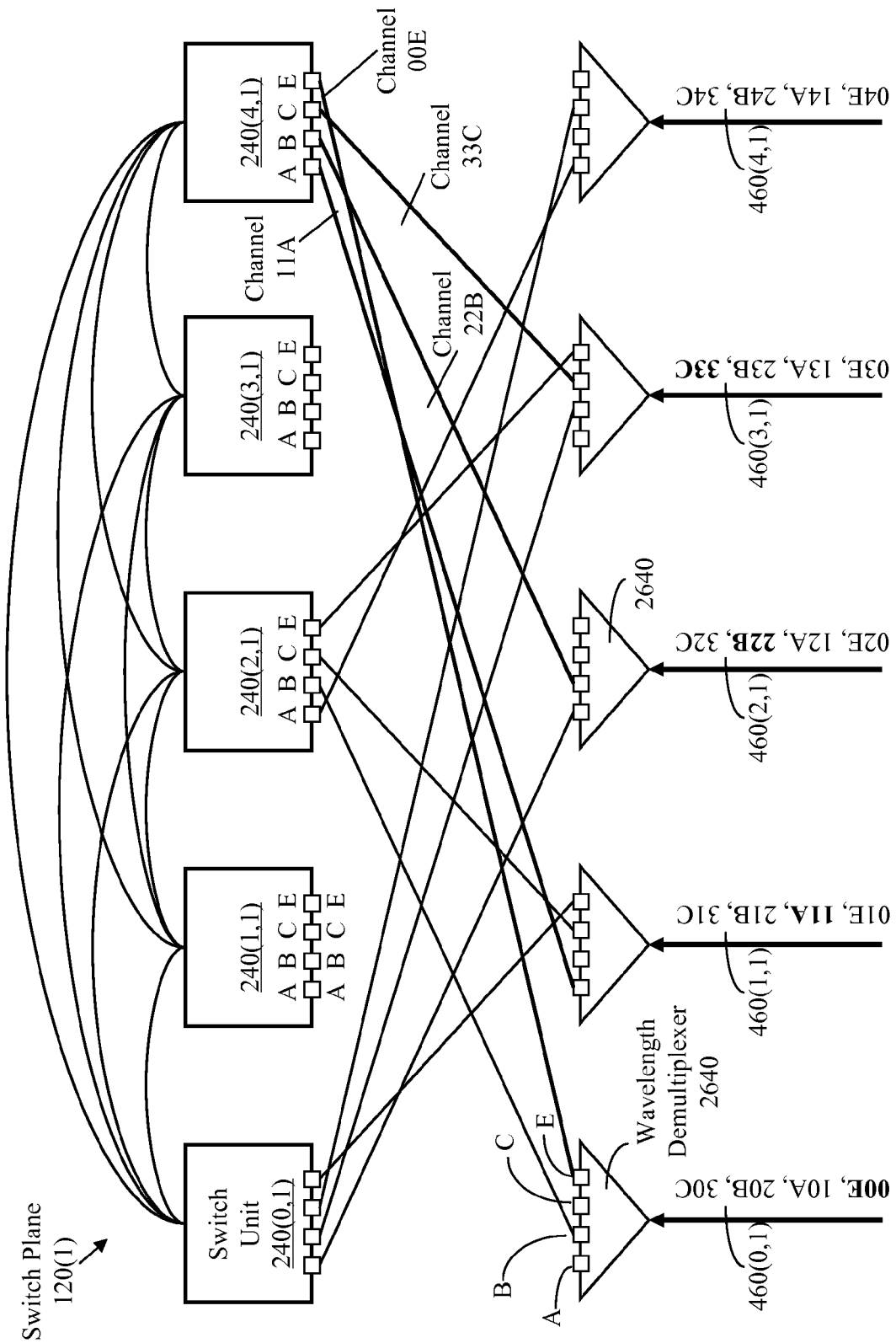
Figure 27:
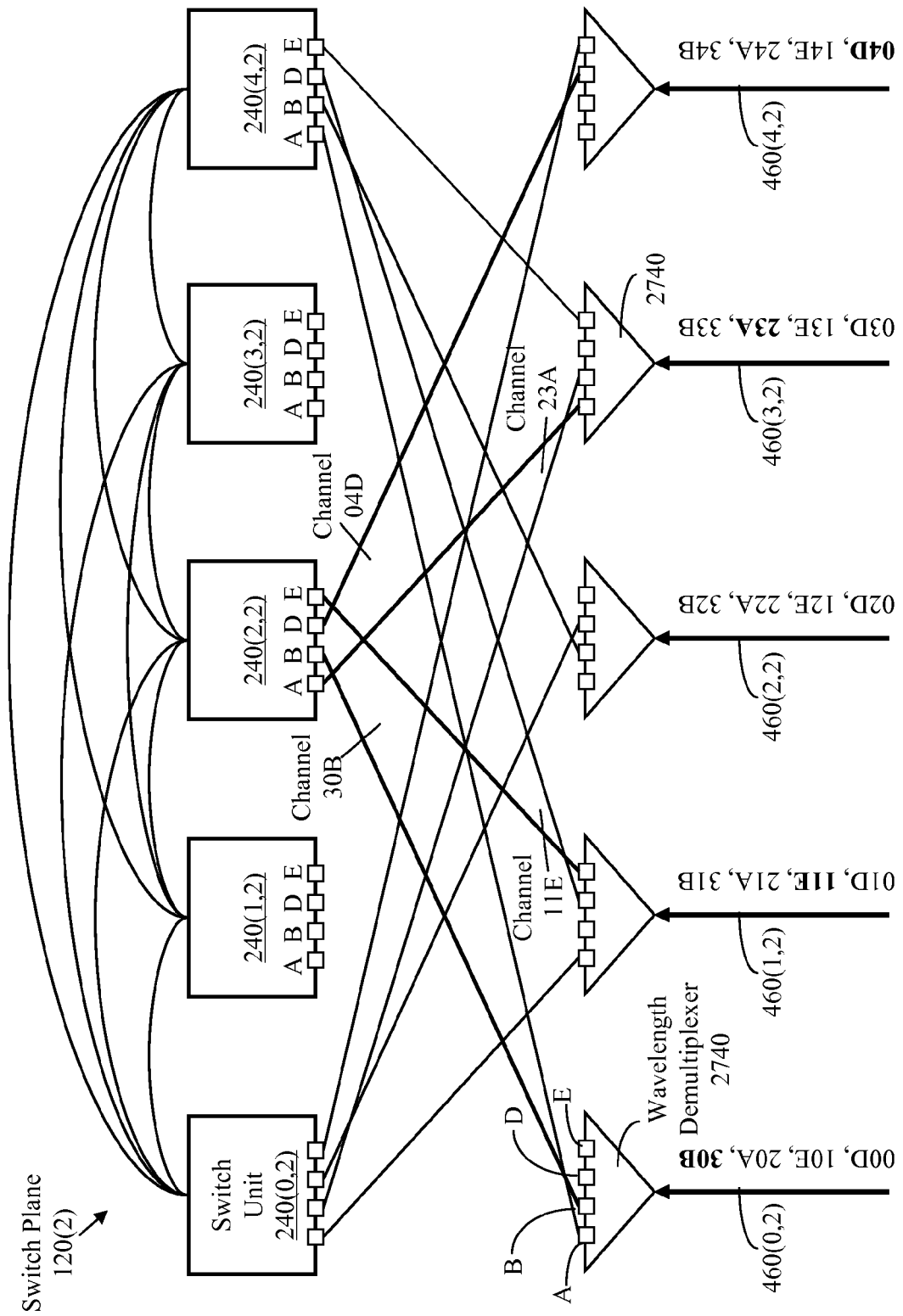
Figure 28:
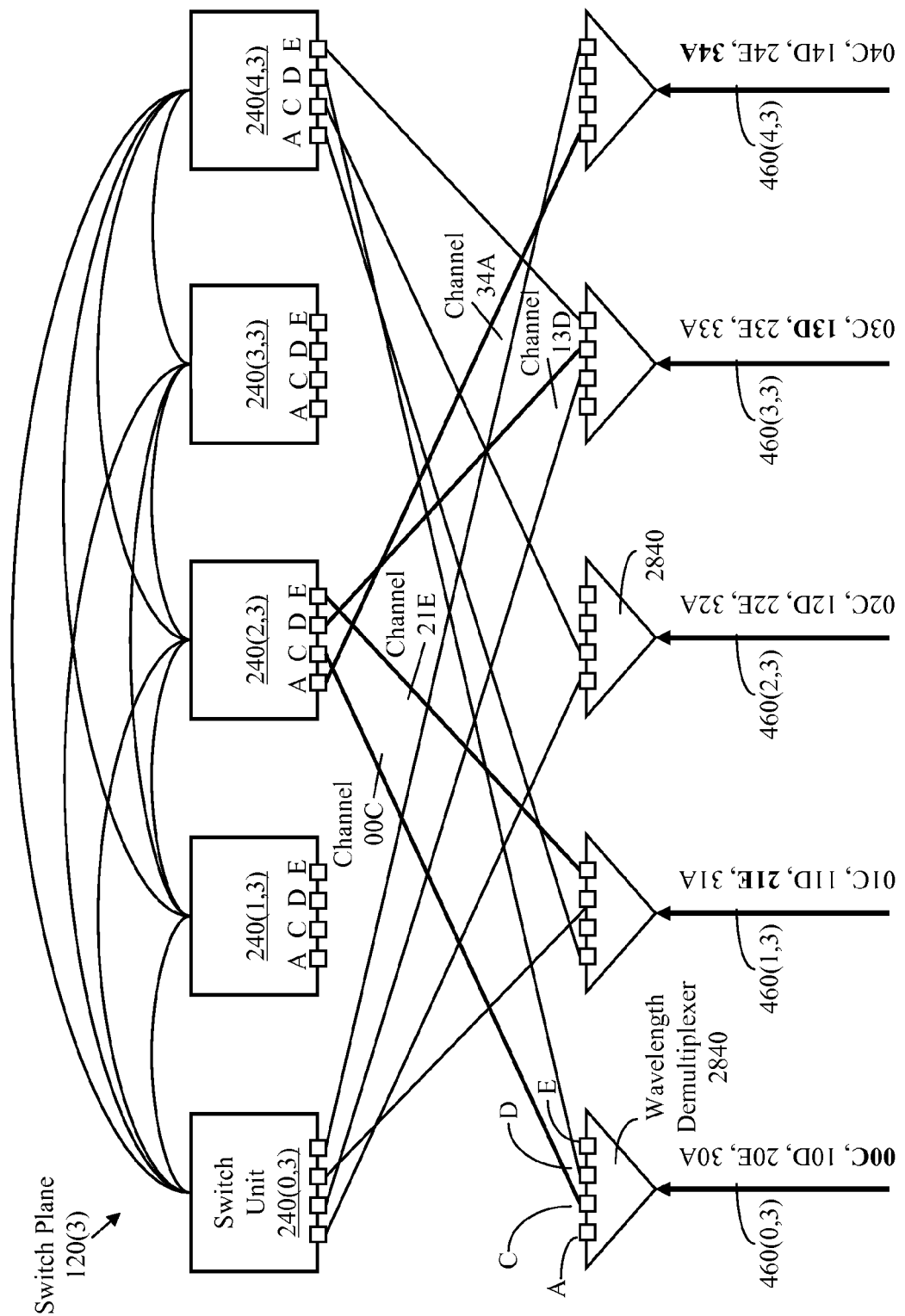
Figure 29:
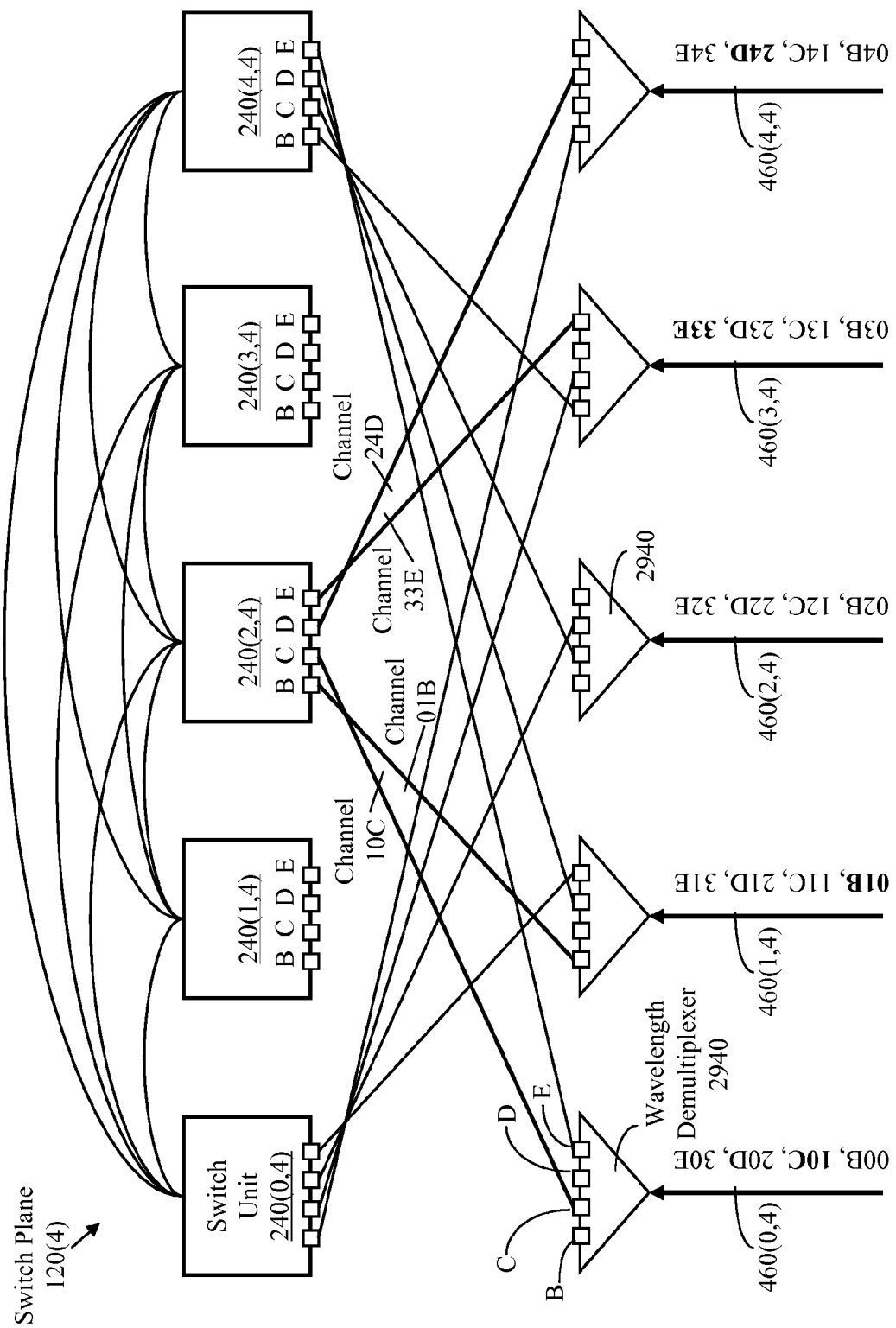

FIG. 22 and FIG. 23 illustrate an exemplary configuration of five wavelength routers 425(0), 425(1), 425(2), 425(3), and 425(4) each associated with an edge-node group comprising four edge nodes 160 in the full-mesh structure of FIG. 2. Each edge node 160 has an upstream WDM link 440 carrying wavelength channels to a respective one of the five wavelength routers 425. Edge nodes 160(j,γ) are to be connected to switch units 240(k,p) according to predetermined patterns as described above. A wavelength channel from an edge node 160(j,γ) occupying wavelength band (spectral band) β is represented in FIG. 22 and FIG. 23 as "jγβ". Considering the use of five wavelength bands, β may take any of five values denoted herein as wavelength bands A, B, C, D, and E. An edge node 160(j,γ) has a WDM link 440 to a wavelength router 425(γ) carrying five wavelength channels represented as "jγA", "jγB", "jγC", "jγD", and "jγE". For example, edge node 160(0,0) has a WDM link 440(0,0) carrying five wavelength channels "00A", "00B", "00C", "00D", and "00E" to wavelength router 425(0). Each output WDM link 460(γ,p) of wavelength router 425(γ) comprises four wavelength channels of different wavelength bands, one from each of the four edge nodes 160(0,γ), 160(1,γ), 160(2,γ), and 160(3,γ). For example, wavelength router 425(1) has four input WDM links 440(0,1), 440(1,1), 440(2,1), 440(3,1) originating from edge nodes 160(0,1), 160(1,1), 160(2,1), and 160(3,1) each carrying the five wavelength bands A, B, C, D, and E. Wavelength router 425(1) has five output WDM links 460(1,0), 460(1,1), 460(1,2), 460(1,3), and 460(1,4) each directed to a switch unit 240 in one of five switch planes. Each WDM output link 460 of wavelength router 425(1) carries four wavelength bands, one from each of the four edge nodes 160(0,1), 160(1,1), 160(2,1), and 160(3,1). Wavelength routers 425(2), 425(3), and 425(4) likewise connect the third, fourth, and fifth edge-node groups respectively to the five switch planes.

The five output WDM links 460 of each of the five wavelength routers 425 in the above exemplary configuration are directed to the switch planes 120, which may be geographically distributed. Each switch plane 120 comprises five switch units 240 and receives five WDM links collectively containing a wavelength channel from each of the edge nodes 160 of the network.

At the first switch plane 120(0), each of the respective five WDM links from the edge nodes may connect, after demultiplexing into its constituent wavelength channels, to an inlet port 322 in one of the switch units 240. At the second switch plane 120(1), the demultiplexed WDM links from the edge nodes are allocated to inlet ports 322 of the switch units of plane 120(1) according to the pattern indicated in FIG. 11. Likewise, the allocation of wavelength channels to inlet ports 322 at the third switch plane 120(2), the fourth switch plane 120(3) and the fifth switch plane 120(4) are based on the connectivity pattern of FIG. 11. If the five switch planes 120(0), 120(1), 120(2), 120(3) and 120(4) are identically connected to the incoming WDM links, then spatial traffic variation may force the use of two-link-paths in at least one of the five switch planes 120(0) to 120(4).

FIG. 24 illustrates in a table 2400 the preferred asymmetrical connection of upstream and downstream channels of FIG. 11 further indicating the wavelength channels bands at the output of the wavelength routers 425 of FIG. 22 and FIG. 23. An entry 2410 in table 2400 identifies a spectral band defining a wavelength channel. An entry 2412 identifies an edge node having an upstream channel to a switch unit 240(k,p) of a switch plane 120(p). An entry 2414 identifies an edge node having a downstream channel from switch unit 240(k,p) of a switch plane 120(p).

Each row 2420 includes identifiers (x,y) of edge nodes 160(x,y) connecting to switch units 240(k,p) of a switch plane 120(p). All the edge nodes 160(j,γ) listed in a row 2420 corresponding to a switch plane 120(p) have upstream wavelength channels of the same wavelength band β (reference 2410; one of wavelength bands "A", "B", "C", "D", or "E"). For example, edge nodes 160(0,0), 160(0,1), 160(0,2), 160 (0,3), and 160(0,4) use wavelength channel β=A for their upstream wavelength channels to switch plane 120(0) (top row 2420-0) but use wavelength bands E, D, C, and B in their upstream wavelength bands to switch planes 120(1), 120(2), 120(3), and 120(4), respectively (rows 2420-4, 2420-8, 2420-12, and 2420-16).

Output WDM links 460 from each wavelength router 425 connect to the switch planes 120(p), $0 \leq p < \Pi$. As illustrated in FIG. 25 to FIG. 29, arrays of wavelength demultiplexers 2540, 2640, 2740, 2840, and 2940, in switch planes 120(0), 120(1), 120(2), 120(3), and 120(4), respectively, demultiplex WDM links 460 into their constituent wavelength channels which connect to respective inlet ports of switch units 240 according to the connectivity pattern of Table 2400 of FIG. 24. Each individual wavelength channel from a wavelength demultiplexer to a switch unit 240 is identified in FIG. 25 to FIG. 29 according to the indices (j, γ) of the edge node from which the wavelength channel originates. For example, wavelength channels, identified in FIG. 28 as channels 00C, 13D, 21E, and 34A, connecting wavelength demultiplexers 2840 to switch unit 240(2, 3) are upstream wavelength channels from edge nodes 160(0, 0), 160(1, 3), 160(2,1), and 160(3, 4) of wavelength bands C, D, E, and A, respectively.

Figure 30:
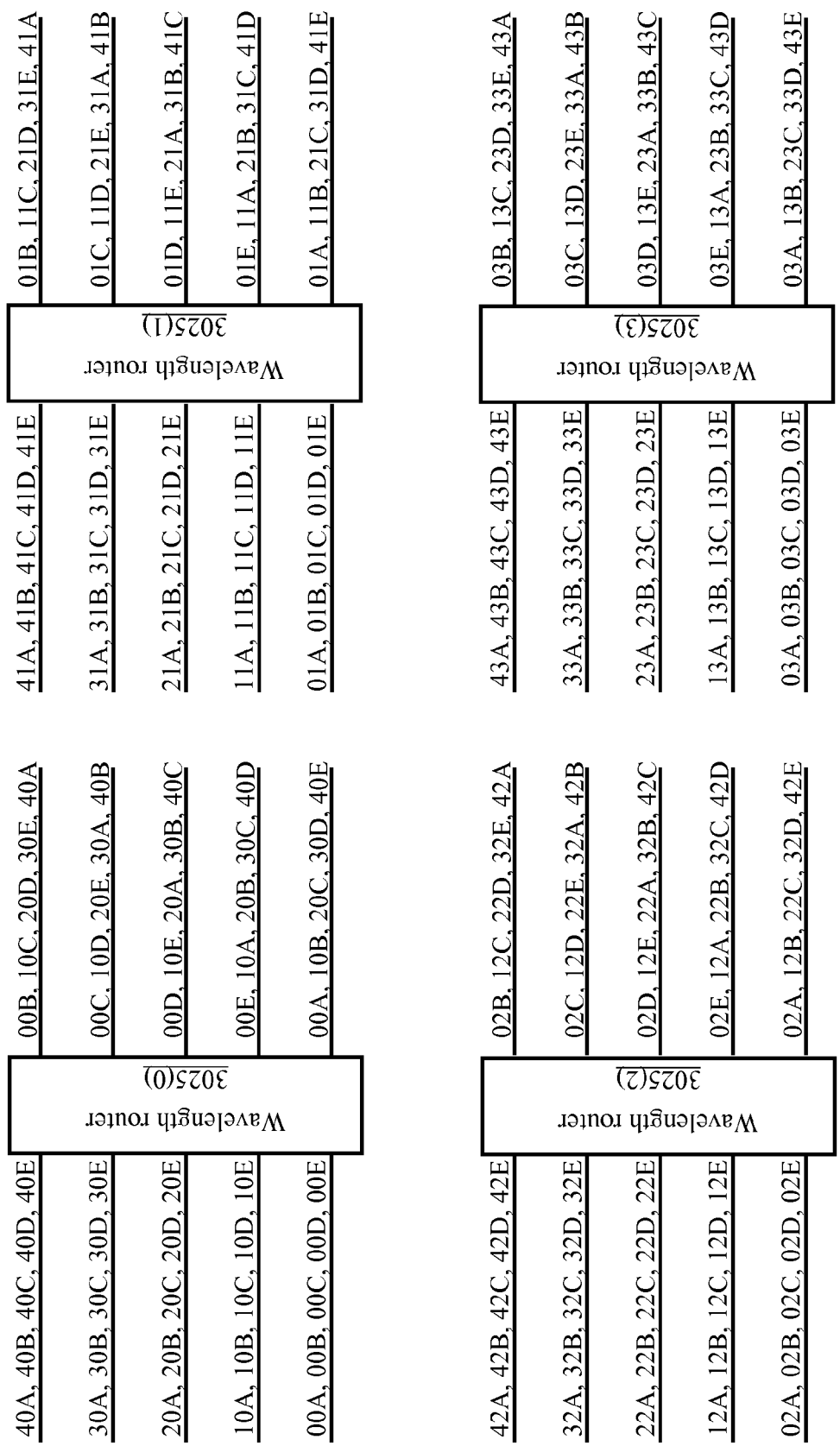
FIG. 30 and FIG. 31 illustrate spectral content at input and output of an alternate set of wavelength routers connecting edge nodes to wavelength demultiplexers according to an embodiment of the present invention.
Figure 31:
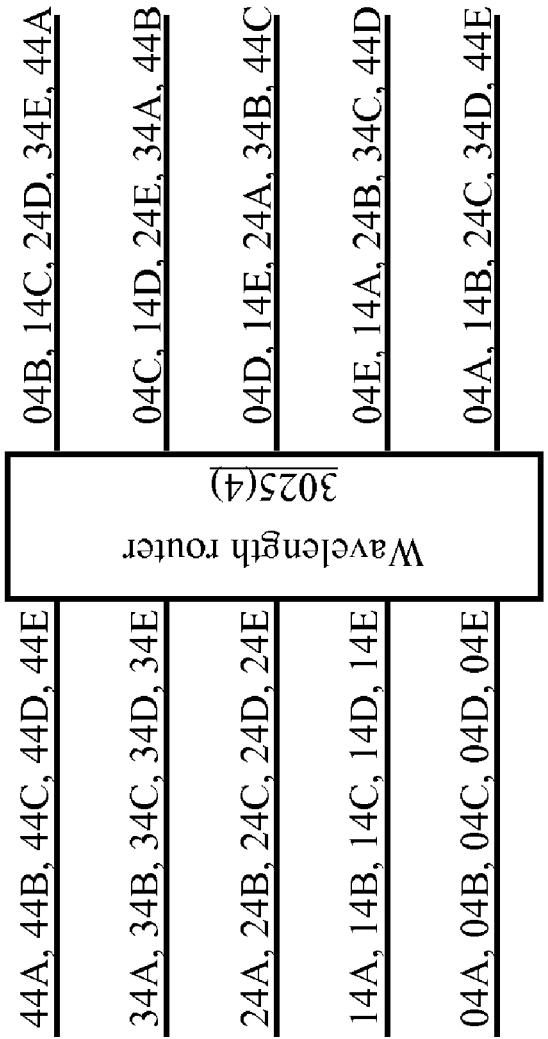

The wavelength-router configuration of FIG. 22 and FIG. 23 are based on four wavelength channels per edge node 160. An alternate configuration of wavelength routers 3025, individually identified as 3025(0) to 3025(4), is illustrated in FIG. 30 and FIG. 31 for interchanging wavelength channels of upstream WDM links originating from 25 edge nodes, where each upstream WDM link from a wavelength router to a switch plane carries five wavelength channels instead of four wavelength channels.

Figure 32:
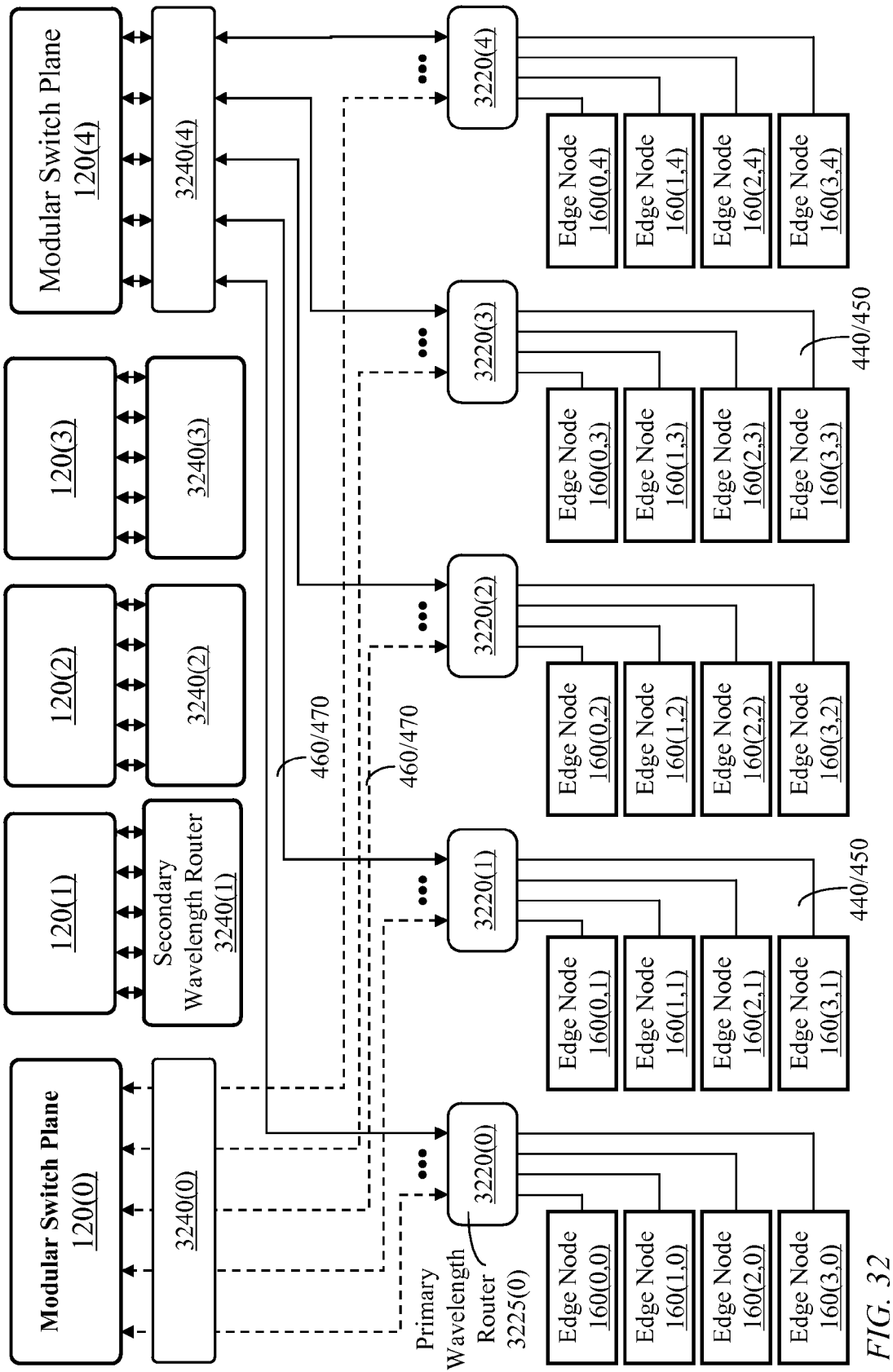
FIG. 32 illustrates a network based on the exemplary connectivity arrangement of FIG. 7 comprising centralized switch planes with symmetrical connectivity in the upstream and downstream directions.

FIG. 32 illustrates a network 3200 comprising twenty edge nodes 160(j,γ), 0≦j<4, 0≦γ<5, connecting to switch planes 120(p), 0≦p<Π=5, through primary wavelength routers 3220 and secondary wavelength routers 3240. The twenty edge nodes 160 are arranged into five groups. The first group comprises edge nodes 160(0,0), 160(1,0), 160(2,0), and 160 (3,0). The second group comprises edge nodes 160(0,1), 160 (1,1), 160(2,1), and 160(3,1), and so on. Five primary wavelength routers 3220(0) to 3220(4) route wavelength channels from upstream WDM links 440 to upstream WDM links 460 and wavelength channels from downstream WDM links 470 to downstream WDM links 450. Each switch plane 120(p), 0≦p<Π is associated with a secondary wavelength router 3240(p). FIG. 32 corresponds to the symmetrical connectivity pattern of FIG. 9.

Downstream wavelength channels from switch planes 120 are directed to edge nodes 160 through secondary wavelength routers 3240, downstream WDM links 470, primary wavelength routers 3220, and downstream WDM links 450.

Figure 33:
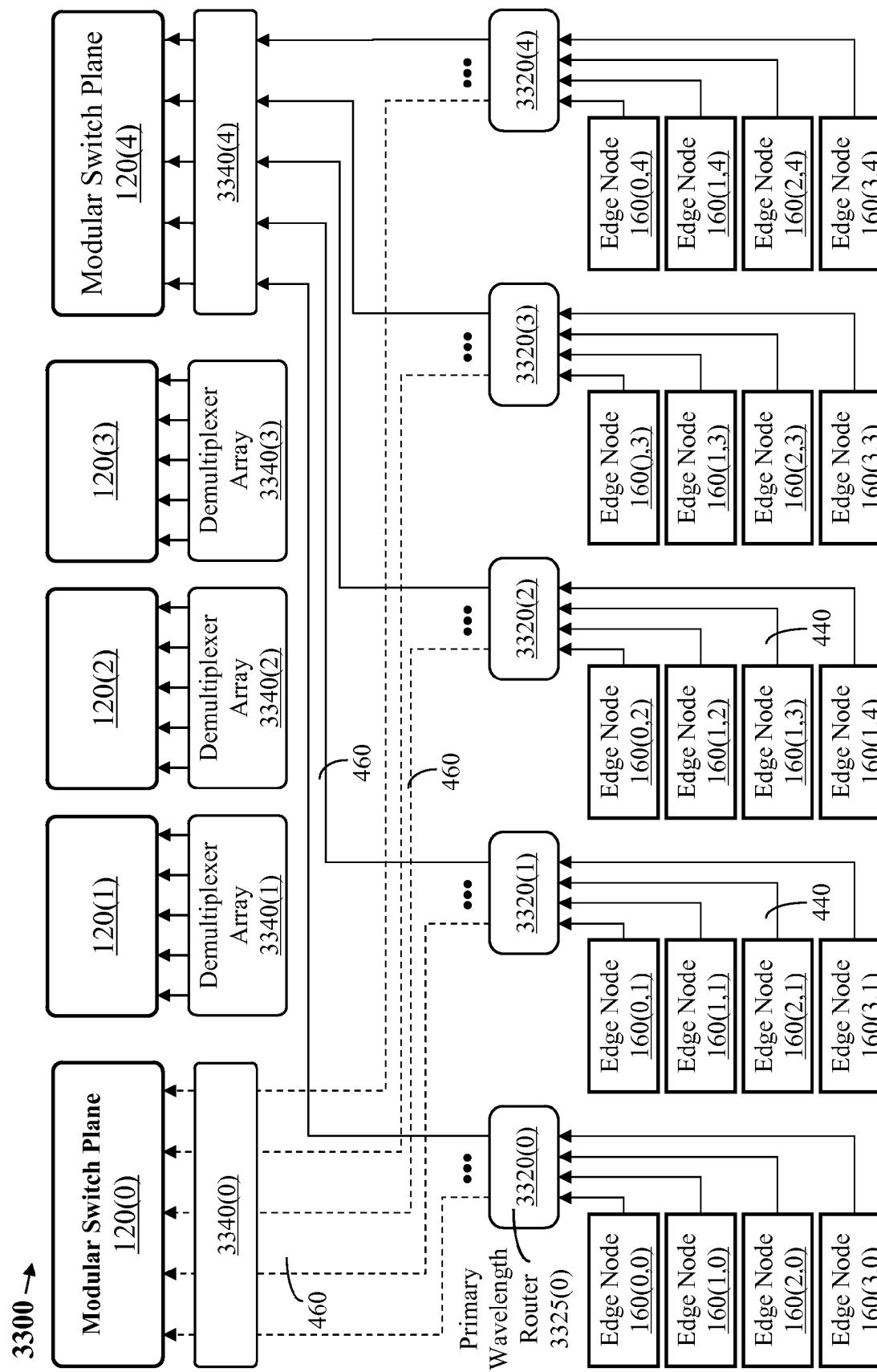
FIG. 33 illustrates a network based on the exemplary connectivity arrangement of FIG. 11 comprising centralized switch planes with asymmetrical inlet and outlet connectivity to edge nodes, the figure indicating only upstream connections.
Figure 34:
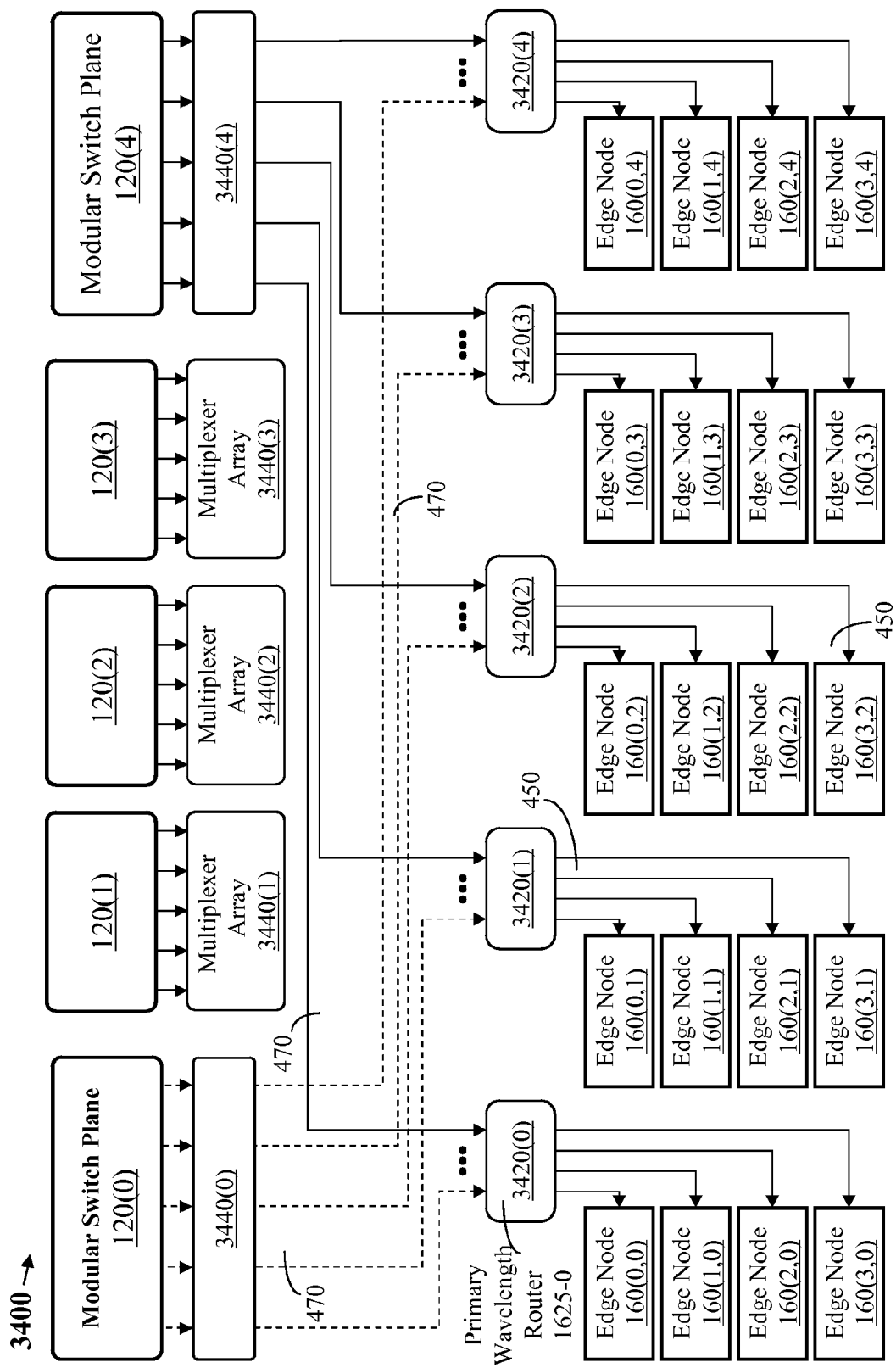
FIG. 34 illustrates the downstream connectivity of the network of FIG. 33.

FIG. 33 and FIG. 34 illustrate a network similar to the network of FIG. 32 but with asymmetrical upstream and downstream connectivity to each of switch planes 120(0) to 120(4) according to the connectivity pattern illustrated in FIG. 11. FIG. 33 depicts an upstream view of an asymmetrical network having asymmetrical upstream/downstream connections of edge nodes 160 to switch plane 120. The network comprises 20 edge nodes 160, five switch planes 120, five primary wavelength routers 3320 and five demultiplexer arrays 3340.

Each of five upstream wavelength routers 3320(0) to 3320 (4) is associated with a corresponding group of edge nodes 160. Each upstream wavelength router 3320 receives a WDM link 440 from each edge node 160 in a respective edge-node group and distributes the wavelength channels to WDM links 460 as illustrated in FIG. 22 and FIG. 23. A demultiplexer array 3340(p) is associated with each switch plane 120(p) and demultiplexes each upstream WDM link 460 from a wavelength router 3320 into its constituent wavelength channels. The constituent wavelength channels (in separate fiber connectors) connect to inlet ports 322 of switch units 240 as illustrated in FIG. 25 to FIG. 29. Channels from outlet ports 326 of the switch units 240 of a switch plane 120 are multiplexed onto WDM links 470 which are directed to downstream wavelength routers 3420 (FIG. 34). The connection pattern of upstream wavelength routers 3320 is devised to connect upstream wavelength channels from edge nodes 160 to switch units 120 according to a predefined orthogonal-connection scheme.

FIG. 34 illustrates connections of downstream wavelength channels from switch planes 120 to edge nodes 160 through wavelength multiplexers 3440, downstream WDM links 470, downstream wavelength routers 3420, and downstream WDM links 450.

Switching Granularity

In a switched network, a source node may direct data it receives from several data sources to different sink nodes each supporting a number of data sinks. In a conventional data-transfer mode known as "circuit switching", or "channel switching", a path from a source node to a sink node comprising a channel from a source node to an intermediate node and a channel from the intermediate node to the sink node, possibly traversing channels between other intermediate nodes, may be reserved and held for a period of time, known as the holding time, sufficient to transfer intended data from the source node to the sink node. The path may carry data from a single data source or a number of data sources. This mode of data transfer was the first used in shared telecommunications networks, such as the telephone network where a path was typically held for a relatively long period of time. The significant increase in the capacity per channel, due to improved transmission technology, and the use of digital encoding led to the use of time-division-multiplexing (TDM) where a path from a source node to a sink node traversing a number of concatenated channels may be held during a time slot, or a number of time slots, in a cyclic time frame, for a number of successive time frames. During other time slots, the constituent channels of the path are released for possible participation in other paths. A data segment of a predetermined maximum size is transferred during a time slot. The TDM data-transfer mode is efficient when a large proportion of connections is of large duration, each occupying time slots in many successive time frames. With connections of shorter duration, asynchronous transfer mode (ATM) may be employed. Like TDM, ATM transfers a data segment of a predetermined maximum size during a time slot. However, ATM need not recognize time-frame boundaries.

The network 100 may transfer data in different modes. However, transfer of data packets of varying and arbitrary lengths is of particular interest, given the dominance of the IP (Internet Protocol) which handles data packets of different and arbitrary sizes and which can yield an efficient network if limited to network access.

As described above with reference to FIG. 1, an edge node 160 has a number of ingress ports connecting to ingress channels carrying data from data sources, a number of egress ports connecting to egress channels carrying data to data sinks, a number of outbound ports connecting to upstream channels to switch planes 120, and a number of inbound ports connecting to downstream channels from switch planes 120. An ingress port may receive data packets of different sizes. The ingress port divides each data packet into packet segments of the same size which are switched within the edge node 160 to outbound ports and switched in selected switch planes 120 to destination edge nodes. An inbound port receives data segments from switch planes 120, switches the data segments to respective egress ports where data segments belonging to a source-sink connection are assembled into data packets and transmitted to respective data sinks.

Preferably, data from an edge node 160 to another edge node 160 is transferred in a TDM mode through at least one switch plane 120. The number of time slots per time frame allocated to a path traversing a switch plane 120 may be updated frequently as traffic patterns change. The aggregate data from an edge node 160 to another edge node is likely to comprise numerous source-sink connections and the aggregate flow rate is therefore likely to change slowly. Thus, the rate of updating the number of allocated time slots may be reduced; for example the mean update interval may be of the order of 20 time frames thus reducing the processing effort. However, the time-slot allocation may be updated every time frame if necessitated by very volatile temporal-spatial traffic variations. With the present state of the art, high-throughput schedulers can be devised to handle very high connection-setup rates. For example, U.S. patent application Ser. No. 10/410,169, filed on Apr. 10, 2003, and titled "Scheduling in a Fast Optical Switch" discloses a scheduling system which uses pipelined scheduler modules to achieve a high throughput.

Thus, the fast-switching network core 110 is preferably shared according to conventional time-division multiplexing (TDM) mode. The switching granularity is determined by the number ν of time slots per time frame; the larger the number ν the finer the granularity.

The number ν of time slots per time frame is preferably at least equal to the maximum number of outer dual ports connecting each switch unit to a group of edge nodes 160. Thus, an upstream channel connecting to an inlet port of any switch unit 240 of a given switch plane 120 can distribute its carried load equally among all downstream channels connecting to any other switch unit 240 if so desired. Thus, with each switch unit 240 having a maximum of Q dual outer ports, the number ν has a lower bound of Q.

The duration of a time slot is dictated by the switching latency and should be an order of magnitude larger than the switching latency in order to reduce waste to an acceptable level. If the switching latency of a switch unit 240 is 40 nanoseconds, for example, then the time slot duration is preferably selected to on the order of one microsecond. The number ν has an upper bound determined by an acceptable delay at source where a signal arriving at any instant of time is held to be transmitted during its designated time slot which may be in a subsequent time frame. If a delay of 256 microseconds, for example, is acceptable, and with time slot duration of one microsecond, then a time frame of 256 time slots (ν=256) would be appropriate.

Switch-Plane Control

A network 100 may comprise centralized switch planes 120 each including collocated switch units 240. As such, each switch plane 120 may have a single time reference. Each outlet port of an edge node 160 has an upstream channel 141 to a switch plane and is adapted to time-lock to a master time indicator of the switch plane. If a switch plane 120 in a network 100 comprises geographically distributed switch units 240 where the propagation delay between any two switch units 240 of the distributed switch plane 120 is significant, then the use of a common time reference for all switch units of a switch plane would not be generally feasible and each edge node may then time-lock to individual switch units 240. In addition, a buffer would be needed at the inward port of each switch unit 240 in order to provide an artificial delay to align incoming signals from other switch units of the switch plane according to the time reference of the each switch unit 240.

Centralized Switch Plane

Figure 35:
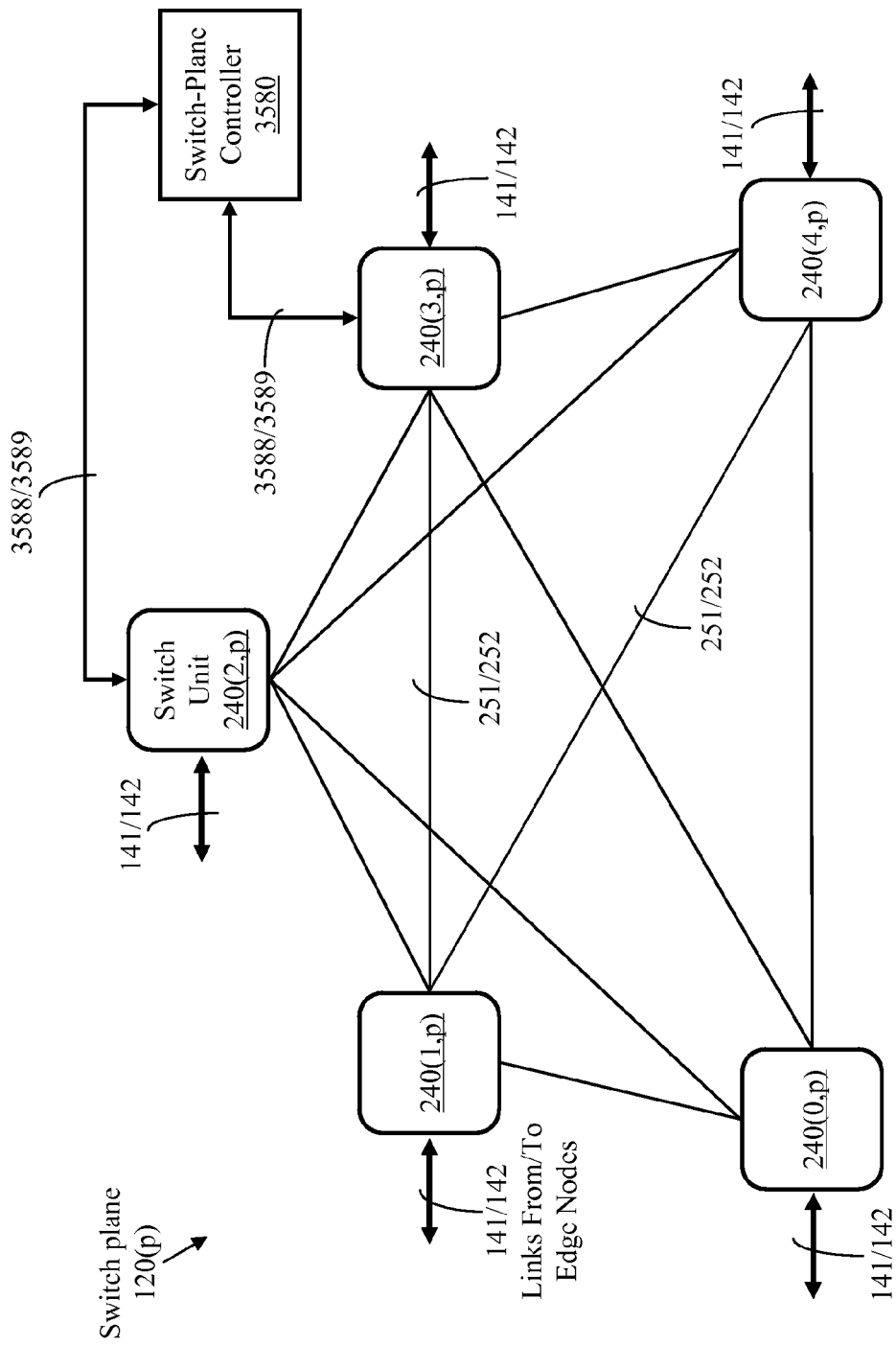
FIG. 35 illustrates placement of a switch-plane controller in the exemplary switch plane of FIG. 2.

FIG. 35 illustrates a switch plane 120(*p*) comprising collocated switch units 240(*k,p*), 0≦k<5 (G=5), 0≦p<Π, in a network 100 comprising Π switch planes 120, where each switch plane 120 comprises a switch-plane controller 3580. The switch-plane controller 3580 may be communicatively coupled to one or more switch units 240. In the exemplary configuration of FIG. 35, the switch-plane controller 3580 is connected to switch units 240(2, p) and 240(3,p). Controller 3580 may connect to at least one dual outer port (an inlet port 322 and an outlet port 326) of switch unit 240(3,p), thus reducing by 1 the number of edge nodes 160 that can access the switch plane. Controller 3580 may also connect to a dual outer port in each of two or more switch units 240 of the same switch plane. Preferably, Controllers 3580 of all switch planes 120(*p*), 0≦p<Π, may occupy switch units 240(*k, p*) with the same index k for ease of addressing. For example, controller 3580 may connect to a dual outer port of each of switch units 240(0, p), 0≦p<Π. Each switch unit 240 has an outward channel 251 to each other switch unit. The switch-plane controller 3580 may connect to more than one dual port of switch unit 240(3,p) through dual channels 3588/3589. Each switch unit 240 supports a group of edge nodes and receives control signals from the edge nodes 160 during non-overlapping time slots. Each switch unit 240 transmits control signals to switch unit 240(3,p) during reserved time slots. The control signals are switched during respective reserved time slots in switch unit 240(3,p) to be multiplexed onto channels 3588. If the number of edge nodes 160 per switch plane 120 is smaller than the number ν of time slots per time frame, a single channel 3588 may suffice and all control signals received from all edge nodes would be received at the switch plane during non-overlapping time slots. If the number of edge nodes 160 connecting to the switch plane 120 is larger than ν, then more than one control channel 3588 would be needed. For example, in a switch plane 120 having 32 switch units, with each switch unit supporting 32 edge nodes to a total of 1024 edge nodes, four control channels 3588 would be needed. At most 256 edge nodes connecting to eight switch units may coordinate their control signals to occupy a time frame of 256 time slots. The control signals are transmitted to switch-plane controller 3580 through one of the four control channels 3588.

Figure 36:
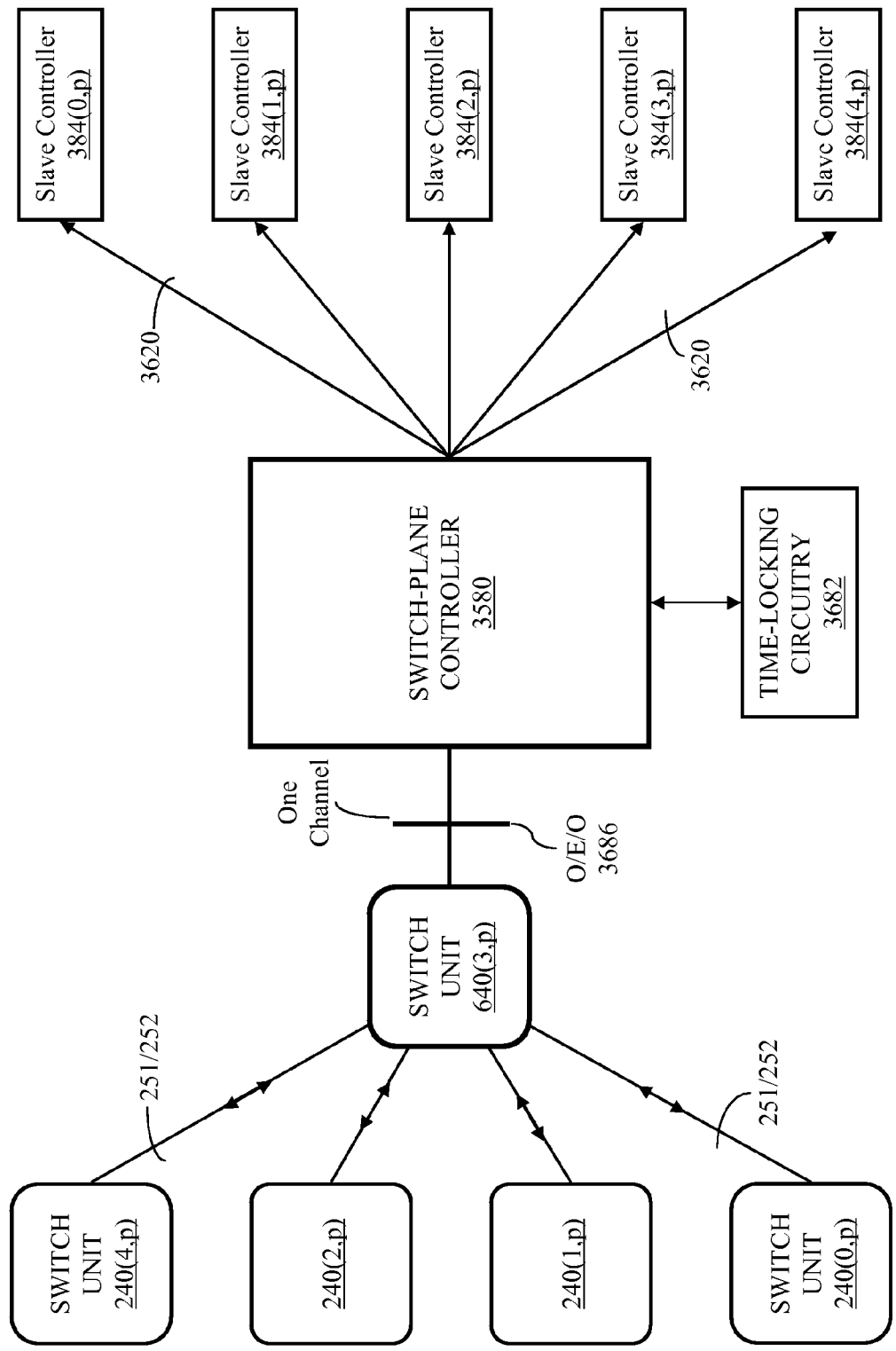
FIG. 36 illustrates a control system for the exemplary centralized switch plane of FIG. 2 comprising a switch-plane controller and a plurality of switch-unit configuration controllers.

FIG. 36 illustrates a control system for a centralized switch plane 120. Switch-plane controller 3580, communicatively coupled to switch unit 240(3,p), exchanges control signals with edge nodes 160 connecting to all switch units 240 of the switch plane during reserved time-slots. An optical-to-electrical and electrical-to-optical conversion unit 3686 converts optical control signals received at switch unit 240(3,p) into electrical signals for processing in the electronic switch-plane controller 3580 and converts electrical control signals from the switch-plane controller 3580 to optical control signals to be transported to the edge nodes. Switch-plane controller 3580 also communicates, preferably through dedicated links 3620, with a configuration controller 384 of each of the switch units 240 of the switch plane. Control signals from edge nodes connecting to switch unit 240(3,p) are switched through switch unit 240(3,p) to the switch-plane controller 3580. Control signals from the switch-plane controller 3580 to edge nodes connecting to switch unit 240(3,p) are switched through switch unit 240(3,p) to respective edge nodes. Control signals from an edge node 160 connecting to switch unit 240(0,p) are switched through switch unit 240(0,p) then through switch unit 240(3,p) to switch-plane controller 3580. Control signals from the switch-plane controller 3580 to edge nodes connecting to switch unit 240(0,p) are switched through switch unit 240(3,p) then switch unit 240(0,p). Control signals from and to switch units 240(1,p), 240(2,p), and 240(4,p) are likewise switched during reserved time slots. Switch-plane controller 3580 also transmits switch-fabric configuration instructions to configuration controllers (slave controllers) 384 (FIG. 3) associated with the switch units 240 of the switch plane to set the connectivity of the switch fabric of each of the switch units 240.

Channel 3588 carries time-multiplexed control signals from all edge nodes 160 connected to the switch plane 120 and a channel 3589 carries time-multiplexed control signals to all edge nodes 160 connected to the switch plane 120. In general more than one control channel in either direction may be employed. Time-locking circuitry 3682 associated with the switch-plane controller 3580 is operative to ensure time alignment of each edge node 160 with controller 3580, hence with every switch unit 240 in the centralized switch plane because controller 3580 is collocated with the centralized switch plane.

Each switch unit 240 connects to a number of dual channels each dual channel comprising an upstream channel from an edge node 160 and a downstream channel to another edge node or to the same edge node. In one embodiment, one time slot per time frame, called an upstream control time slot, is allocated in each upstream channel and one downstream control time slot per time frame is allocated in each downstream channel. The allocated control time slots of all upstream channels are selected to arrive at the (bufferless) switch plane at non-coincident time slots so that they can be directed to a single control channel. If the number of time slots in the time frame is less than the number of upstream channels received at the switch plane, then more than one control channel from the host switch unit 240(3,p) to the switch plane controller 3580 may be used. Likewise, the allocated time slots in the downstream channels are arranged so that none of the downstream control time slots along control channels 3588 from the switch-plane controller to the host switch unit 240(3,p) coincides with another downstream control time slot.

Figure 37:
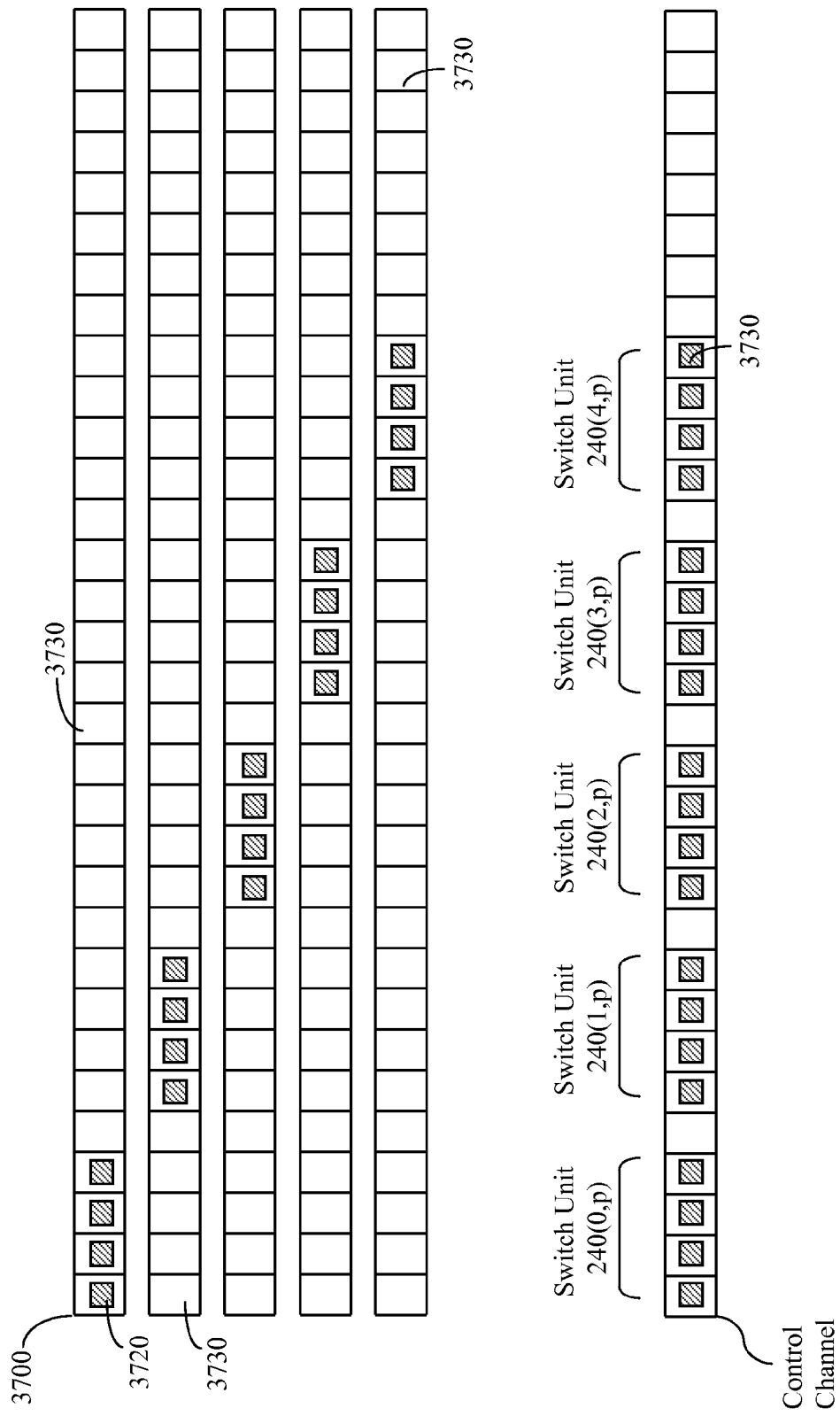
FIG. 37 illustrates allocation of control time slots in the switch plane of FIG. 2 for communication with the controller of FIG. 36 through a single control channel.

FIG. 37 illustrates control time slots 3720, in a predefined slotted time frame 3700, corresponding to the switch plane 120 of FIG. 35 in which each switch unit 240 has four upstream channels and four downstream channels. The positions of the control time slots 3720, correspond to edge nodes 160 connecting to a switch unit 240, as they appear at the switch plane 240, are illustrated. Notably, this is realized with the edge nodes time-locked to the switch plane. The illustrated pattern is one of numerous other arrangements that can be devised. The control time slots in the downstream directions are likewise allocated. The time slots 3730 used for payload signals are dynamically allocated according to traffic patterns.

Figure 38:
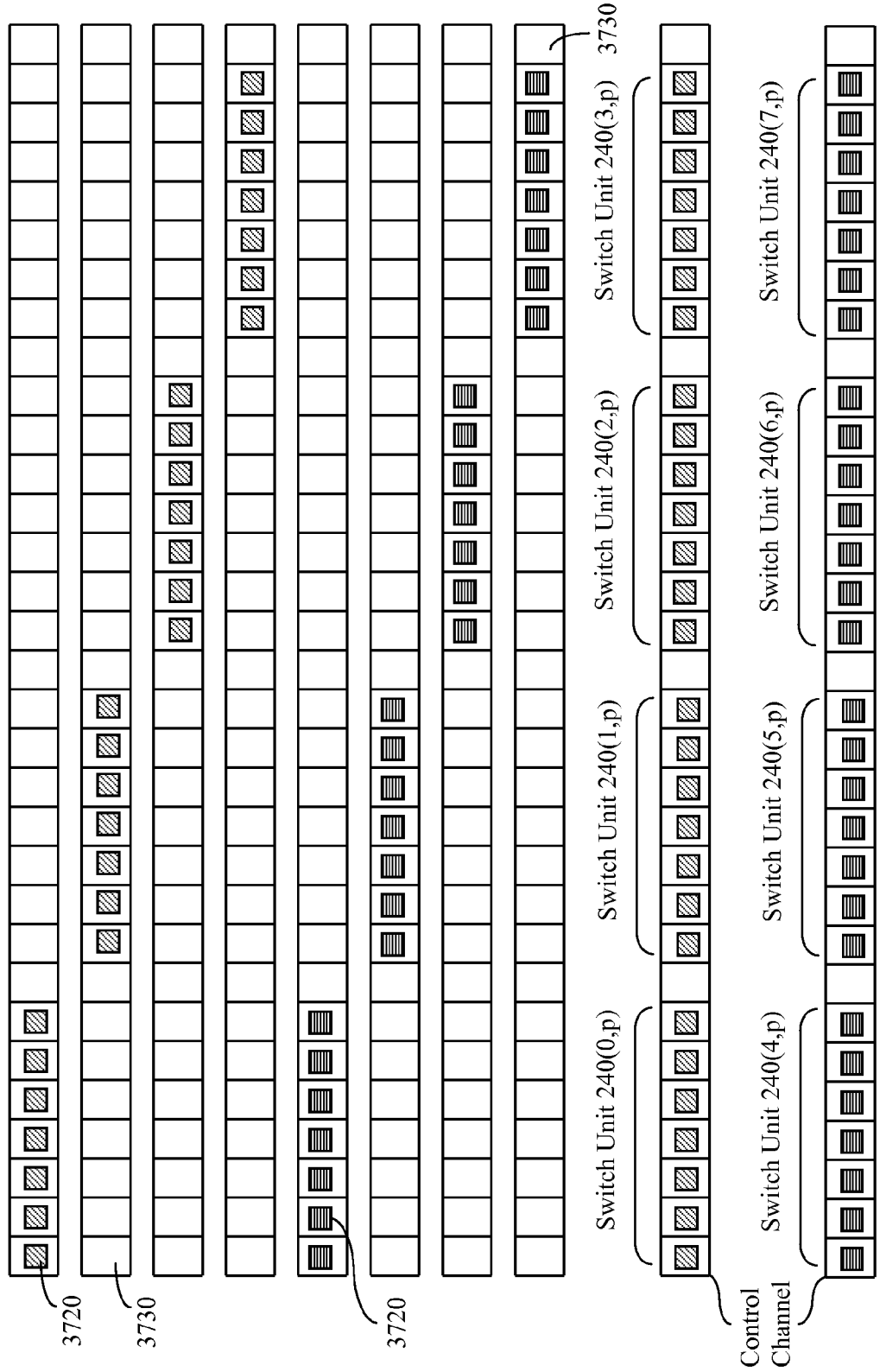
FIG. 38 illustrates allocation of control time slots in the switch plane of FIG. 2 for communication with the controller of FIG. 35 through two control channels.

The control time slots in a case where two control channels 3588 are provided is illustrated in FIG. 38. The two control channels 3588 may connect to different switch units 240. In general, more than one control channel may be used and connect to different switch units 240 of a switch plane 120. The patterns of FIG. 37 and FIG. 38 may apply in both the upstream and downstream directions.

Collocated Switch Planes

In a wide-coverage network, switch planes 120(p), $0 \leq p < \Pi$, are preferably geographically distributed in order to reduce the lengths of links connecting the switch planes to the edge nodes. It may be desirable, however, that two or more switch planes be collocated; collocated switch planes may have separate switch-plane controllers or a common multi-plane controller. Alternatively, in an extreme case, all the switch planes 120(p), $0 \leq p < \Pi$, together with the edge nodes 160, may be collocated to form a high-capacity switching node. In such a case, the edge nodes may have individual channels to the switch planes and the use of upstream and downstream wavelength routers (FIGS. 32-34) would not be needed. With collocated edge nodes 160 and switch planes 120, the switch planes preferably comprise electronic switch units.

Figure 39:
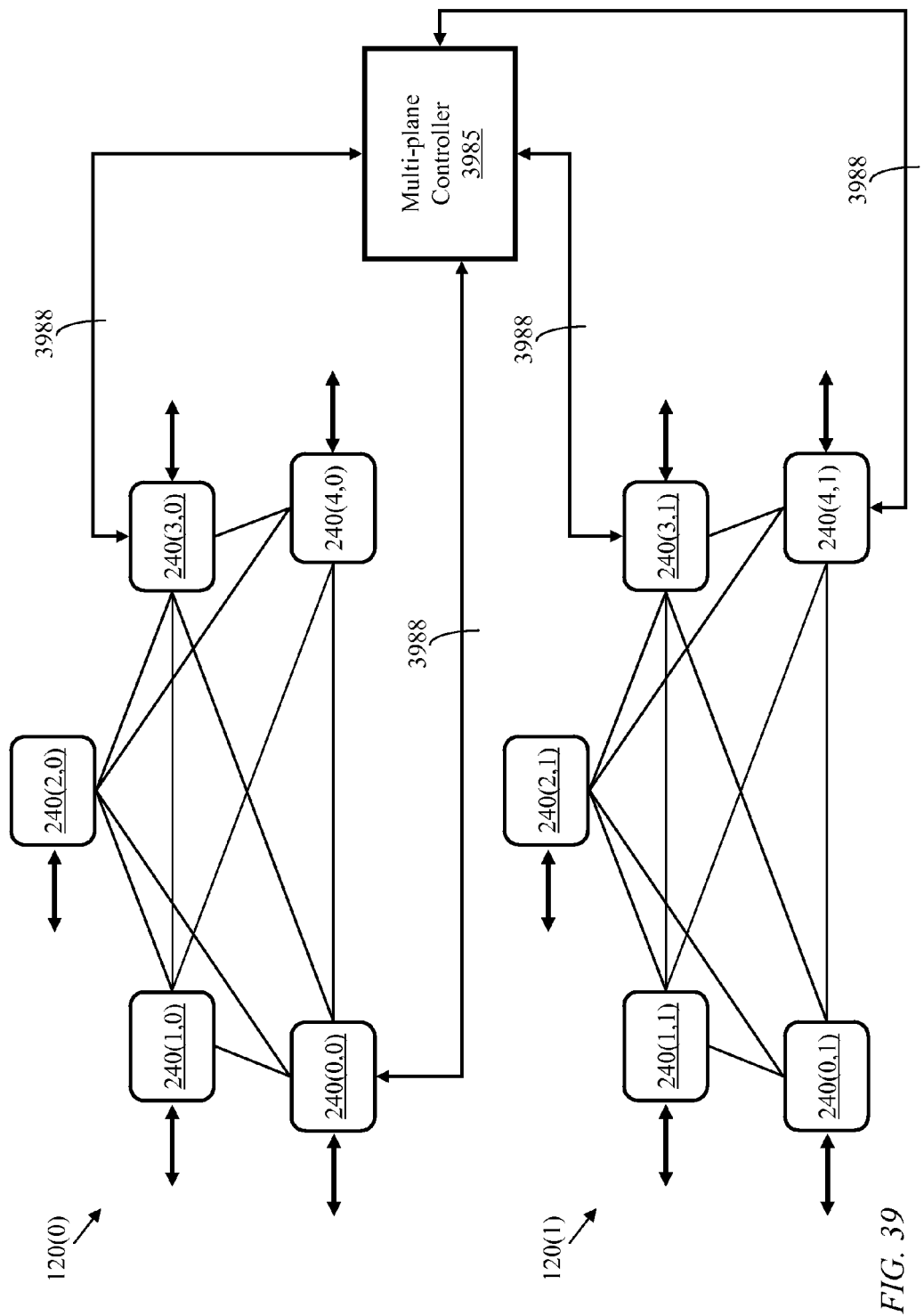
FIG. 39 illustrates a network with collocated switch planes according to an embodiment of the present invention.

FIG. 39 illustrates two collocated switch planes, 120(0) and 120(1), having a multi-plane controller 3985. Switch plane 120(0) comprises five switch units 240(0,0), 240(1,0), 240(2,0), 240(3,0), and 240(4,0) and switch plane 120(1) comprises five switch units 240(0,1), 240(1,1), 240(2,1), 240(3,1), and 240(4,1). Multi-plane controller 3985 has a dual control channel 3988 to each of switch units 240(0,0), 240(3,0), 240(3,1), and 240(4,1). As indicated earlier, switch unit 240(k,p) is a switch unit in position k, $0 \leq k < G$ in switch plane p, $0 \leq p < \Pi$.

Switch Plane with Distributed Switch Units

An advantage of a centralized switch plane is the ease of time alignment and simpler scheduling and control. A centralized switch plane permits exchange of optical signals among its switch units 240 without the need to compensate for differential propagation delay. Thus, a time-slotted signal can be transferred virtually simultaneously from an upstream channel in one switch unit 240 to a downstream channel in another switch unit 240 without disturbing the temporal order of the signal.

It may be desirable, however, to locate the switch units 240 of a switch plane near the traffic sources and sinks. If specific edge nodes homing on a switch unit exchange a significant portion of payload signals directly, then it would be advantageous to locate the switch unit closer to the specific edge nodes to form a distributed switch plane. A distributed switch plane, however, has two disadvantages. Firstly, time alignment at the inward ports of a switch unit 240 may not be realizable without a buffer, which may force the use of optical-electrical-optical conversion, and secondly, each switch unit 240 in the distributed switch plane would need a separate controller.

Figure 40:
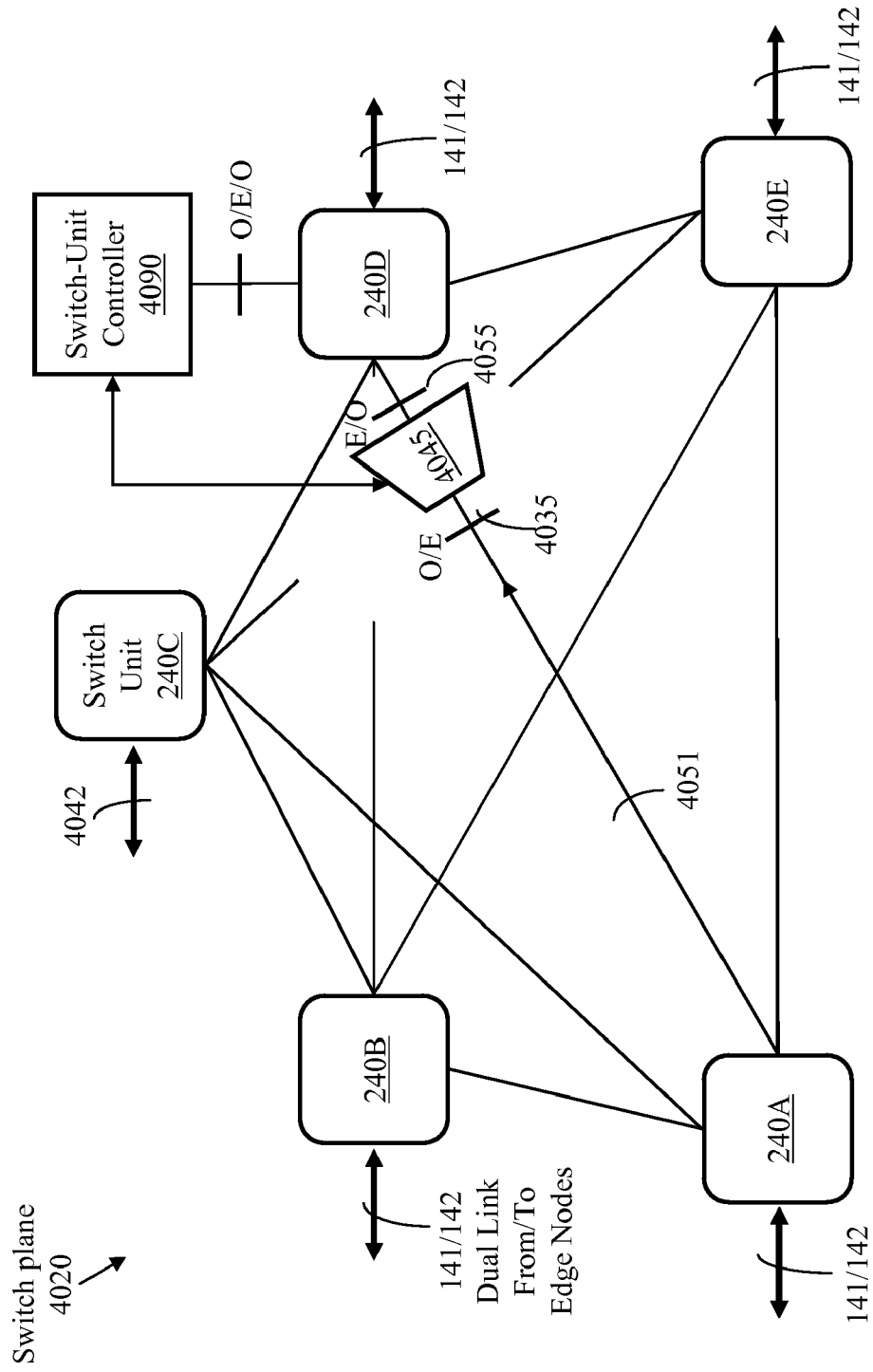
FIG. 40 illustrates an exemplary distributed switch plane comprising non-blocking switch units configured in a mesh structure where the switch units of the switch plane are geographically distributed and a timing-scheduling unit precedes each inward port of each switch unit according to an embodiment of the present invention.

As described above, the switch units 240 of each switch plane 120 may be collocated to enable proper timing of optical signals crossing any two switch units. In an alternate embodiment, the switch units of any switch plane may be distributed. FIG. 40 illustrates a distributed switch plane 4020 where the switch units 240 may be separated by significant distances resulting in significant differential propagation delay which would render time-alignment of paths traversing two optical (bufferless) switch units unrealizable. Each switch unit has an outward channel 4051 to each other switch unit and the propagation delays along outward channels 4051 may differ significantly. Instead of using a single switch-plane controller in a distributed switch plane, each switch unit 240 may have its own switch-unit controller 4090 which performs a scheduling function within the switch unit. To simplify the drawing, only one switch-unit controller 4090 associated with switch unit 240(3,p) is illustrated. A timing-rescheduling unit 4045 is provided at each inward port of each switch unit 240 of a distributed switch plane 240. Optical signals received from an inward channel (which is an outward channel from another switch unit 240 of the same switch plane) is processed, at optical-to-electrical interface 4035 to detect the baseband data. The baseband data may be queued in a respective timing and rescheduling unit 4045 according to respective destination edge nodes 160 and switched, after modulating an optical carrier in electronic-to-optical interface 4055, through a respective switch unit 240 towards the edge nodes. All timing-rescheduling units 4045 at inward ports of a switch unit 240 of a distributed switch plane are time-locked to a time indicator of the switch unit.

Figure 41:
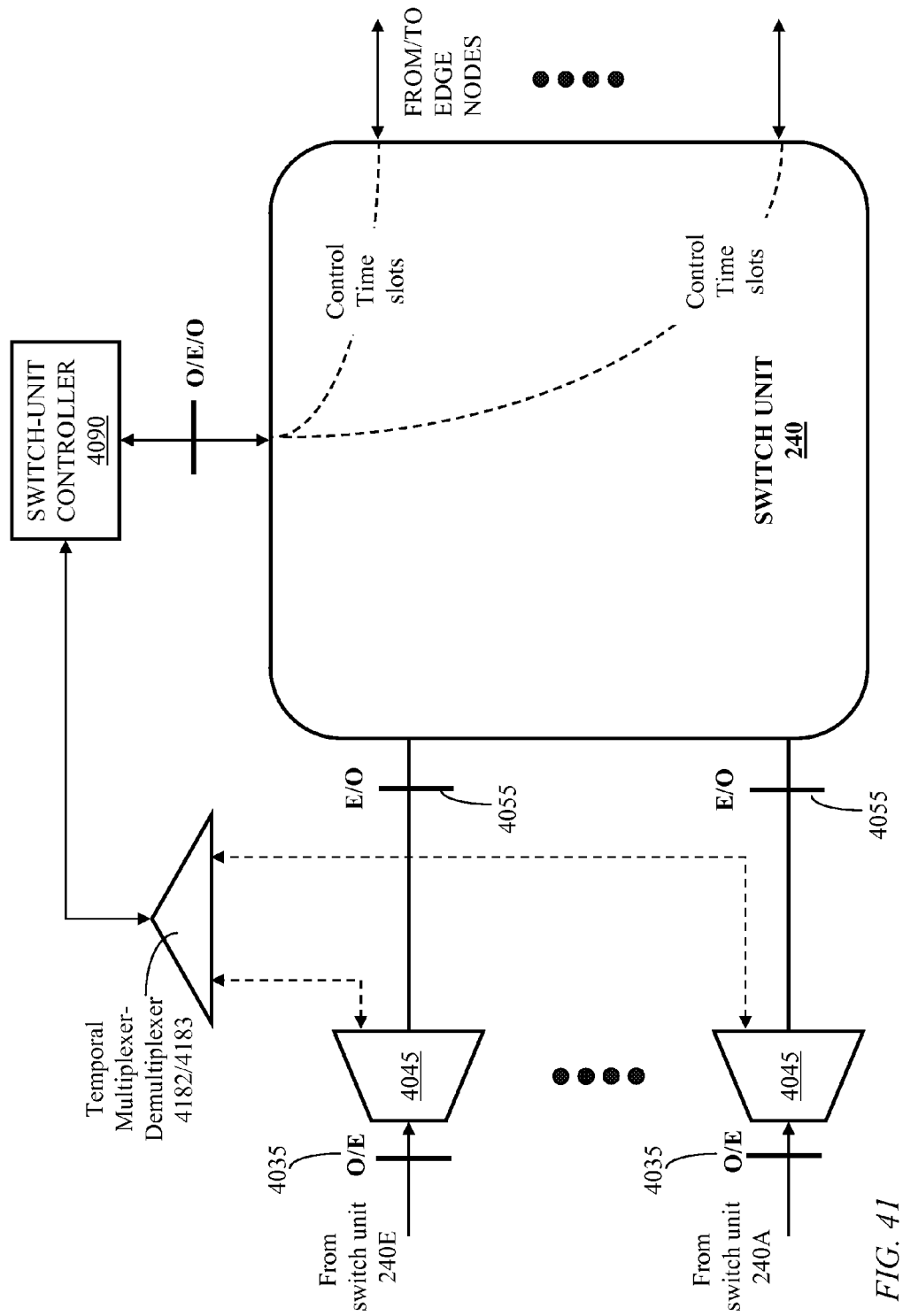
FIG. 41 illustrates a control system for the exemplary distributed switch plane of FIG. 40 comprising a switch-unit controller associated with a switch unit in accordance with an embodiment of the present invention.

FIG. 41 illustrates the connectivity of a switch-unit controller 4090 in a distributed switch plane 4020 to timing-rescheduling units 4045 and edge-node controllers (not illustrated). Each inward port of a switch unit 240 in a geographically distributed switch plane is preceded by an optical-to-electrical conversion interface 4035, a timing-rescheduling unit 4045, and an electrical-to-optical conversion unit 4055 which may be collocated with the switch unit 240. A temporal multiplexer 4182 multiplexes control data carried by inter-switch-unit channels 4051 and transfers the time multiplexed control data to the switch-unit controller 4090. Control data from the switch-unit controller 4090 are demultiplexed in a temporal demultiplexer 4183 which directs the demultiplexed control data to respective timing-rescheduling units 4045 for delivery to respective destination switch units 240 from which control data is delivered to respective destination edge nodes.

Figure 42:
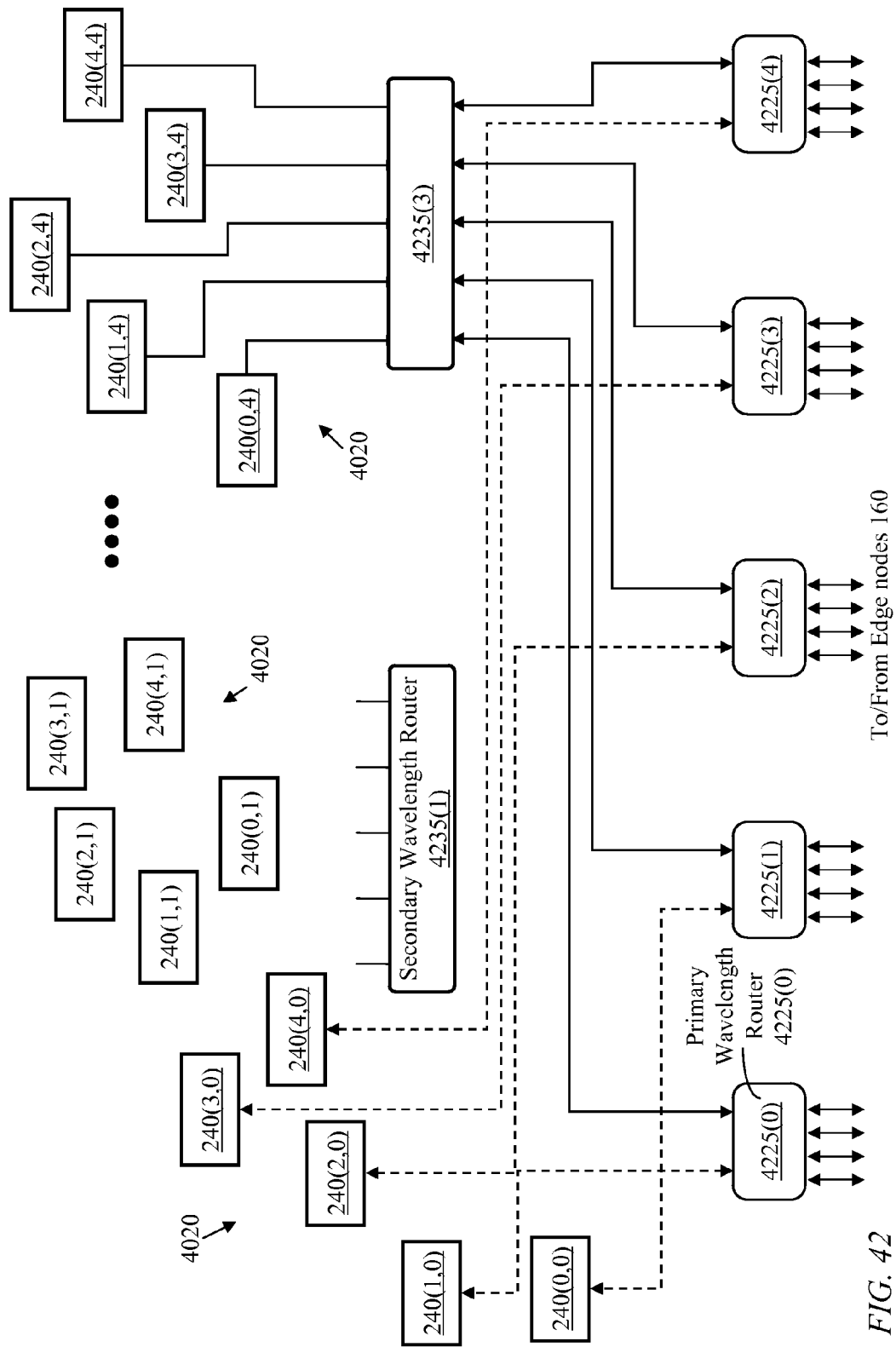
FIG. 42 illustrates a network comprising switch planes having distributed switch units.

FIG. 42 illustrates connectivity of edge nodes to switch planes 4020 having geographically distributed switch units 240. A primary wavelength router 4225 connects a group of edge nodes 160 to secondary wavelength routers 4235 which distributes channels from each edge node 160 to switch units 240 of different switch planes 4020.

Network Coverage

The maximum number of edge nodes 160 that can be connected to the network core 110 corresponds to a configuration where each edge has only one upstream channel to each switch plane 120 and one downstream channel from each switch plane 120. With G switch units 240 per switch plane 120, Q inlet ports, and Q outlet ports per switch unit, the network coverage $\Omega$, which is the maximum number of edge nodes 160 that can be supported by the network core 110, is determined as $\Omega = G \times Q$. For example with G=137 and Q=119, the network core may support up to 16303 edge nodes.

Network Capacity

The Access capacity of network 100, i.e., the capacity available to all data sources is determined as $C = R \times G \times Q \times \Pi$, where R is the capacity of an inlet port or an outlet port of a switch unit 240, and is $\Pi$ the number of switch planes 120 as defined earlier. For example with R=10 gigabits per second, G=137, Q=119, and $\Pi$=100, the network may support up to 16303 edge nodes with a maximum capacity of approximately 16.3 petabits per second.

Electronic Core

The network core 110 comprises fast switch units 240, i.e., switch units with a negligibly small switching latency. The switch units 240 preferably use optical switch fabrics in order to eliminate the need for optical-to-electrical conversion and vice versa. It is also desirable that the individual switch fabrics be nonblocking and contention free to simplify connection setup through the core 110. Furthermore, it is desirable to avoid traffic-management at the core and manage traffic entirely at the edge nodes. This precludes queuing control data or payload data at the switch units 240.

Currently, a fast-switching optical switch unit 240 may be limited to a number N of dual ports of the order of 256; i.e., a dimension of 256×256. The N dual ports may be divided into (G−1) inner dual ports connecting to other switch units 240 and Q outer dual ports connecting to edge nodes 160. Each switch unit 240 may also have a switch-unit controller connecting to a dual port. Selecting G and Q to equal 137 and 119, respectively, the network coverage would be limited to Q=16303 edge nodes, which is quite adequate for continental coverage. A larger coverage may be needed for global coverage. This can be realized using electronic space switches in the core. Electronic space switches may be devised as instantaneous space switches or latent space switch. An instantaneous space switch provides switching with negligible switch delay. A latent space switch includes time-alignment buffers which result in a deterministic delay.

A latent space switch is described in U.S. Pat. No. 5,168,492. The latent space switch, illustrated in FIG. 2 of U.S. Pat. No. 5,168,492, comprises a first rotator 20, a bank of memory devices 18, and a second rotator 22, and is used to switch data from input buffers 12 to output buffers 16 (reference numerals 12, 16, 18, 20, and 22 relate to U.S. Pat. No. 5,168,492).

The latent switch scales gracefully to very high dimensions. Using latent space switches as the switching fabrics of switch units 240 permits constructing a network 100 of very high coverage and capacity. A disadvantage of using an electronic core is the requirement of an optical-to-electrical converter at each inlet port of each switch unit 240 and an electrical-to-optical converter at each outlet port of each switch unit 240. A network 100 based on latent space switches in the core is still significantly simpler and more efficient in comparison with other prior-art configurations. For example, using latent space switch of dimension 1024×1024 (N=1024), and selecting G, and Q to be 531 and 493, respectively, the network coverage $\Omega$ would exceed 260000 edge nodes. Selecting $\Pi$ to equal 500, and with R=10 gigabits per second, the network capacity exceeds 1300 petabits per second. Such a high capacity is several orders of magnitude higher than the capacity of the current Internet. However, it is realized in a network 100 in which a connection from one edge node 160 to another traverses only one switch plane 120 which is basically a core node of large dimension.

Addressing and Routing

Each edge node 160 may support a large number of terminals; one million terminals for example. A terminal may function as a traffic source and a traffic sink. To send a data unit from a first terminal, functioning as a traffic source, to a second terminal, functioning as a traffic sink, an address need be associated with each terminal. In a simple addressing scheme, a terminal may derive its address from an edge node 160 to which it is connected, and an edge node may derive its address from a switch unit 240 to which it is connected in the downstream direction. An edge node 160 has a number of outbound ports connecting to upstream outbound channels directed to switch planes 120 and a number of inbound ports terminating downstream inbound channels to switch planes. In a referred embodiment, an edge node 160 connects to each switch plane 120, at least in the downstream direction. Thus, each inbound port has a downstream channel from each switch plane 120. A switch plane has fast switch units 240 interconnected in a full mesh structure as illustrated in FIG. 2. Each switch unit 240 may be assigned a relative index within its switch plane. To simplify addressing, and consequently simplify routing, the inbound ports of an edge node 160 connect, through downstream channels, to fast switch units 240 of the same index in all the switch planes 120. However, the outbound ports of an edge node 160 may connect, through upstream channels, to fast-switch units of different indices in different switch planes. Each switch unit 240 in each switch plane 120 need only be aware of the identity of the edge node connecting to each of its outlet ports through a downstream wavelength channel.

The Q outlet ports 326 of each switch unit 240 are preferably indexed as 0 to (Q−1) and the Q inlet ports 322 are preferably likewise indexed. As described earlier, the inbound ports of each edge node 160 preferably connects to outlet channels from switch units 240$(k,p)$, $0 \leq p < \Pi$, of the same first index k in all the $\Pi$ switch planes. For example, an edge node may connect to switch units 240(2, 0), 240(2,1), 240(2, 2), 240(2,3), and 240(2,4) in the five switch planes of the exemplary network considered in FIG. 11. The downstream connection of each edge node to switch units 240($k$,$p$) of the same index k in all switch planes greatly simplifies routing within network 100. To further simplify addressing, each edge node may also connect to likewise indexed outlet ports of the designated switch units. Thus, the address of a terminal may include two parts. The first part of the address is the relative identifier k of the switch unit 240($k$,$p$) to which an inbound port of the destination edge node 160 supporting the terminal is connected. The second part of the address relates to the relative position of the terminal within an access network connected to the destination edge node. A connection request need only specify an identifier of a destination edge node (sink node) and a local identifier of the sink terminal within its parent edge node. The identifier of a sink node (destination edge node) may be a simple concatenation of an index k of a switch unit 240($k$,$p$) and an index of an outlet port 326 within the switch unit 240. An edge node 160 need only store information about switch-plane preference for each destination edge node (sink node). Most importantly, storage of a routing table at each edge node 160 may be avoided.

As described above with reference to FIG. 37 and FIG. 38, each edge node 160 has a dedicated (reserved) upstream control time slot to the switch-plane controller 3580 of each switch plane 120 and a dedicated downstream control time slot from each switch-plane controller 3580. Thus, each switch plane controller 3580 may associate each upstream control time slot with a source edge node and each downstream control time slot with a destination edge node. More specifically, a controller 3580 of a switch plane 120($p$) may associate each upstream control time slot with the relative index $k_1$ of a switch unit 240($k_1$,$p$) connecting to the source edge node and the relative inlet port index $\chi_1$ in the switch unit. The controller 3580 may also associate each downstream control time slot with the relative index $k_2$ of the destination switch unit 240($k_2$,$p$) which connects to the destination edge node specified in the connection request, and the relative outlet-port index $\chi_2$ in the destination switch unit 240.

In operation, a source edge node 160 receives a connection request from a source specifying a destination terminal. The request includes the address of a destination terminal and a specified number of time slots per time frame. The source edge node then selects one of the switch planes 120 and sends the connection request over a respective upstream control time slot to the controller 3580 of the selected switch plane. The switch-plane selection may be based on a preference order, some load balancing strategy, or both.

The controller 3580 of the selected switch plane 120 parses the address of the destination terminal to extract the first part of the address, which is an identifier of the destination edge node that supports the destination terminal. The identifier of the destination edge node is simply a concatenation of the first index $k_2$ of the destination switch unit 240($k_2$,$p$) and a relative index η of the outlet port 326 connecting to the destination edge node. The controller 3580 may also recognize the position of the upstream control time slot within the time frame and, hence, identify the relative index $k_1$ of origination switch unit and the relative inlet port χ connecting to the source edge node. If $k_1$=$k_2$, the controller performs a first-order time-slot matching process to allocate a sufficient number of time slots per time frame as specified in the connection request. The first-order time-slot matching process requires examining occupancy states of inlet port χ and outlet port η of switch unit 240($k_1$,$p$). If $k_1$ is not equal to $k_2$, the switch-plane controller 3580 performs a second-order time-slot-matching process which requires examining occupancy states of inlet port χ of switch unit 240($k_1$,$p$), outlet port η of switch unit 240($k_2$,$p$), and outward channel 252 connecting switch unit 240($k_1$,$p$) to switch unit 240($k_2$,$p$). The result of the time-slot matching process (first-order or second-order) is a list of time slots during which the source edge node is permitted to transmit. An empty list indicates rejection of the connection request.

The switch-plane controller may then directly communicate the result of the time-slot-matching process (first order or second order) to the originating source edge node by transmitting a message during the downstream control time slot corresponding to the originating edge node. As described earlier, the source edge nodes and sink edge nodes are paired into integrated edge nodes and the edge nodes preferably have asymmetrical upstream and downstream connectivity to the switch planes 120. Naturally, the source edge node needs the result to either transmit during the allocated time slot or to abandon the request. The switch-plane controller may also directly communicate the result to the destination edge node if so desired.

Preferably, each edge node 160 may store an order of preference of switch planes 120($p$), $0 \leq p < \Pi$, for each destination edge node based on a merit value. A switch plane at which the source edge node and the destination edge node connect to the same switch unit 240, hence requiring a simple first-order time-slot matching process, may be of highest preference. The preference order may also be based on the proximity of the source edge node and/or the destination edge node to a switch plane 120.

The above considers addressing within the network of the present invention. Such a network may, however, connect to legacy networks, preferably through dedicated edge nodes in which case addresses associated with the legacy network can be mapped onto global-network addresses.

The asymmetrical connectivity of edge nodes to core nodes has been detailed for a first pattern where inbound ports of each edge node connect to likewise numbered fast switch units 240 in each switch plane 120, while the outbound ports of any edge node may connect to fast switch units 240 of different identifiers in their respective switch planes 120. As stated earlier, a second pattern of asymmetrical connectivity may be used with the outbound ports of each edge node connecting to likewise numbered fast switch units 240 in each switch plane 120, while the inbound ports of any edge node connecting to fast switch units 240 of different identifiers in their respective switch planes 120. However, the first connectivity pattern is preferred because it simplifies addressing and routing throughout the network.

Figure 43:
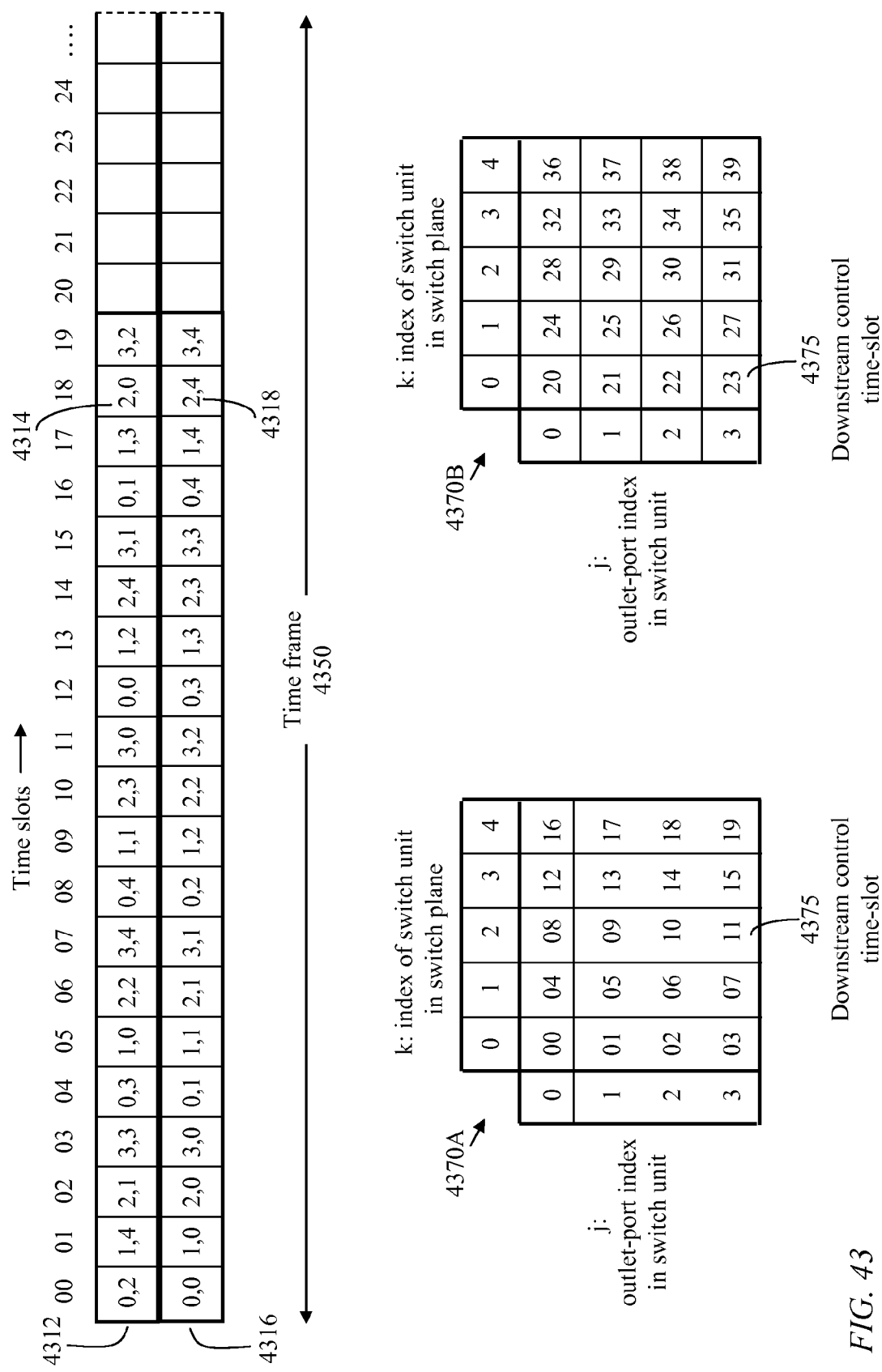
FIG. 43 illustrates data structures maintained by a switch-plane controller for facilitating connection setup and control in accordance with an embodiment of the present invention.

FIG. 43 illustrates data structures maintained by a switch-plane controller 3580 of the switch plane 120 of FIG. 35 for facilitating connection setup and control in accordance with the present invention. The data structures are virtually static; their entries may be updated only after addition, removal, or rearrangement of channels between a switch unit 240 and an edge node 160. An array 4312 corresponds to a control channel 3588 from an outlet port of a switch-unit 240 to controller 3580. As described earlier with reference to FIG. 37 and FIG. 38, an upstream control time slot is reserved in each outbound channel from each edge node 160 for direct communication with a controller 3580 of each switch plane 120. Array 4312 has a number of cells 4314 equal to the number ν of time slots per time frame 4350 with each cell storing an identifier (j,γ) of a source edge node 160(j,γ) which transmits control signals to the switch-plane controller 3580 during a corresponding reserved time slot. For example, the cell 4314 corresponding to time slot 0 stores the parameters (0,2) of edge node 160(0, 2) from which a control signal is received at the switch-plane controller 3580 during each time slot 0 of each time frame

4350. The number ν of time slots per time frame preferably exceeds 128 and, hence, the control overhead consumes less than 0.01 of the network capacity. An array 4316, also having a number of cells 4318 equal to the number ν of time slots per time frame, stores in each cell 4318 an identifier (x,y) of an inlet port 322 of a switch unit 240, in switch plane 120($p$), to which source edge node 160($j,\gamma$) connects, where x is a relative inlet-port number, $0 \leq x < Q$, of a switch unit 240($y,p$), $0 \leq y < G$.

A matrix 4370 (4370A or 4370B) having a number of rows equal to the maximum number Q of edge nodes per edge-node group and a number of columns equal to the maximum number G of edge node groups stores identifiers 4375 of reserved control time slot in the downstream direction. Each entry corresponding to row j, $0 \leq j < Q$ and column k, $0 \leq k < G$, stores an identifier of a reserved control time slot in an outlet port 326 of relative position j in switch unit 240($k,p$) having an outlet channel to edge node 160($j,\gamma$). If the downstream control signals occupy consecutive time slots in the time frame, then the time slot identifier 4375 corresponding to edge node 160($j,\gamma$) may be determined from the expression: $(\Delta+j+\gamma \times Q)_{modulo\ \nu}$, where $\Delta$ is an arbitrary offset in the range $0 \leq \Delta < \nu$. Matrix 4370A illustrates the case of $\Delta=0$, and matrix 4370B illustrates the control-time-slot assignments with $\Delta=20$. Other schemes for allocating downstream control time slots to outlet ports 326 of a switch unit 240 may be devised. Preferably, the downstream control time slots are selected to bear some rational relationship to outlet ports 326 and yield simple expressions for computing identifiers of control time slots so that matrix 4370 would not be needed. However, a matrix 4370 may be provided if it is desired to use arbitrary assignments of downstream control time slots.

Figure 44:
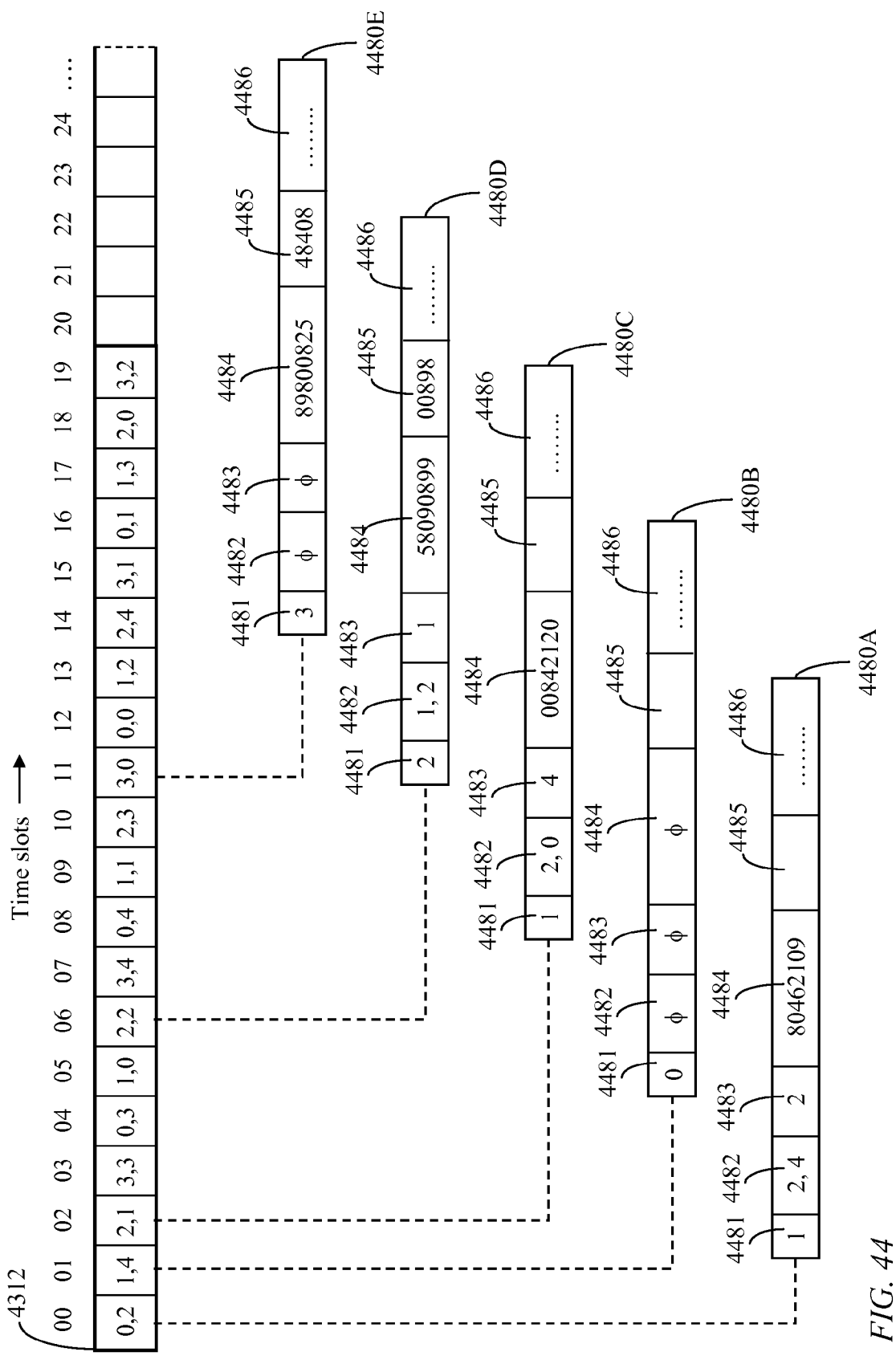
FIG. 44 illustrates exemplary control signals.

FIG. 44 illustrates exemplary control signals 4480 received during an upstream control time slot. Five control signals 4480, individually identified as 4480A, 4480B, 4480C, 4480D, and 4480E, are illustrated. As described above, a source edge node 160 corresponding to each time slot is identified from array 4312. A control signal 4480 may have a first field 4481 indicating a purpose (type) of the signal, a field 4482 identifying a destination edge node 160($k,p$) in a connection request, a field 4483 indicating a number of time slots per time frame required for a connection, a field 4484 containing an indication of a time at which the control signal has been sent from the respective edge node, a field 4485 contains a cyclic connection number provided by the switch-plane controller 3580, a field 4486 contains an identifier of a terminal within a local access network connected to the destination edge node identified in field 4482. Other fields may also be provided for a variety of purposes including, for example, service quality specification. Fields 4482 and 4486 define the destined terminal. As described above, the address of a terminal may include a first part and a second part. The first part is used by a switch-plane controller 3580 of a switch plane 120($p$) for determining the relative identifier k of the switch unit 240($k,p$) which has a downstream channel to the destination edge node supporting the destined terminal (a downstream channel from a switch plane is also an inbound channel to the edge node). The second part identifies the destined terminal within a local-access network connecting to the destination edge node.

The type of a control signal is set to 0 (in field 4481) if an edge node has no control data to send and the signal is ignored by the switch-plane controller. A mark 'φ' (an arbitrary distinguishable designation) in any field in a signal 4480 is an indication that the content of the field is irrelevant.

An edge node controller sets a control signal type to equal 1 if the signal is a request for a connection. The edge-node controller then provides the entries in fields 4482 and 4483. A time indication in field 4484 may be sent periodically, every second for example, for time-locking purposes. A control signal may include a null entry in field 4484. The cyclic connection number of field 4485 is provided by the switch-plane controller 3580 for tracking a successful connection request. The cyclic number is preferably specific to each outlet port 326 of a switch unit 240, hence to each destination edge node 160. Cyclic numbers may be allocated in a simple manner. Considering that a specific outlet channel may simultaneously support no more than $2^{16}$ connections, for example, then a corresponding 16-bit word may be increased by 1 every time a connection from any inlet port of a switch-plane 120($p$) is routed to the specific outlet port 326.

An edge-node controller (not illustrated) sets a control-signal type to 2 to terminate (release) a connection. The cyclic number of field 4485 must then be provided to enable the switch-plane controller to identify the time-slots to be released and perform other connection-release steps.

An edge-node controller sets a connection type to 3 if the control signal provides only a sending-time indication for maintaining, or resetting, time locking to the master time indicator of the switch plane. Time indications may be sent in type-1 or type-2 control signals with a type-1 or type-2 designations (field 4481). However, a type-3 control signals may be needed to ensure proper time locking even when there are no traffic activities (new arrivals or departures) over an extended period of time.

Illustrated type-1 control signal 4480A is received from edge-node 160(0,2) during time-slot 0 to setup a connection to destination edge-node 160(2,4) as indicated in field 4482. As indicated in arrays 4312 and 4316, the entries 4314 and 4318 corresponding to time slot 0 of the time frame 4350 are (0,2) and (0,0), respectively. Thus, an outbound channel from edge node 160(0,2) connects to inlet port 0 of switch unit 240(0,p). The connection requires two time slots per time frame as indicated in field 4483. As such, the requested connection is to be established from inlet port 322 of relative position 0 of switch unit 240(0,p) to outlet port 326 of relative position 2 of switch unit 240(4,p). The connection traverses switch unit 240(0,p), an outward channel 251(0,4), and switch unit 240(4,p). Allocating each of the required two time slots per time frame requires a second-order time-slot matching process which examines the vacancy of inlet port 0 of switch unit 240(0,p), outward channel 251(0,4), and outlet port 326 in relative position 2 of switch unit 240(4,p). The sending time, as read from a cyclic time indicator associated with the edge-node controller, is given in field 4484 as 80462109. Time-locking of the source edge node to the master time indicator of switch plane 120 is assured when the time reading of field 4484 equals a reading of the cyclic master time indicator at the time the control signal is received at the switch-plane controller. A master cyclic time indicator associated with a switch plane and the cyclic time indicator associated with an edge-node controller have the same duration and granularity.

Type-0 control signal 4480B received from source node 160(1,4) is ignored by the switch-plane controller 3580.

Type-1 control signal 4480C received from source edge node 160(2,1) during time slot 2 requests a connection to edge node 160(2,0). As indicated in arrays 4312 and 4316, the entries 4314 and 4318 corresponding to time slot 2 of the time frame 4350 are (2,1) and (2,0), respectively. Accordingly, an outbound channel from edge node 160(2,1) connects to inlet port 2 of switch unit 240(0,p). The connection requires four time slots per time frame (field 4483). As such, the requested connection is to be established from inlet port 322 of relative position 2 of switch unit 240(0,p) to outlet port 326 of relative position 2 of the same switch unit 240(0,p). Allocating each of the required four time slots per time frame requires a first-order time-slot matching process which examines the vacancy of inlet port 322 of relative position 2 of switch unit 240(0,p) and outlet port 326 of relative position 2 of the same switch unit 240(0,p). The sending time (as read from a cyclic time indicator associated with the edge-node controller) is given in field 4484 as 00842120. This value is used for assuring time locking as described above.

Type 2 control signal 4480D received from source edge node 160(2,2) is a request to terminate (release) a connection that was given a cyclic number 00898 (field 4485). The signal also carries source time indicator 58090899 in field 4484 for maintaining time-locking of the source edge node 160(2,2) to the master time indicator of the switch-plane controller 3580. The content of fields 4882 and 4883 are not needed for terminating the connection because the switch-plane controller holds all necessary information related to a connection in progress. However, providing the information in fields 4882 and 4883 of a type-2 control signal is useful in ensuring the control-system sanity.

Type 3 control signal 4480E received from source edge node 160(3,0) during upstream control time slot 11 is used only for continued time locking of the source edge node to the master time indicator of the master switch-plane controller 3580. The switch plane controller uses array 4312 to recognize the sending edge node with which it associated the time indication in field 4484. Providing the corresponding connection cyclic number in field 4485 is not required but it may be useful in ascertaining system sanity.

FIG. 45 illustrates a vacancy-state matrix 4520 which keeps track of the number of vacant time slots per time frame per outlet port of switch-plane 120(p). Matrix 4520 may be used for a quick initial decision regarding establishing a connection. For example, if the number of vacant time slots in an outlet port 326 of a switch unit 240, as indicated in an entry 4540, is below a predefined value, the request for the connection may be rejected without performing a time-slot matching process. It is noted, however, that creation or use of matrix 4520 is optional.

Figure 46:
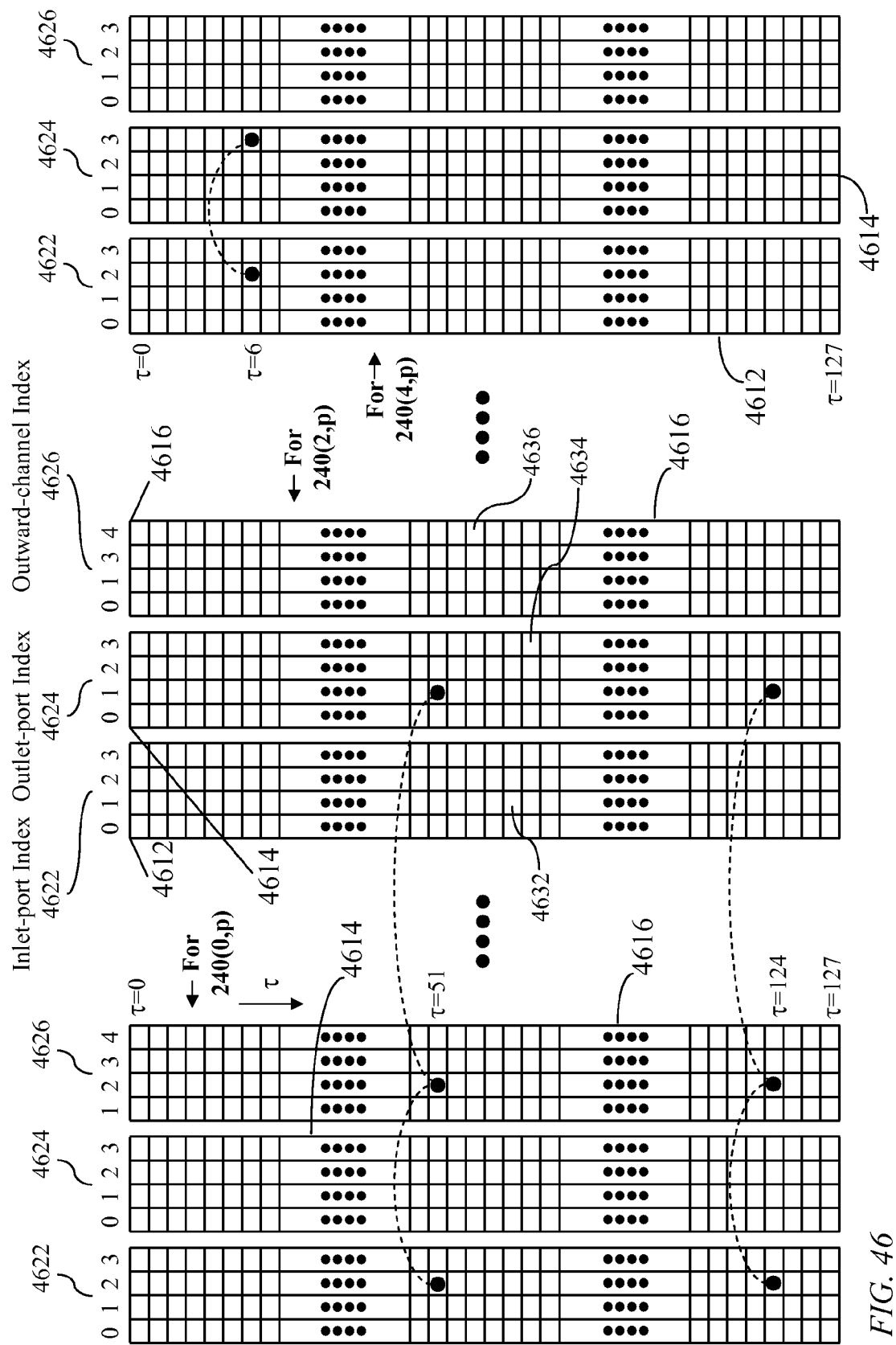
FIG. 46 illustrates vacancy-state matrices associated with each switch unit in a switch-plane for use in time-slot-matching processes in accordance with an embodiment of the present invention.

FIG. 46 illustrates vacancy-state matrices associated with each switch unit 240(k,p) in a switch-plane 120(p) for use in time-slot-matching processes. Vacancy matrices for switch units 240(0,p), 240(2,p), and 240(4,p) of switch plane 120 are illustrated. Each switch unit 240(k,p) has at most a number Q of inlet ports, at most a number Q of outlet ports, and at most a number (G−1) of outward channels 251(k,L), $0 \leq L < G$, k≠L, connecting outward ports of switch unit 240(k,p) to switch units 240(L,p). For example switch unit 240(2,p) has four outward channels 251(3,p), 251(4,p), 251(0,p), and 251(1,p) to switch units 240(3,p), 240(4,p), 240(0,p), and 240(1,p), respectively.

The vacancy-state matrices associated with a switch unit 240(k,p) comprise three matrices 4612, 4614, and 4616. Each has a number of rows equal to the number of time slots per time frame. The illustrated matrices correspond to a time frame having 128 time slots indexed as 0 to 127. Matrix 4612 has a number of columns equal to Q each corresponding to an inlet port 322 of a switch unit 240. The inlet ports 322 are identified by relative indices 0, 1, . . . , (Q−1), indicated in header 4622; Q=4 in the illustrated example. Matrix 4614 has a column corresponding to each outlet port 326. The outlet ports are identified by the relative indices 0, 1, . . . , (Q−1), indicated in header 4624. Matrix 4616 has a number of columns equal to (G−1), coincidentally equal to 4. Each column indicates the vacancy state of an outward channel 251(k, L), $0 \leq L < G$, L≠k, with the index L identified in header 4626. In actual implementation of matrix 4616, it may be desirable to provide G columns instead of (G−1) columns, with one column being unused, for ease of memory addressing. It is noted that the maximum number of inlet ports need not equal the number of outlet ports in any switch unit 240(k,p). For example, the number outlet ports may exceed the number of inlet ports if the network serves a significant volume of multicast traffic.

A connection from an inlet port 322 to an outlet port 326 of the same switch unit requires examining the vacancy state of one column in a respective matrix 4612 and a column in a respective matrix 4614 corresponding to the same switch unit. A connection requiring one time slot per time frame from an inlet port 2 to an outlet port 3 of switch unit 240(4,p) is illustrated where respective entries 4632 and 4634 were fund to be vacant during time slot τ=6.

A connection from inlet port 2 of switch unit 240(0,p) to outlet port 1 of switch unit 240(2,p), requiring two time slots per time frame, is illustrated. Establishing the connection requires examining the vacancy states of a column corresponding to inlet port 2 in matrix 4612 corresponding to switch unit 240(0,p), a column corresponding to outward channel 251(0,2) in matrix 4616 corresponding to the same switch unit 240(0,p), and a column corresponding to outlet port 1 in matrix 4614 corresponding to switch unit 240(2,p). As illustrated, two time slots τ=51 and τ=124 during each of which corresponding entries 4632, 4636, and 4634 were vacant may be allocated to the connection.

Connection Setup

An edge node receives a connection request (control signal 4480A) from a source specifying a terminal and a required number of time slots per time frame (an edge node receiving the request is herein called a source edge node). The source edge node may have several upstream channels each originating from an outbound port of the source edge node and terminating on an inlet port 322 of a switch unit 240 in a switch plane 120(p). Each outbound port of the edge node has one upstream channel to a specific switch plane 120(p) and has a slave time indicator which time locks, through an exchange of time indicators, to the master time indicator of the specific switch plane 120(p).

The edge node may then select one of the switch planes (i.e., select one of its outbound ports) to setup the connection. The selection of a switch plane may be based on several criteria such as proximity or the simplicity of setting-up the connection. An edge node may store an array indicating a relative distance from the edge node to each other edge node through each switch plane. Such a list may be large and it may suffice to list only a small number of preferred switch planes for each destination edge node. An edge node may also store a matrix indicating the switch planes 120 which permit direct connection to each-other edge node. A direct connection through a switch plane refers to a connection traversing only one switch unit 240 which is feasible only when the source edge node and destination edge node connect to a common switch unit 240.

Alternative Switch-Plane Structures

So far, invention has been described with each switch plane comprising switch units 240 interconnected in a full mesh structure. The switch units 240 are preferably optical space-switch units. However, at least one of the switch planes 120 may comprise electronic switch units 240. The network may predominantly comprise centralized switch planes with at least one distributed switch plane using either optical or electronic switch units 240.

The switch units 240 of a switch plane 120 preferably interconnect in a full-mush structure in order to permit a proportion of traffic to be switched through a switch unit. However, the switch units 240 may also be interconnected in a conventional cascaded two-stage structure. An advantage of a two-stage structure is scalability. For example, using switch units of dimension 64×64 each, a full mesh yields a switch plane of dimension 1000×1000 (approximately) while a cascaded two-stage structure yields a switch plane of dimension 4000×4000 (approximately). A disadvantage of a cascaded two-stage structure is that each connection has to traverse two switch units.

With the present state of the art, an electronic switch unit may scale to a very large dimension. For example, a latent electronic space switch which comprises an input rotator, and output rotator, and an array of memory devices may scale to a dimension exceeding 1024×1024. A switch plane 120 may then use a single electronic latent space switch.

The invention has been described with reference to particular example embodiments. The described embodiments are intended to be illustrative and not restrictive. Further modifications may be made within the purview of the appended claims, without departing from the scope of the invention in its broader aspect.

What is claimed is:

1. A communications network comprising:
    a set of switch units arranged in switch planes, each switch plane comprising a subset of said switch units interconnected in a full-mesh structure;
    a plurality of source nodes, each source node connecting to a switch unit in each switch plane through at least one upstream channel wherein a first set of source nodes connecting to any switch unit and a second set of source nodes connecting to any other switch unit have a number of common source nodes not exceeding a predefined upper bound; and
    a plurality of sink nodes, each sink node connecting to each of selected switch units, one selected switch unit in each switch plane, through at least one downstream channel.

2. The communications network of claim 1 wherein switch units in said subset of switch units are assigned switch-unit identifiers, where said switch-unit identifiers in any switch plane are mirrored in each other switch plane, and wherein said selected switch units have identical switch-unit identifiers within their respective switch planes.

3. The communications network of claim 1 wherein said predefined upper bound equals one so that any pair of source nodes connects at most once to a common switch unit.

4. The communications network of claim 1 wherein said subset of said switch units of said each switch plane comprises collocated switch units.

5. The communications network of claim 4 further comprising, for each switch plane:
    a switch-plane controller; and
    a configuration controller associated with each switch unit of said each switch plane, said configuration controller receives switch-fabric-configuration instructions from said switch-plane controller.

6. The communications network of claim 5 wherein said switch-plane controller further comprises:
    a master time indicator;
    a time-locking circuit for receiving time indications from said each source node, and communicating time-locking instructions to a sink node communicatively coupled to said each source node;
    and wherein said each source node comprises a slave time indicator associated with said at least one upstream channel, said slave time indicator exchanges time indications with said time-locking circuit for time-locking said each source node to said master time indicator.

7. The communications network of claim 6 wherein:
    said each source node sends said time indications to said time-locking circuit of said switch-plane controller during a first reserved time slot, in a predefined slotted time frame, said first reserved time slot being specific to said each source node and said switch-plane controller; and
    said time-locking circuit sends said time-locking instructions to a sink node associated with said each source node during a second reserved time slot specific to said each sink node and said switch-plane controller.

8. The communications network of claim 5 wherein said switch-plane controller:
    connects to at least one control channel from at least one switch unit, of said each switch plane, for receiving upstream control signals from said plurality of source nodes;
    connects to at least one control channel to at least one switch unit, of said each switch plane, for transmitting downstream control signals to said plurality of sink nodes;
    maintains an inlet-identification array each entry of which corresponds to a time slot in a predefined time frame and contains an identifier of an inlet port of a first switch unit; and
    maintains an outlet-identification array each entry of which corresponds to a time slot in a predefined time frame and contains an identifier of an outlet port of a second switch unit.

9. The communications network of claim 8 wherein:
    said each source node receives packets of variable sizes from data sources and assembles received packets into data segments of equal sizes;
    said source nodes communicate time-division multiplexed data segments to said sink nodes through said plurality of switch planes;
    said each source node transmits an upstream control signal to a switch-plane controller of a selected switch plane during a first dedicated time slot in said predefined time frame corresponding to said each source node and said selected switch plane;
    said switch-plane controller transmits a downstream control signal to each sink node during a second dedicated time slot, in said predefined time frame, corresponding to said selected switch plane and said each sink node.

10. The communications network of claim 9 wherein said upstream control signal comprises a connection request specifying a destination sink node and a number of time slots within said predefined time frame, and said switch-plane controller:
    identifies, using said inlet-identification array, an inlet port of said selected switch plane at which said first upstream signal is received;
    identifies, using said outlet-identification array, an outlet port of said switch plane having a downstream channel to said destination sink node;
    performs a first-order time-slot-matching process where said inlet port and outlet port reside on a common switch unit, and communicates a result through said outlet port to a sink node connecting to said outlet port; and performs a second-order time-slot matching process where said inlet port and outlet port reside on different switch units, and communicates a result through said outlet port to a sink node connecting to said outlet port.

11. The communications network of claim 4 wherein at least two of said switch planes are collocated.

12. The communications network of claim 1 further comprising:
a plurality of upstream wavelength routers each connecting a group of source nodes selected from among said plurality of source nodes to each of said switch planes; and
a plurality of downstream wavelength routers each connecting a switch plane to a group of sink nodes selected from among said plurality of sink nodes.

13. The communications network of claim 12 wherein said at least one upstream channel is routed through one of said upstream wavelength routers and a wavelength demultiplexer, and wherein said at least one downstream channel is routed through a wavelength multiplexer and one of said downstream wavelength routers.

14. The communications network of claim 1 wherein at least one switch unit is an optical switch unit.

15. The communications network of claim 1 wherein at least one of said switch units is a latent space switch comprising:
an array of transit memory devices;
a first rotator connecting a plurality of input channels to said array of transit memory devices; and
a second rotator connecting said array of transit memory devices to a plurality of output ports.

16. The communications network of claim 1 wherein each source node from among said plurality of source nodes is integrated with a sink node from among said plurality of sink nodes to form an integrated edge node.

17. A communications network comprising:
a set of switch units arranged in switch planes, each switch plane comprising a subset of said switch units interconnected in a full-mesh structure;
a plurality of source nodes, each source node connecting to a switch unit in each switch plane through at least one upstream channel;
a plurality of sink nodes, each sink node connecting to a switch unit in each switch plane through at least one downstream channel;
wherein a first set of sink nodes connecting to any switch unit and a second set of sink nodes connecting to any other switch unit have a number of common sink nodes not exceeding a predefined upper bound.

18. A communications network comprising:
a set of switch units arranged in switch planes, each switch plane comprising a subset of said switch units interconnected in a full-mesh structure;
a plurality of source nodes;
a plurality of sink nodes;
a plurality of upstream wavelength routers each connecting a first number of source nodes selected from among said plurality of source nodes to a second number of wavelength demultiplexers each wavelength demultiplexer connecting to one of said switch planes; and
a plurality of downstream wavelength routers each connecting a third number of wavelength multiplexers to a fourth number of sink nodes selected from among said plurality of sink nodes, each wavelength multiplexer connecting to one of said switch planes;

wherein each source node connects to a switch unit in each switch plane through at least one upstream channel routed through one of said upstream wavelength routers wherein a first set of source nodes connecting to any switch unit and a second set of source nodes connecting to any other switch unit have a number of common source nodes not exceeding a predefined upper bound.

19. The communications network of claim 18 wherein each sink node in said plurality of sink nodes is paired with a source node from among said plurality of source nodes, wherein switch units in said subset of switch units in each switch plane are assigned switch-unit identifiers, where said switch-unit identifiers in any switch plane are repeated in each other switch plane, and wherein each sink node has a downstream channel from each of switch units of identical switch-unit identifiers.

20. The communications network of claim 18 wherein each sink node has at least one downstream channel routed through one of said downstream wavelength routers from at least one switch unit in each switch plane.

21. The communications network of claim 20 wherein each sink node in said plurality of sink nodes is paired with a source node from among said plurality of source nodes to form a source-sink node pair, and said source-sink node pair connects to a same switch unit in each of said switch planes.

22. A communications network comprising:
a set of switch units arranged in $\Pi>1$ switch planes indexed as 0 to $(\Pi-1)$, each switch plane comprising a subset of $G>1$ switch units interconnected in a full-mesh structure, G being a prime number, and switch units of each switch plane are indexed as 0 to $(G-1)$; and
a plurality of edge nodes arranged into G edge-node groups each edge-node group comprising at most $Q>1$ edge nodes, and an edge node within an edge-node group $\gamma$, $0 \leq \gamma < G$, is indexed as $(j, \gamma)$, $0 \leq j < Q < G$;
wherein a switch unit of index k, $0 \leq k < G$, in switch plane p, $0 \leq p < \Pi$, has at least one upstream channel from each of at most Q edge nodes of indices j and $\gamma = (k+p+j \times p)_{modulo\ G}$, $0 \leq j < Q$, and at least one downstream channel to each of at most Q edge nodes of indices j and $\gamma = k$, $0 \leq j < Q$,
thereby,
with each edge node combining a source node and a sink node so that said plurality of edge nodes comprises a plurality of source nodes and a plurality of sink nodes, a subset of source nodes connecting to each switch unit is orthogonal to a subset of source nodes connecting to any other switch unit in said set of switch units and a subset of sink nodes connecting to each switch unit in each switch plane connects to a single switch unit in each other switch plane.

23. A communications network comprising:
a plurality of edge nodes grouped into $G>1$ edge-node groups, G being a prime number, each edge-node group comprising at most $Q>1$ edge nodes, and edge nodes within an edge-node group $\gamma$, $0 \leq \gamma < G$, are indexed as $(j, \gamma)$, $0 \leq j < Q$; and
a set of switch units arranged in $\Pi>1$ switch planes indexed as 0 to $(\Pi-1)$, each switch plane comprising a subset of G switch units interconnected in a full-mesh structure and switch units of each switch plane are indexed as 0 to $(G-1)$;
wherein an edge node of index $(j, \gamma)$, $0 \leq j < Q < G$, $0 \leq \gamma < G$, has at least one upstream channel to a switch unit of index $((G-1-j)p+\gamma)_{modulo\ G}$, in each switch plane p, $0 \leq p < \Pi$, and at least one downstream channel from a switch unit of index $\gamma$ in each switch plane p, $0 \leq p < \Pi$.

thereby,
with each edge node combining a source node and a sink node so that said plurality of edge nodes comprises a plurality of source nodes and a plurality of sink nodes, a subset of source nodes connecting to each switch unit is orthogonal to a subset of source nodes connecting to any other switch unit in said set of switch units and a subset of sink nodes connecting to each switch unit in each switch plane connects to a single switch unit in each other switch plane.

24. The communications network of claim 23 wherein each switch unit in each switch plane has N provisioned dual ports, N>2, including Q outer dual ports communicatively coupled to one of said edge-node groups and (G−1) inner dual ports connecting to other switch units of said each switch plane, wherein the value of G is selected as a prime number not exceeding $(N\times\eta/(\eta+1))+1$, and the value of Q is determined as $Q \leq \lfloor (G-1)/\eta \rfloor$, where $\eta$ is a predefined minimum expansion factor and $\lfloor y \rfloor$ denotes an integer part of a real number y.

25. The communications network of claim 24 wherein said plurality of edge nodes exchanges data segments through said Π>1 switch planes, said data segments being time-multiplexed in a cyclic time frame having a predefined number of time slots.

* * * * *